US007175740B2

(12) United States Patent
Riehle et al.

(10) Patent No.: US 7,175,740 B2
(45) Date of Patent: *Feb. 13, 2007

(54) REDUCED BY PRODUCT POLYAMINE-EPIHALOHYDRIN RESINS

(75) Inventors: Richard James Riehle, Wilmington, DE (US); Anthony J. Allen, Wilmington, DE (US); Michaela Hofbauer, Roosendaal (NL); Alfred Jacques Haandrikman, Amersfoort (NL); Ronald Busink, Bennekom (NL); Mark T. Crisp, Amersfoort (NL); John James Hoglen, Newark, DE (US); Huai Nan Cheng, Wilmington, DE (US); Francis J. Carlin, Jr., Newark, DE (US); John Arthur Lapre, Ede (NL); Harold Jabloner, Landenburg, PA (US)

(73) Assignee: Hercules Incorporated, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/396,155

(22) Filed: Mar. 25, 2003

(65) Prior Publication Data
US 2003/0205345 A1 Nov. 6, 2003

Related U.S. Application Data

(63) Continuation of application No. 09/592,681, filed on Jun. 12, 2000, now Pat. No. 6,554,961, which is a continuation-in-part of application No. 09/363,224, filed on Jul. 30, 1999, now abandoned, which is a continuation-in-part of application No. 09/330,200, filed on Jun. 11, 1999, now abandoned.

(51) Int. Cl.
D21H 17/55 (2006.01)
D21H 21/20 (2006.01)
C08G 69/46 (2006.01)

(52) U.S. Cl. .............................. 162/164.3; 162/164.6; 435/262; 435/262.5; 524/17

(58) Field of Classification Search ............... 435/262, 435/262.5; 162/164.3, 164.6; 524/17
See application file for complete search history.

(56) References Cited

U.S. PATENT DOCUMENTS

| | | | | |
|---|---|---|---|---|
| 2,595,935 A | 5/1952 | Daniel et al. | ..................... | 92/3 |
| 2,926,154 A | 2/1960 | Keim | ........................ | 260/29.2 |
| 3,197,427 A * | 7/1965 | Schmalz | ..................... | 524/284 |
| 3,248,353 A | 4/1966 | Coscia | ..................... | 260/29.2 |
| 3,311,594 A | 3/1967 | Earle | ......................... | 260/77.5 |
| 3,332,901 A | 7/1967 | Keim | ........................ | 260/29.2 |
| 3,655,506 A | 4/1972 | Baggett | ..................... | 162/164 |
| 3,891,589 A | 6/1975 | Ray-Chaudhuri | ........... | 260/29.2 |
| 4,388,439 A | 6/1983 | Maslanka | ................... | 524/845 |
| 4,452,894 A | 6/1984 | Olsen et al. | ................. | 435/253 |
| 4,477,570 A | 10/1984 | Colaruotolo et al. | ........ | 435/253 |
| 4,487,884 A | 12/1984 | Maslanka | ................... | 524/845 |
| 4,493,895 A | 1/1985 | Colaruotolo et al. | ........ | 435/262 |
| 4,501,640 A | 2/1985 | Soerens | ...................... | 162/111 |
| 4,501,862 A | 2/1985 | Keim | ......................... | 525/430 |
| 4,528,316 A | 7/1985 | Sorens | ....................... | 524/503 |
| 4,684,439 A | 8/1987 | Soerens | ...................... | 162/111 |
| 4,788,243 A | 11/1988 | Soerens | ...................... | 524/503 |
| 4,853,431 A | 8/1989 | Miller | ......................... | 524/608 |
| 4,857,586 A | 8/1989 | Bachem et al. | ............. | 524/845 |
| 5,017,642 A | 5/1991 | Hasegawa et al. | .......... | 524/608 |

(Continued)

FOREIGN PATENT DOCUMENTS

CA 979579 12/1975

(Continued)

OTHER PUBLICATIONS

C. E. Castro, Biological Cleavage of Carbon-Halogen Bonds Metabolism of 3-Bromopropanol by Psuedomonas sp., Biochimica et Bio-physica Acta, 100, 384-392, 1965.

(Continued)

Primary Examiner—David J. Buttner
(74) Attorney, Agent, or Firm—Robert O'Flynn O'Brien; Joanne Mary Fobare Rossi

(57) ABSTRACT

Processes for rendering a polyamine-epihalohydrin resin storage stable, including processes that prepare a storage stable resin and/or processes that treat resins. A composition containing a polyamine-epihalohydrin resin which includes CPD-forming species can be treated with at least one agent under conditions to at least one of inhibit, reduce and remove the CPD-forming species to obtain a reduced CPD-forming resin so that a composition containing the reduced CPD-forming polyamine-epihalohydrin resin when stored for 2 weeks at 50° C., and a pH of about 2.5 to 3.5 contains less than about 250 ppm dry basis of CPD. The invention is also directed to a gelation storage stable reduced CPD-forming resin so that a composition containing the reduced CPD-forming polyamine-epihalohydrin resin, when stored at pH 1 for 24 hours at 50° C. and measured at 24 hours, produces less than about 1000 ppm dry basis of CPD. A paper product containing the storage stable polyaminopolyamide-epihalohydrin resin, when corrected for adding at about a 1 wt % addition level of the polyaminopolyamide-epihalohydrin resin, contains less than about 250 ppb of CPD. Moreover, a resin can be prepared starting from a prepolymer having a low acid number or low concentration of acid end groups. The invention is also directed to papers containing the resins.

23 Claims, No Drawings

U.S. PATENT DOCUMENTS

| | | | |
|---|---|---|---|
| 5,019,606 A | 5/1991 | Marten et al. | 523/414 |
| 5,056,855 A | 10/1991 | Moravsky | 296/98 |
| 5,171,795 A | 12/1992 | Miller et al. | 525/430 |
| 5,187,219 A | 2/1993 | Furman | 524/377 |
| 5,189,142 A | 2/1993 | Devore et al. | 528/339.3 |
| 5,239,047 A | 8/1993 | Devore et al. | 528/339.3 |
| 5,246,544 A | 9/1993 | Hollenberg et al. | 162/111 |
| 5,256,727 A | 10/1993 | Dulany et al. | 524/608 |
| 5,330,619 A * | 7/1994 | Johnson et al. | 162/5 |
| 5,338,807 A | 8/1994 | Espy et al. | 525/430 |
| 5,364,927 A | 11/1994 | Devore et al. | 528/339.3 |
| 5,374,334 A | 12/1994 | Sommese et al. | 162/111 |
| 5,470,742 A * | 11/1995 | Bull et al. | 435/262 |
| 5,516,885 A | 5/1996 | Gorzynski et al. | 528/482 |
| 5,786,429 A | 7/1998 | Allen | 525/430 |
| 5,843,763 A | 12/1998 | Bull et al. | 435/262.5 |
| 5,871,616 A | 2/1999 | Bull et al. | 162/164.3 |
| 5,902,862 A | 5/1999 | Allen | 525/430 |
| 5,972,691 A | 10/1999 | Bates et al. | 435/278 |
| 5,994,449 A | 11/1999 | Maslanka | 524/503 |
| 6,056,855 A | 5/2000 | Amey | 162/164.3 |
| 6,222,006 B1 | 4/2001 | Kokko et al. | 528/332 |
| 6,429,267 B1 | 8/2002 | Riehle | 525/430 |
| 6,554,961 B1 * | 4/2003 | Riehle et al. | 162/164.3 |
| 2003/0000667 A1 * | 1/2003 | Riehle et al. | 162/164.1 |
| 2003/0070783 A1 * | 4/2003 | Riehle et al. | 162/166 |
| 2004/0266984 A1 | 12/2004 | Riehle | 528/421 |

FOREIGN PATENT DOCUMENTS

| | | |
|---|---|---|
| EP | 0 349 935 | 6/1993 |
| GB | 865727 | 4/1961 |
| WO | 92/22601 | 12/1992 |
| WO | 93/21384 | 10/1993 |
| WO | WO-96/40967 | * 12/1996 |
| WO | 99/33901 | 7/1999 |

OTHER PUBLICATIONS

Dunlop-Jones, Paper Chemistry, ISBN 0-216-92909-1, pp. 78-95, published in the US by Chapman Hall, New York, Chapter 6.

P. J. Flory, Principles of Polymer Chemistry, pp. 91-95, Cornell University Press, Ithaca, NY 1953.

Jerry March, Advanced Organic Chemistry, Third Ed., John Wiley & Sons, New York, 1985, p. 218-236.

Siezen, R. J., M.de Ves Wm, Leunissen J A, Dijkstra B.W, Protein Eng. 1991, vol. 4, No. 7, pp. 7197-37.

* cited by examiner

REDUCED BY PRODUCT POLYAMINE-EPIHALOHYDRIN RESINS

CROSS-REFERENCE TO RELATED APPLICATIONS

This application is a Continuation of application Ser. No. 09/592,681 filed Jun. 12, 2000 now U.S. Pat. No. 6,554,961, which is a Continuation-in-Part of application Ser. No. 09/363,224, filed Jul. 30, 1999 now abandoned, which is a Continuation-in-Part of application Ser. No. 09/330,200, filed Jun. 11, 1999 now abandoned. The disclosures of each of these applications are incorporated by reference herein in their entireties.

BACKGROUND OF THE INVENTION

1. Field of the Invention

The present invention relates to polyamine-epihalohydrin resin products, particularly polyamine-epihalohydrin resin products which can be stored with at least reduced formation of halogen containing residuals, such as 3-chloropropanediol (CPD). Moreover, the present invention relates to formation of polyamine-epihalohydrin resins having at least reduced formation of halogen containing residuals, and to various uses of the resins, such as wet strength agents. More specifically, the present invention relates to polyamine-epihalohydrin resin products which have reduced levels of formation of CPD upon storage, such as paper products. Moreover, the present invention relates to the production of polyamine-epihalohydrin resins prepared from polyaminoamide prepolymers containing low levels of acid functionalities, and to resins formed thereby.

2. Discussion of Background Information

Polyamine-epihalohydrin resins, such as polyaminopolyamide-epihalohydrin resins are cationic thermosetting materials used to increase the wet strength of papers. Often these materials contain large quantities of epihalohydrin hydrolysis products. For example, commercial polyaminopolyamide-epichlorohydrin resins typically contain 1–10 wt % (dry basis) of the epichlorohydrin (epi) by-products, 1,3-dichloropropanol (1,3-DCP), 2,3-dichloropropanol (2,3-DCP) and 3-chloropropanediol (CPD). Production of wet-strength resins with reduced levels of epi by-products has been the subject of much investigation. Environmental pressures to product wet-strength resins with lower levels of absorbable organic halogen (AOX) species have been increasing. "AOX" refers to the adsorbable organic halogen content of the wet strength resin which can be determined by means of adsorption onto carbon. AOX includes epichlorohydrin (epi) and epi by-products (1,3-dichloropropanol, 2,3-dichloropropanol and 3-chloropropanediol) as well as organic halogen bound to the polymer backbone.

Commercial papermaking operations typically utilize paper wet strengthening formulations which comprise cationic thermosetting polymers. In the papermaking process, waste material is frequently disposed of in landfills, etc. It is desirable to reduce the organohalogen content of such wastes to as low a level as possible. This waste is a substantially solid mass of material which is exposed to the environment. The exposure of the waste to the environment results in the selection of microorganisms which feed on the components in the waste. It is known that there are microorganisms which feed on the organohalogen compounds in the solid waste.

In the papermaking process the epichlorohydrin hydrolysis products are released into the environment in the water used to make paper, or into the air by evaporation during the paper drying step, or into the paper itself or a combination of these events. It is desirable to reduce and control these emissions into the environment to as low a level as possible. Reduced levels of CPD are especially desirable in applications where food is the end use.

Several ways of reducing the quantities of epihalohydrin hydrolysis products have been devised. Reduction in the quantity of epihalohydrin used in the synthetic step is an alternative taught in U.S. Pat. No. 5,171,795. A longer reaction time results. Control over the manufacturing process is taught in U.S. Pat. No. 5,017,642 to yield compositions of reduced concentration of hydrolysis products. These patents are incorporated by reference in their entireties.

Post-synthesis treatments are also taught. U.S. Pat. No. 5,256,727, which is incorporated by reference in its entirety, teaches that reacting the epihalohydrin and its hydrolysis products with dibasic phosphate salts or alkanolamines in equimolar proportions converts the chlorinated organic compounds into non-chlorinated species. To do this it is necessary to conduct a second reaction step for at least 3 hours, which adds significantly to costs and generates quantities of unwanted organic materials in the wet strength composition. In compositions containing large amounts of epihalohydrin and epihalohydrin hydrolysis products (e.g., about 1–6% by weight of the composition), the amount of organic material formed is likewise present in undesirably large amounts.

U.S. Pat. No. 5,516,885 and WO 92/22601, which are incorporated by reference in their entireties, disclose that halogenated by-products can be removed from products containing high levels of halogenated by-products as well as low levels of halogenated by-products by the use of ion exchange resins. However, it is clear from the data presented that there are significant yield losses in wet strength composition and a reduction in wet strength effectiveness.

It is known that nitrogen-free organohalogen-containing compounds can be converted to a relatively harmless substance. For example, 1,3-dichloro-2-propanol, 3-chloro-1,2-propanediol (also known as 3-chloropropanediol, 3-monochloropropanediol, monochloropropanediol, chloropropanediol, CPD, 3-CPD, MCPD and 3-MCPD) and epichlorohydrin have been treated with alkali to produce glycerol.

The conversion of nitrogen-free organohalogen compounds with microorganisms containing a dehalogenase is also known. For example, C. E. Castro, et al. ("Biological Cleavage of Carbon-Halogen Bonds Metabolism of 3-Bromopropanol by *Pseudomonas* sp.", *Biochimica et Biophysica Acta*, 100, 384–392, 1965), which is incorporated by reference in its entirety, describes the use of *Pseudomonas* sp. isolated from soil that metabolizes 3-bromopropanol in sequence to 3-bromopropionic acid, 3-hydroxypropionic acid and $CO_2$.

Various U.S. patents also describe the use of microorganisms for dehalogenating halohydrins, e.g., U.S. Pat. Nos. 4,452,894; 4,477,570; and 4,493,895. Each of these patents is hereby incorporated by reference as though set forth in full herein.

U.S. Pat. Nos. 5,470,742, 5,843,763 and 5,871,616, which are incorporated by reference in their entireties, disclose the use of microorganisms or enzymes derived from microorganisms to remove epihalohydrin and epihalohydrin hydrolysis products from wet strength compositions without reduction in wet strength effectiveness. Processes of removal are described which remove up to 2.6 weight percent of halogenated by-product based on the weight of the composition. The amount of microorganism or enzyme used is in direct proportion to the quantity of halogenated by-product present. Thus, when present in large quantities (e.g., more than about 1% by weight of the composition) a large proportion of microorganism or enzyme is needed to adequately remove the unwanted product. Large quantities of halogenated byproduct can be toxic to the microbes employed in such dehalogenation processes. Each of these documents is hereby incorporated by reference as though set forth in full herein.

Still further, U.S. application Ser. No. 08/482,398, now U.S. Pat. No. 5,972,691 and WO 96/40967, which are incorporated by reference in their entireties, disclose the treatment of wet strength compositions with an inorganic base after the synthesis step (i.e., after the polymerization reaction to form the resin) has been completed and the resin has been stabilized at low pH, to reduce the organo halogen content of wet strength compositions (e.g., chlorinated hydrolysis products) to moderate levels (e.g., about 0.5% based on the weight of the composition). The composition so formed can then be treated with microorganisms or enzymes to economically produce wet strength compositions with very low levels of epihalohydrins and epihalohydrin hydrolysis products.

It is also known that epihalohydrin and epihalohydrin hydrolyzates can be reacted with bases to form chloride ion and polyhydric alcohols. U.S. Pat. No. 4,975,499 teaches the use of bases during the synthetic step to reduce organo chlorine contents of wet strength composition to moderate levels (e.g., to moderate levels of from about 0.11 to about 0.16%) based on the weight of the composition. U.S. Pat. No. 5,019,606 teaches reacting wet strength compositions with an organic or inorganic base. These patents are incorporated by reference in their entireties.

Moreover, U.S. application Ser. No. 09/001,787, filed Dec. 31, 1997, and Ser. No. 09/224,107, filed Dec. 22, 1998 to Riehle, and WO 99/33901, and which are incorporated by reference in their entireties, disclose amongst other features, a process for reducing the AOX content of a starting water-soluble wet-strength resin comprising azetidinium ions and tertiary aminohalohydrin, which includes treating the resin in aqueous solution with base to form treated resin, wherein at least about 20% of the tertiary aminohalohydrin present in the starting resin is converted into epoxide and the level of azetidinium ion is substantially unchanged, and the effectiveness of the treated resin in imparting wet strength is at least about as great as that of the starting wet-strength resin.

The use of endcapping agents to prepare polyaminoamide prepolymers of controlled molecular weight is described in U.S. Pat. Nos. 5,786,429 and 5,902,862, which are incorporated by reference in their entireties. The endcapping agents described were either monofunctional carboxylic acids, monofunctional carboxylic esters or monofunctional amines. These polyaminoamides were subsequently reacted with a minimal amount of an intralinker to give highly branched polyamidoamines having either no or very low levels of reactive functionality.

WO 99/09252 describes thermosetting wet strength resins prepared from end-capped polyaminoamide polymers. The endcappers used are monocarboxylic acids or monofunctional carboxylic esters, and are used to control the molecular weight of the polyaminamide in order to obtain wet strength resins with a high solids content.

Each of the foregoing approaches has provided various results, and there has been a continuing need for improvement.

SUMMARY OF THE INVENTION

The present invention is directed to polyamine-epihalohydrin resin products, particularly polyamine-epihalohydrin resin products which can be stored with at least reduced formation of halogen containing residuals, such as 3-chloropropanediol (CPD). The present invention is also directed to various uses of polyamine-epihalohydrin resins having at least reduced formation of halogen containing residuals, such as wet strength agents.

The present invention is also directed to polyamine-epihalohydrin resin products which have reduced levels of formation of CPD upon storage, particularly paper products.

The present invention is also directed to the preparation of polyamine-epihalohydrin resins, especially polyaminopolyamide-epihalohydrin resins and/or the treatment of polyamine-epihalohydrin resins, especially polyaminopolyamide-epihalohydrin resins.

The present invention is also directed to the preparation of storage stable polyamine-epihalohydrin resins, especially polyaminopolyamide-epihalohydrin resins and/or the treatment of polyamine-epihalohydrin resins, especially polyaminopolyamide-epihalohydrin resins to render such resins storage stable.

In one aspect of the present invention wherein the polyamine-epihalohydrin resin is treated to obtain a storage stable product, the present invention is directed to a process for rendering a polyamine-epihalohydrin resin storage stable, comprising treating a composition containing polyamine-epihalohydrin resin which includes CPD-forming species with at least one agent under conditions to at least one of inhibit, reduce and remove the CPD-forming species to obtain a elation storage stable reduced CPD-forming resin so that composition containing the reduced CPD-forming polyamine-epihalohydrin resin when stored for 2 weeks at 50° C., and a pH of about 2.5 to 3.5 contains less than about 250 ppm dry basis of CPD, preferably less than about 150 ppm dry basis of CPD after two weeks, more preferably less than about 75 ppm dry basis of CPD after two weeks, even more preferably less than about 40 ppm dry basis of CPD after two weeks, and even more preferably less than about 10 ppm dry basis of CPD after two weeks.

Moreover, the present invention is also directed to a process for rendering a polyamine-epihalohydrin resin storage stable, comprising treating a composition containing a polyamine-epihalohydrin resin which includes CPD-forming species with at least one agent under conditions to at least one of inhibit, reduce and remove the CPD-forming species to obtain a gelation storage stable reduced CPD-forming resin so that a composition containing the reduced CPD-forming polyamine-epihalohydrin resin, when stored at pH 1 for 24 hours at 50° C. and measured at 24 hours, produces less than about 1000 ppm dry basis of CPD, more preferably produces less than about 750 ppm dry basis of CPD, even more preferably produces less than about 500 ppm dry basis of CPD, even more preferably produces less than about 250 ppm dry basis of CPD, even more preferably produces less than about 150 ppm dry basis of CPD, even more preferably produces less than about 100 ppm dry basis of CPD, even more preferably produces less than about 75 ppm dry basis of CPD, even more preferably produces less than about 50 ppm dry basis of CPD, even more preferably produces less than about 25 ppm dry basis of CPD, even more preferably produces less than about 15 ppm dry basis of CPD, even more preferably produces less than about 5 ppm dry basis of CPD, and even more preferably produces less than about 3 ppm dry basis of CPD, and even more preferably produces less than about 1 ppm dry basis of CPD.

The present invention is also directed to a storage stable polyaminopolyamide-epihalohydrin resin, the polyaminopolyamide-epihalohydrin resin when stored as an aqueous composition containing the resin, when stored at pH 1 for 24 hours at 50° C. and measured at 24 hours, produces less than about 1000 ppm dry basis of CPD, more preferably produces less than about 750 ppm dry basis of CPD, even more preferably produces less than about 500 ppm dry basis of CPD, even more preferably produces less than about 250 ppm dry basis of CPD, even more preferably produces less than about 150 ppm dry basis of CPD, even more preferably produces less than about 100 ppm dry basis of CPD, even more preferably produces less than about 75 ppm dry basis of CPD, even more preferably produces less than about 50 ppm dry basis of CPD, even more preferably produces less than about 25 ppm dry basis of CPD, even more preferably produces less than about 15 ppm dry basis of CPD, even more preferably produces less than about 5 ppm dry basis of CPD, and even more preferably produces less than about 3 ppm dry basis of CPD, and even more preferably produces less than about 1 ppm dry basis of CPD.

In another aspect, the present invention is also directed to a storage stable polyaminopolyamide-epihalohydrin resin, the polyaminopolyamide-epihalohydrin resin being capable of forming a paper product, so that a paper product containing said polyaminopolyamide-epihalohydrin resin, when corrected for adding at about a 1 wt % addition level of the polyaminopolyamide-epihalohydrin resin, contains less than about 250 ppb of CPD, more preferably less than about 100 ppb of CPD, more preferably less than about 50 ppb of CPD, more preferably less than about 10 ppb of CPD and even more preferably less than about 1 ppb of CPD.

A paper product containing the reduced CPD-forming resin, when corrected for adding at about a 1 wt % addition level of the reduced CPD-forming resin, preferably contains less than about 250 ppb of CPD, more preferably less than about 100 ppb of CPD, more preferably less than about 50 ppb of CPD, more preferably less than about 10 ppb of CPD and even more preferably less than about 1 ppb of CPD.

In another aspect of the present invention involving preparation of the polyamine-epihalohydrin so as to have a reduced acid number, the present invention is directed to the production of polyaminopolyamide-epihalohydrin resins having reduced acid number, compositions and solutions containing such resins, as well as products, such as paper products, containing such resins.

In another aspect of the present invention, a storage stable polyaminopolyamide-epihalohydrin resin is provided, wherein the polyaminopolyamide-epihalohydrin resin when stored as an aqueous composition containing the resin for 2 weeks at 50° C., and a pH of about 2.5 to 3.5 contains less than about 250 ppm dry basis of CPD, preferably less than about 150 ppm dry basis of CPD after two weeks, more preferably less than about 75 ppm dry basis of CPD after two weeks, even more preferably less than about 40 ppm dry basis of CPD after two weeks, and even more preferably less than about 10 ppm dry basis of CPD after two weeks.

In still another aspect, the present invention is directed to a polyaminopolyamide-epihalohydrin resin formed by reacting polyaminoamide prepolymer with epihalohydrin, the polyaminoamide prepolymer having an acid functionality less than about 0.5 milliequivalents/dry gram of prepolymer, and said polyaminopolyamide-epihalohydrin resin being subjected to a treatment to reduce at least one of epihalohydrins, epihalohydrin hydrolysis by-products and CPD forming species.

Still further, the polyaminopolyamide-epihalohydrin resin can be a polyaminopolyamide-epihalohydrin resin produced from polyaminoamide prepolymer having an acid functionality less than about 0.5 milliequivalents/dry gram of prepolymer, more preferably less than about 0.25 milliequivalents/dry gram of prepolymer, more preferably less than about 0.1 milliequivalents/dry gram of prepolymer, more preferably less than about 0.075 milliequivalents/dry gram of prepolymer, even more preferably less than about 0.05 milliequivalents/dry gram of prepolymer.

Still further, the polyaminopolyamide-epihalohydrin resin can be a polyaminopolyamide-epihalohydrin resin produced from polyaminoamide prepolymer having an acid end group concentration of less than about 5%, as measured by $^{13}C$ NMR analysis, more preferably, an acid end group concentration of less than about 2.5%, as measured by $^{13}C$ NMR analysis, more preferably an acid end group concentration of less than about 1%, as measured by $^{13}C$ NMR analysis, more preferably an acid end group concentration less than about 0.7%, as measured by $^{13}C$ NMR analysis, and even more preferably an acid end group concentration of less than about 0.5%, as measured by $^{13}C$ NMR analysis.

In another aspect of the present invention, the prepolymer can have a RSV of about 0.075 to 0.2 dL/g, more preferably about 0.1 to 0.15 dL/g, and is preferably at least about 0.05 dL/g, more preferably at least about 0.075 dL/g, and even more preferably at least about 0.1 dL/g.

As noted above, the composition preferably contains less than about 150 ppm dry basis, more preferably less than about 75 ppm dry basis, more preferably less than about 40 ppm dry basis, more preferably less than about 10 ppm dry basis of CPD after two weeks.

Moreover, the present invention is also directed to a process for preparing a paper product, comprising treating a compositon containing polyamine-epihalohydrin resin which includes CPD-forming species with at least one agent under conditions to at least one of inhibit, reduce and remove the CPD-forming species to obtain a gelation storage stable reduced CPD-forming resin, and forming a paper product with the reduced CPD-forming polyamine-epihalohydrin resin, so that a paper product, when corrected for adding at about a 1 wt % addition level of the reduced CPD-forming resin, contains less than about 250 ppb of CPD, preferably less than about 100 ppb of CPD, even more preferably less than about 50 ppb of CPD, even more preferably less than about 10 ppb of CPD, and even more preferably less than about 1 ppb of CPD.

In still another aspect, the present invention is directed to a process of producing a polyaminoamide prepolymer by reacting polyalkyleneamine with dicarboxylic acid and/or dibasic ester in a prepolymer forming reaction, and post-adding at least one amine at a later stage of the prepolymer forming reaction. The amine can be added in an amount so that a total molar quantity of polyalkylenepolyamine plus post-added amine is greater than a total molar amount of dicarboxylic acid.

Preferably, the prepolymer forming reaction is at least about 70% complete at time of addition of the post-added amine, more preferably at least about 80% complete, and even more preferably at least about 90% complete.

The post-added amine can be a monofunctional amine and/or a polyamine, such as a polyalkyleneamine.

In the various reactions, the dicarboxylic acid can comprise at least one of oxalic acid, malonic acid, succinic acid, glutaric acid, adipic acid and azelaic acid; the dibasic ester can comprise at least one of dimethyl adipate, diethyl adipate, dimethyl glutarate, diethyl glutarate, dimethyl succinate and diethyl succinate, and the polyalkyleneamine can comprise at least one of diethylenetriamine, triethylenetetramine, tetraethylenepentamine, dipropylenetriamine, methylbisaminopropylamine, bis-hexamethylenetriamine and methylbisaminopropylamine.

The polyamine-epihalohydrin resin can comprise polyaminopolyamide-epihalohydrin resin, preferably polyaminopolyamide-epichlorohydrin resin, and polyaminoureylene-epihalohydrin resin, preferably polyaminoureylene-epichlorohydrin resin.

The prepolymer can comprise endcapped prepolymer, amine excess prepolymer and post-added amine prepolymer.

The at least one agent can comprise at least one acidic agent. The at least one acidic agent is preferably added to provide an initial pH of less than about 2, preferably less than about 1, or about 1, the temperature is at least about 30° C., preferably about 30° C. to 140° C., more preferably about 40° C. to 90° C., with preferred temperatures being at least about 50° C., and the time is at least about 2 hours. The at least one acidic agent can be added to provide an initial pH of about 1, the temperature can be about 50° C., and the time can be about 24 hours. The at least one acidic agent can added to provide an initial pH of about 1, the temperature can be about 60° C., and the time can be about 12 hours. The at least one acidic agent can be added to provide an initial pH of about 1, the temperature can be about 70° C., and the time can be about 6 hours. The at least one acidic agent can be added to provide an initial pH of about 1, the temperature can be about 80° C., and the time can be about 3 hours.

The at least one acidic agent can comprise a non-halogen inorganic acid, preferably sulfuric acid.

Following the treating with the at least one acidic agent, at least one basic agent can be added to raise the pH of the resin solution to at least about 7, preferably to at least about 8, with a preferred range of about 8 to 12. The resin solution during base treatment preferably has a temperature of about 40° C. to 70° C. Following the addition of the at least one basic agent, an acidic agent can be added in an amount effective to gel stabilize the resin solution.

The at least one agent can comprise at least one basic agent. The resin can comprise a resin formed in a polyamide-epihalohydrin reaction having a molar ratio of epihalohydrin to secondary amine group of less than 1, more preferably the molar ratio of epihalohydrin to secondary amine group is less than about 0.975, with a preferred range of the molar ratio of epihalohydrin to secondary amine group being about 0.5 to 0.975, more preferably the molar ratio of epihalohydrin to secondary amine group being about 0.8 to 0.975. The at least one basic agent can raise the pH of the composition containing the polyamine-epihalohydrin resin to a pH of at least about 8, more preferably at least about 9, more preferably a pH of at least about 10, and the pH is preferably less than about 12.5, with a preferred pH range pH about 10 to 12. The composition preferably has a temperature of at least about 20° C., more preferably a temperature of at least about 40° C., with one temperature range being about 20° C. to 80° C. The composition can have a temperature of about 50° C., a pH of about 11.5, and a treatment time is about 5 minutes. The composition can have a temperature of about 55° C., a pH of about 10.5 to 11.5, and a treatment time is about 5 minutes. The reduced CPD-forming resin can be acid stabilized, such as to a pH from about 2.5 to 4.

The at least one agent can comprise at least one enzymatic agent, such as at least one of esterases, lipases and proteases, preferably ALCALASE.

The at least one agent can comprise at least one pH modifying agent to obtain a pH of about 5.5 to 7. The composition can have a temperature of about 30° C., a pH of about 6 and a treatment time of about 6 days. The composition can have a temperature of about 50° C., a pH of about 6 and a treatment time of about 6 hours.

Prior and/or subsequent to treating a polyamine-epihalohydrin resin to obtain a reduced CPD-forming resin and/or after production of a low acid number resin, the resin can be contacted with at least one microorganism, or at least one enzyme isolated from the at least one microorganism, in an amount, and at a pH and temperature effective to dehalogenate residual quantities of organically bound halogen. The at least one microorganism can comprise at least one of *Arthrobacter histidinolovorans* HK1, *Agrobacterium radiobacter* biovar 1 and *Agrobacterium tumefaciens* HK7. The at least one microorganism can comprise a mixture comprising at least one of *Agrobacterium tumefaciens* HK7 and *Agrobacterium radiobacter* biovar 1, and *Arthrobacter histidinolovorans* HK1

Moreover, prior and/or subsequent to the treating a polyamine-epihalohydrin resin to obtain a reduced CPD-forming resin and/or after production of a low acid number resin, the resin can be treated to reduce at least one of epihalohydrins, epihalohydrin hydrolysis by-products and organic halogen bound to the polymer backbone.

The present invention is also directed to paper products treated with resins produced according to the present invention, to reduced CPD-forming resin produced according to the present invention, and aqueous compositions comprising the reduced CPD-forming resin according to the present invention, and such aqueous compositions including at least one polyalkylene polyamine-epihalohydrin resin.

The paper product can comprise a paper product which comes into contact with food products, such as a tea bag or coffee filter, or packaging board, or tissue and towel.

DETAILED DESCRIPTION OF THE INVENTION

Unless otherwise stated, all percentages, parts, ratios, etc., are by weight.

Unless otherwise stated, a reference to a compound or component includes the compound or component by itself, as well as in combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

Polyamine-epihalohydrin resins according to the present invention include polyaminopolyamide-epihalohydrin resins (which are also known as polyaminoamide-epihalohydrin resins, polyamidepolyamine-epihalohydrin resins, polyaminepolyamide-epihalohydrin resins, aminopolyamide-epihalohydrin resins, polyamide-epihalohydrin resins); polyalkylene polyamine-epihalohydrin; and polyaminourylene-epihalohydrin resins, copolyamide-polyurylene-epichlorohydrin resins, polyamide-polyurylene-epichlorohydrin resins with the epihalohydrin preferably being epichlorohydrin in each instance.

This invention is also directed towards the preparation, use and treatment of polyamine-epihalohydrin resins, such as polyaminopolyamide-epichlorohydrin resins, made by reacting epihalohydrin, such as epichlorohydrin, with a prepolymer (also interchangeably referred to herein as polymer), such as polyaminoamide prepolymer. In the case of polyaminopolyamide resins, it is noted that the polyaminoamide prepolymer is also referred to as polyamidoamine, polyaminopolyamide, polyamidopolyamine, polyamide-polyamine, polyamide, basic polyamide, cationic polyamide, aminopolyamide, amidopolyamine or polyaminamide.

While not wishing to be bound by theory, the present invention is based upon the discovery that CPD that is formed in polyamine-epihalohydrin resins, particularly polyaminopolyamide-epihalohydrin resins, after storage, is due to CPD-forming species that are associated with the oligomeric and/or polymeric component of the resin. Thus, it has been discovered that polyamine-epihalohydrin resins can be treated during and/or subsequent to production in such a manner so as to prevent the formation of, inhibit and/or remove elements associated with the polyamine-epihalohydrin resin which form CPD upon storage.

In other words, the resins according to the present invention are capable of being stored without undue formation of CPD. More specifically, as an example, the solution will contain less than about 10 ppm (parts per million), more preferably less than about 5 ppm, and most preferably less than 1 ppm of CPD, when stored at about 13.5 wt % resin solids content. In the context of the present invention the phrase "resin solids" means the active polyamine-epihalohydrin of the composition.

To determine storage stability of resin solutions according to the present invention, a resin solution stability test is performed wherein the resin solution is stored for a period of 2 weeks at 50° C., and a pH of about 2.5 to 3.5, preferably 2.8, and the CPD content is measured at the end of the 2 week period. Thus, a solution containing polyamine-epihalohydrin resin according to the present invention will be storage stable if it contains less than about 250 ppm dry basis of CPD when measured at the end of the two week period, more preferably less than about 150 ppm dry basis of CPD when measured at the end of the 2 week period, more preferably less than about 75 ppm dry basis of CPD when measured at the end of the 2 week period, even more preferably less than about 40 ppm dry basis of CPD when measured at the end of the two week period, and even more preferably less than about 10 ppm dry basis of CPD when measured at the end of the 2 week period.

The resin solution stability test can be performed on solutions containing varying percent resin solids content; however, the CPD produced should be corrected for solids content. For example, for a 15 wt % resin solids content solution having a measured CPD content of 15 ppm, the corrected CPD, on a dry basis, will be 100 ppm dry basis (15 ppm/0.15 weight resin solids content).

The resin solution stability test is performed by charging a portion of the polyamine-epihalohydrin resin into a container containing a stirrer. The container is placed in a 50° C. water bath and maintained at 50° C. with stirring. An aliquot is removed from the container and submitted for GC (gas chromatography) analysis according to the GC procedure as set forth in Comparative Example 1. Typically, a flame ionization detector (FID) is first used to analyze the sample. An electrolytic conductivity detector (ELCD) or a halogen-specific detector (XSD) is used when increased sensitivity is needed, especially at less than about 20 ppm of the species to be analyzed. Other sensitive detectors can be used, e.g., electron capture detectors. This test is an accelerated aging test to model ageing at longer periods of time at about 32° C.

Moreover, paper products containing resins according to the present invention are capable of being stored without undue formation of CPD. Thus, paper products according to the present invention can have initial low levels of CPD, and can maintain low levels of CPD over an extended period storage time. More specifically, paper products according to the present invention, made with a 1 wt % addition level of resin, will contain less than about 250 parts per billion (ppb) of CPD, more preferably less than about 100 ppb of CPD, even more preferably less than about 50 ppb of CPD and even more preferably less than about 10 ppb of CPD when stored for periods as long as 2 weeks, more preferably as long as at least 6 months, and even more preferably as long as at least one year. Moreover, paper products according to the present invention, made with about a 1 wt % addition level of resin, will have an increase in CPD content of less than about 250 ppb, more preferably less than about 100 ppb of CPD, even more preferably less than about 50 ppb of CPD, even more preferably less than about 10 ppb of CPD, and even more preferably less than about 1 ppb of CPD when stored for periods as long as 2 weeks, more preferably as long as at least 6 months, and even more preferably as long as at least one year. In other words, the paper products according to the present invention have storage stability and will not generate excessive CPD content in paper products when the paper products are stored as little as one day and for periods of time greater than one year. Thus, the resins according to the present invention give minimal formation of CPD in paper products, particularly those exposed to aqueous environments, especially hot aqueous environments, e.g., tea bag, coffee filters, etc. Further examples of paper products include packaging board grade, and tissue and towel grade.

Paper can be made by adding the resin at addition levels other than about 1 wt %; however, the CPD content should be corrected for the addition level. For example, for a paper product made by adding the resin at a 0.5 wt % addition level having a measured CPD content of 50 ppb, the corrected CPD on a 1 wt % addition level basis will be 100 ppb (50 ppb/0.5 percent addition level).

To measure CPD in paper products, the paper product is extracted with water according to the method described in European standard EN 647, dated October 1993. Then 5.80 grams of sodium chloride is dissolved into 20 ml of the water extract. The salted aqueous extract is transferred to a 20 gram capacity Extrelut column and allowed to saturate the column for 15 minutes. After three washes of 3 ml ethyl acetate and saturation of the column, the Extrelut column is eluted until 300 ml of eluent has been recovered in about 1 hour. The 300 ml of ethyl acetate extract is concentrated to about 5 ml using a 500-ml Kuderna-Danish concentrating apparatus (if necessary, further concentrating is done by using a micro Kuderna-Danish apparatus). The concentrated extract is analyzed by GC using the instrumentation described in Comparative Example 1. Typically, a flame ionization detector (FID) is first used to analyze the sample. An electrolytic conductivity detector (ELCD) or a halogen-specific detector (XSD) is used when increased sensitivity is needed, especially at less than about 20 ppm of the species to be analyzed. Other sensitive detectors can be used, e.g., electron capture detectors.

Preferably, the resin according to the present invention contains less than 1 part per million (ppm) each of epihalohydrin, e.g., epichlorohydrin, 1,3-DCP, 2,3-DCP and less than 10 ppm of CPD after storage, at 13.5 wt. % total solids content, which, when applied to paper at a dosage of up to 1 wt. % dry basis on fiber, gives a level of less than about 30 ppb of each of epihalohydrin and epihalohydrin byproducts, e.g., epichlorohydrin and 1,3-DCP and 2,3-DCP, and CPD content in paper, and the paper is stable at that level for up to 6 months storage at room temperature, so that after about 6 months, preferably after about 1 year, the level each of these species will be less than about 30 ppb.

Polyaminopolyamide-epichlorohydrin resins comprise the water-soluble polymeric reaction product of epichlorohydrin and polyamide derived from polyalkylene polyamine and saturated aliphatic dibasic carboxylic acid containing from about 2 to about 10 carbon atoms. It has been found that resins of this type impart wet-strength to paper whether made under acidic, alkaline or neutral conditions. Moreover, such resins are substantive to cellulosic fibers so that they may be economically applied thereto while the fibers are in dilute aqueous suspensions of the consistency used in paper mills.

In the preparation of the cationic resins contemplated for use herein, the dibasic carboxylic acid is first reacted with the polyalkylene polyamine, under conditions such as to produce a water-soluble polyamide containing the recurring groups

—NH(C$_n$H$_{2n}$NH)$_x$—CORCO— where n and x are each 2 or more and R is the divalent hydrocarbon radical of the dibasic carboxylic acid. This water soluble polyamide is then reacted with an epihalohydrin to form the water-soluble cationic thermosetting resins.

The dicarboxylic acids contemplated for use in preparing the resins of the invention are the saturated aliphatic dibasic carboxylic acids containing from 2 to 10 carbon atoms such as oxalic acid, malonic acid, succinic acid, glutaric acid, adipic acid, azelaic acid and the like. The saturated dibasic acids having from 4 to 8 carbon atoms in the molecule, such as adipic and glutaric acids are preferred. Blends of two or more of the saturated dibasic carboxylic acids may also be used. Derivatives of dibasic carboxylic acids, such as esters, half-esters and anhydrides can also be used in the present invention, such as dimethyl adipate, diethyl adipate, dimethyl glutarate, diethyl glutarate, dimethyl succinate and diethyl succinate. Blends of two or more of derivatives of dibasic carboxylic acids may also be used, as well as blends of one or more derivatives of dibasic carboxylic acids with dibasic carboxylic acids.

A variety of polyalkylene polyamines including polyethylene polyamines, polypropylene polyamines, polybutylene polyamines, polypentylene polyamines, polyhexylene polyamines and so on and their mixtures may be employed of which the polyethylene polyamines represent an economically preferred class. More specifically, the polyalkylene polyamines contemplated for use may be represented as polyamines in which the nitrogen atoms are linked together by groups of the formula —C$_n$H$_{2n}$— where n is a small integer greater than unity and the number of such groups in the molecule ranges from two up to about eight. The nitrogen atoms may be attached to adjacent carbon atoms in the group —C$_n$H$_{2n}$— or to carbon atoms further apart, but not to the same carbon atom. This invention contemplates not only the use of such polyamines as diethylenetriamine, triethylenetetramine, tetraethylenepentamine and dipropylenetriamine, which can be obtained in reasonably pure form, but also mixtures and various crude polyamine materials.

For example, the mixture of polyethylene polyamines obtained by the reaction of ammonia and ethylene dichloride, refined only to the extent of removal of chlorides, water, excess ammonia, and ethylenediamine, is a satisfactory starting material. The term "polyalkylene polyamine" employed in the claims, therefore, refers to and includes any of the polyalkylene polyamines referred to above or to a mixture of such polyalkylene polyamines and derivatives thereof. Additional polyamines that are suitable for the present invention include; bis-hexamethylenetriamine (BHMT), methylbisaminopropylamine (MBAPA), other polyalkylene polyamines (e.g., spermine, spermidine). Preferably, the polyamines are diethylenetriamine, triethylenetetramine, tetraethylenepentamine and dipropylenetriamine.

It is desirable, in some cases, to increase the spacing of secondary amino groups on the polyamide molecule in order to change the reactivity of the polyamide-epichlorohydrin complex. This can be accomplished by substituting a diamine such as ethylenediamine, propylenediamine, hexamethylenediamine and the like for a portion of the polyalkylene polyamine. For this purpose, up to about 80% of the polyalkylene polyamine may be replaced by molecularly equivalent amount of the diamine. Usually, a replacement of about 50% or less will serve the purpose.

Appropriate aminocarboxylic acids containing at least three carbon atoms or lactams thereof are also suitable for use to increase spacing in the present invention. For example, 6-aminohexanoic acid and caprolactam.

Polyaminoureylene-epihalohydrin resins, particularly polyaminoureylene-epichlorohydrin resins, are also contemplated in the present invention, such as discussed in U.S. Pat. Nos. 4,487,884 and 3,311,594, which are incorporated by reference in their entireties, such as Kymene®450 type of resins (Hercules Incorporated, Wilmington, Del.). The polyaminoureylene resins contemplated for preparation and use herein are prepared by reacting epichlorohydrin with polyaminoureylenes containing free amine groups. These polyaminoureylenes are water-soluble materials containing tertiary amine groups and/or mixtures of tertiary amine groups with primary and/or secondary amino groups and/or quaternary ammonium groups. However, tertiary amino groups should account for at least 70% of the basic nitrogen groups present in the polyaminoureylene. These polyaminoureylenes may be prepared by reacting urea or thiourea with a polyamine containing at least three amino groups, at least one of which is a tertiary amino group. The reaction can, if desired, be carried out in a suitable solvent such as xylene.

The polyamine reactant should preferably have at least three amino groups, at least one of which is a tertiary amino group. the polyamine reactant may also have secondary amino groups in limited amounts. Typical polyamines of this type suitable for use as hereinabove described are methyl bis(3-aminopropyl)amine (MBAPA), methyl bis(2-aminoethyl)amine, N-(2-aminoethyl)piperazine, 4,7-dimethyltriethylenetetramine and so on, which can be obtained in reasonably pure form, but also mixtures of various crude polyamine materials.

To prepare the prepolymer from diacid and polyalkylenepolyamine, a mixture of the reactants is preferably heated at a temperature of about 125–200° C. for preferably about 0.5 to 4 hours, at atmospheric pressure. Where a reduced pressure is employed, lower temperatures such as 75° C. to 150° C. may be utilized. This polycondensation reaction produces water as a byproduct, which is removed by distillation. At the end of this reaction, the resulting product is dissolved in water at a concentration of about 50% by weight total polymer solids.

Where diester is used instead of diacid, the prepolymerization can be conducted at a lower temperature, preferably about 100–175° C. at atmospheric pressure. In this case the byproduct will be an alcohol, the type of alcohol depending upon the identity of the diester. For instance, where a dimethyl ester is employed the alcohol byproduct will be methanol, while ethanol will be the byproduct obtained from a diethyl ester. Where a reduced pressure is employed, lower temperatures such as 75° C. to 150° C. may be utilized.

In converting the polyamide, formed as above described, to a cationic thermosetting resin, it is reacted with epichlorohydrin at a temperature from above about 0° C., more preferably about 25° C., to about 100° C., and preferably between about 35° C. to about 70° C. until the viscosity of a 20% solids solution at 25° C. has reached about C or higher on the Gardner Holdt scale. This reaction is preferably carried out in aqueous solution to moderate the reaction. Although not necessary, pH adjustment can be done to increase or decrease the rate of crosslinking.

When the desired viscosity is reached, sufficient water can be added to adjust the solids content of the resin solution to the desired amount, i.e., about 15 wt % more or less, the product can be cooled to about 25° C. and then stabilized to permit storage by improving the gelation stability by adding sufficient acid to reduce the pH to less than about 6, preferably less than about 5, and most preferably less than about 4. Any suitable inorganic or organic acid such as hydrochloric acid, sulfuric acid, methanesulfonic acid, nitric acid, formic acid, phosphoric acid and acetic acid may be used to stabilize the product. Non-halogen containing acids, such as sulfuric acid, are preferred.

In the polyamide-epichlorohydrin reaction, it is preferred to use sufficient epichlorohydrin to convert most of the secondary amine groups to tertiary amine groups. For prepolymers that contain tertiary amine groups, it is preferred to use sufficient epichlorohydrin to convert most of the tertiary amine groups to quaternary amine groups. However, more or less may be added to moderate or increase reaction rates. In general, satisfactory results may be obtained utilizing from about 0.5 mole to about 1.8 moles of epichlorohydrin for each secondary amine group of the polyamide. It is preferred to utilize from about 0.6 mole to about 1.5 moles for each secondary amine group of the polyamide.

Epichlorohydrin is the preferred epihalohydrin for use in the present invention. The present application refers to epichlorohydrin specifically in certain instances, however, the person skilled in the art will recognize that these teachings apply to epihalohydrin in general.

As to the CPD-forming species, not to be limited by theory, it is believed that the acid groups in, for example, polyaminopolyamides, react with epichlorohydrin during production of, e.g., polyaminopolyamide-epichlorohydrin resins, to form a small amount of chlorohydroxypropyl ester species (hereinafter also referred to as CPD ester) on the resin backbone. Hydrolysis of CPD ester upon aging would yield CPD and regenerate the acid group.

Without wishing to be limited by theory, it is noted that epichlorohydrin is more reactive with secondary amine than with acid groups. Therefore, by having a lower value of epihalohydrin, the epihalohydrin will preferentially react with the secondary amine than with acid groups. Also, as the epichlorohydrin to secondary amine ratio increases there are more CPD forming species, and would be more CPD forming species to remove. Still further, if excess of epichlorohydrin is present, after the secondary amines react with the epichlorohydrin, there would still be epichlorohydrin present to react with the acid groups, which would be capable of forming the CPD-forming species. Accordingly, it is preferred that the epihalohydrin to secondary amine group molar ratio be less than 1, more preferably less than about 0.975, with a preferred range being about 0.5 to 0.975, a more preferred range being about 0.8 to 0.975.

Any procedure can be utilized to remove or reduce the amount of already produced CPD-forming species, including CPD-forming species that may already be present in the resin. For example, the resin can be formed under conditions that prevent and/or reduce the formation of CPD-forming species on the polymer backbone and/or inhibit the CPD-forming ability of already produced species. Moreover, the resin can be treated, preferably as a last step in its production, or immediately subsequent to its production, to remove, reduce and/or inhibit the CPD-forming species. Thus, in one aspect, the invention comprises processes for reducing the CPD-forming species, especially in resins that have low amounts of at least one of epihalohydrins, epihalohydrin hydrolysis by-products and organic halogen bound to the polymer backbone. In particular, the resin can comprise low residual resins such as disclosed in U.S. Pat. Nos. 5,189,142, 5,239,047 and 5,364,927, 5,516,885, WO 92/22601, WO 93/21384, U.S. application Ser. No. 08/482,398, now U.S. Pat. No. 5,972,691, WO 96/40967, and U.S. Pat. Nos. 5,470,742, 5,843,763 and 5,871,616. The disclosures of each of these documents is incorporated by reference in their entireties. For example, the concentration of hydrolyzates in the wet strength composition can be preferably less than about 100 ppm (parts per million by weight relative to the total weight of aqueous solution containing wet strength resins), more preferably less than about 50 ppm (parts per million by weight relative to the total weight of aqueous solution containing wet strength resins), more preferably less than about 10 ppm (parts per million by weight relative to the total weight of aqueous solution containing wet strength resins), more preferably less than about 5 ppm (parts per million by weight relative to the total weight of aqueous solution containing wet strength resins), and even more preferably less than about 1 ppm (parts per million by weight relative to the total weight of aqueous solution containing wet strength resins).

For example, with respect to the removal, reduction and/or inhibition of CPD-forming species in the resin, the following preferred non-limiting procedures are noted. It is noted that procedures for removing, reducing and/or inhibiting the CPD-forming species in the resin can be used alone or in combination.

The CPD-forming species in the resin can be reduced and/or removed by treating the resin with an acid to lower the pH of the solution to a pH less than about 2, more preferably less than about 1, and the pH can be as low as 0.5, or even as low as 0.1, for a sufficient period of time and at a sufficient temperature to remove and/or reduce CPD-forming species in the resin to obtain a storage stable product. In particular, the temperature is preferably at least about 30° C., more preferably at least about 40° C., and even more preferably at least 50° C., with the upper temperature being preferably less than about 140° C. Preferably, the temperature ranges from about 30° C. to 140° C., more preferably about 40° C. to 90° C., and most preferably from about 50° C. to 80° C. The time of treatment can be made shorter with increasing temperature and decreasing pH, and is preferably at least about 2 hours, with the time of treatment being preferably about 24 hours at 50° C., and preferably about 2 hours at 90° C. Preferred combinations of temperature, time and pH, include at 50° C., a pH of about 1 and a treatment time of about 24 hours; at 60° C., a pH of about 1, and a treatment time of about 12 hours; at 70° C., a pH of about 1, and a treatment time of about 6 hours; and at 80° C., a pH of about 1, and a treatment time of about 3 hours.

When referring to the pH, reference is being made to the pH of the solution immediately after addition of the acidic agent. The pH can vary after addition of the acidic agent, or can be maintained at the initial pH. Preferably, the initial pH is maintained.

The resin solids for acid treatment can be at least about 1 wt %, preferably at least about 2 wt %, more preferably at least about 6 wt %, more preferably at least about 8 wt %, and most preferably at least about 10 wt %. The resins solids can be up to about 40 wt %, preferably up to about 25 wt %.

Both organic and inorganic acids can be used herein in the present invention. An acid is defined as any proton donor (see *Advanced Organic Chemistry, Third Ed.;* Jerry March; John Wiley & Sons: New York, 1985, p 218–236, incorporated herein by reference.) Suitable acids include hydrochloric acid, sulfuric acid, methanesulfonic acid, nitric acid, formic acid, phosphoric and acetic acid. Non-halogen containing acids, such as sulfuric acid, are preferred.

It is noted that the acid treatment reduces the wet strength effectiveness of the resin. However, the effectiveness can preferably be recovered by a base treatment of the acid-treated resin. Not to be limited by theory, it is believed that the effectiveness increase is due to an increase in the molecular weight of the polymer during the crosslinking base treatment. Moreover, it would appear that if the base-treated resin were not long-term stabilized against gelation with an acid treatment, an additional effectiveness boost would also be likely due to the conversion of aminochlorohydrin to the more reactive epoxide. The base treatment is performed at a pH of at least about 7, more preferably at least about 8, with a preferred range of about 8 to 12. The base temperature is preferably about 40° C., more preferably about 50° C., even more preferably about 60° C., and can be as high as at least about 70° C., and even as high as about 100° C.

The base treatment time is determined by the desired level of crosslinking. The preferred Gardner-Holdt viscosity is dependent upon solids. At about 12 wt % resin solids, a Gardner-Holt viscosity of about A-M is preferred, with B-H being more preferred. Within limits, the higher the crosslinking temperature and pH, the faster the rate of crosslinking. It is preferred to perform the base treatment for about 0.5 to 6 hours, more preferably about 1 to 4 hours.

Both organic and inorganic bases can be used as the basic agent in the base treatment. A base is defined as any proton acceptor (see *Advanced Organic Chemistry, Third Ed.;* Jerry March; John Wiley & Sons: New York, 1985, p 218–236, incorporated herein by reference.) Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides, alkaline earth alkoxides, and alkali metal phosphates, such as sodium phosphate and potassium phosphate. Preferably, the base will be alkali metal hydroxides (lithium hydroxide, sodium hydroxide and potassium hydroxide) or alkali metal carbonates (sodium carbonate and potassium carbonate). Most preferably, the base comprises inorganic bases including sodium hydroxide and potassium hydroxide, which are especially preferred for their low cost and convenience.

The base treated resin can be used without further treatment, especially when the resin is to be used without storage. Thus, the resin can be treated directly prior to application, e.g., in papermaking. However, if the resin is to be stored, it is preferred to add an acid to the base treated resin to lower the pH to less than about 6.0, with a preferred range being about 2.5 to 4.0. The stabilizing acid can be any suitable inorganic or organic acid such as hydrochloric acid, sulfuric acid, methanesulfonic acid, nitric acid, formic acid, phosphoric and acetic acid. Non-halogen containing acids, such as sulfuric acid, are preferred.

The amount of CPD-forming species can be determined using the following test. A portion of resin to be tested is charged into a container containing a stirrer. The pH is adjusted to 1.0 with 96 wt % sulfuric acid. The container is closed and placed in a 50° C. water bath and maintained at 50° C. with stirring. An aliquot is removed from the container at 24 hours, and submitted for GC analysis in the manner described in Comparative Example 1 to provide an indication of the CPD-forming species. The CPD-forming species at 24 hours preferably produces less than about 1000 ppm dry basis of CPD, more preferably less than about 750 ppm dry basis of CPD, even more preferably less than about 500 ppm dry basis of CPD, even more preferably less than about 250 ppm dry basis of CPD, even more preferably less than about 150 ppm dry basis of CPD, even more preferably less than about 100 ppm dry basis of CPD, even more preferably less than about 75 ppm dry basis of CPD, even more preferably less than about 50 ppm dry basis of CPD, even more preferably less than about 25 ppm dry basis of CPD, even more preferably less than about 15 ppm dry basis of CPD, even more preferably less than about 5 ppm dry basis of CPD, even more preferably less than about 3 ppm dry basis of CPD, and even more preferably less than about 1 ppm dry basis of CPD.

The resin having at least reduced levels of formation of CPD can be a resin as produced in a resin synthesis process without further treatment. Moreover, the resin can be treated by various processes prior to reduction and/or removal of the CPD-forming species. Still further, after treatment to reduce and/or remove CPD-forming species, the resin can be treated by various processes. Yet still further, the resin can be treated by various processes prior to reduction and/or removal of the CPD-forming species, and the resin can also be treated by various processes after treatment to reduce and/or remove CPD-forming species. For example, the resin can be treated by various processes, such as processes to remove low molecular weight epihalohydrin and epihalohydrin by-products, e.g., epichlorohydrin and epichlorohydrin by-products, for example, CPD in the resin solution. Without limiting the treatments or resins that can be utilized, it is noted that resins, such as Kymene®SLX2, Kymene®617 and Kymene®557LX (available from Hercules Incorporated, Wilmington, Del.), could be treated prior to and/or subsequent to reduction or removal of CPD-forming species with a base ion exchange column, such as disclosed in U.S. Pat. No. 5,516,885 and WO 92/22601; with carbon adsorption, such as disclosed in WO 93/21384; membrane separation, e.g., ultrafiltration; extraction, e.g, ethyl acetate, such as disclosed in U.S. Statutory Invention Registration H1613; or biodehalogenation, such as disclosed in U.S. application Ser. No. 08/482,398, now U.S. Pat. No. 5,972,691, WO 96/40967 and U.S. Pat. Nos. 5,470,742, 5,843,763 and 5,871,616. The disclosures of each of these documents is incorporated by reference in their entireties.

For example, with respect to biodehalogenation, such as disclosed in any one of U.S. Pat. Nos. 5,470,742; 5,843,763 and 5,871,616, or previous base treatment and biodehalogenation as disclosed in U.S. application Ser. No. 08/482,398, now U.S. Pat. No. 5,972,691, and WO 96/40967, with or without a previous inorganic base treatment, the wet strength composition may be reacted with a microorganism or enzyme in adequate quantities to process epihalohydrin hydrolyzates to very low levels. Microorganisms use dehalogenase enzymes to liberate halide ion from the epihalohydrin and haloalcohol and then use further enzymes to break down the reaction products ultimately to carbon dioxide and water.

While not wishing to be bound by theory, it is noted that when the CPD-forming species is removed or reduced, CPD is released from the oligomeric and/or polymeric component of the resin and therefore CPD is a component of the resin solution. With this in mind, the resin is preferably subjected to treatment to remove or reduce the CPD-forming species, and then the resin is biodehalogenated. In this manner, epihalohydrin and epihalohydrin hydrolyzate (also referred to as hydrolysis by-products), including released CPD, can be removed, such as by the biodehalogenation. However, the resin can be initially treated, such as by biodehalogenation, and then subjected to treatment to remove, inhibit and/or reduce the CPD-forming species. In particular, any CPD that will be released by the treatment should be readily soluble, and can therefore be at least partially washed away from the resin. For example, when the resin with released CPD is included in a paper product, the CPD can be at least partially washed out of the paper product, and, due to the treatment, the resin in the paper product will not produce CPD or will not produce undesirable amounts of CPD.

Exemplary microorganisms which contain dehalogenating enzymes capable of dehalogenating haloalcohols and epihalohydrins have been found in the following species:

| NAME | NCIMB[1] DEPOSIT IDENTITY |
|---|---|
| Arthrobacter histidinolovorans | 40274 |
| Arthrobacter erithii | 40271 |
| Agrobacterium tumefaciens | 40272 |
| Rhodococcus dehalogenans | 40383 |
| Pseudomonas cepacia | 40273 |

[1]NCIMB stands for "National Collection of Industrial and Marine Bacteria". NCIMB, located at 23 St. Machar Drive, Aberdeen AB2 1RY, Scotland, UK is an organization in the United Kingdom responsible for documenting and retaining samples of bacteria submitted for patent application purposes. In patent matters, NCIMB will supply to interested parties who so request, authentic samples of bacteria claimed in patent literature.

Mixtures of the foregoing can also be employed. Several strains of microorganisms from these species have been found to generate enzymes suitable for the process. NCIMB 40271, 40272, 40273 and 40274 were deposited on Apr. 2, 1990. NCIMB 40383 was deposited on Mar. 11, 1991.

Such microorganisms are conventional. Such microorganisms are obtainable by batch or continuous enrichment culture. Inoculation of enrichment isolation media with soil samples taken from organohalogen-contaminated soil results in mixed microbial communities, which can be sub-cultured, in a plurality of subculturing steps (preferably 2 to 5 subculturing steps), using increasing concentrations of the particular organohalogen-containing compound for which selection is sought.

The microorganisms containing suitable enzymes are suitably used to dehalogenate the epihalohydrin hydrolyzates contained in the wet strength composition with or without an initial inorganic base treatment. The enzymes and microorganisms are maintained in a suitable concentration to substantially metabolize the hydrolyzates to chloride ion and ultimately carbon dioxide and water. Thus the concentration of hydrolyzates in the wet strength composition after treatment is preferably less than about 100 ppm (parts per million by weight relative to the total weight of aqueous solution containing wet strength resins after the bioreaction step), more preferably less than about 50 ppm (parts per million by weight relative to the total weight of aqueous solution containing wet strength resins after the bioreaction step), more preferably less than about 10 ppm (parts per million by weight relative to the total weight of aqueous solution containing wet strength resins after the bioreaction step), more preferably less than about 5 ppm (parts per million by weight relative to the total weight of aqueous solution containing wet strength resins after the bioreaction step), and even more preferably less than about 1 ppm (parts per million by weight relative to the total weight of aqueous solution containing wet strength resins after the bioreaction step).

To achieve this, the concentration of microorganisms should be at least about $5 \times 10^7$ cells/ml, preferably at least about $10^8$ cells/ml and most preferably at least about $10^9$ cells/ml. To maintain optimum active content of cells in the reactor, the reaction is best carried out at about 30° C.+/−5° C. in the presence of oxygen (e.g., from about 5 to about 100% DOT) and nutrients in a stirred tank reactor. As used herein, the term "DOT" refers to "dissolved oxygen tension" and is the amount of oxygen, expressed as a percentage, dissolved in a given volume of water relative to oxygen-saturated water at the same temperature and pressure. The residence time is controlled by flow rate and monitored to ensure complete reaction. Thus, at steady state the concentration of epihalohydrin hydrolyzates in the reactor will be from about 1 to about 1000 ppm.

The present invention also includes the reaction of an enzyme with the organohalogen compound, whereby the organohalogen is dehalogenated. As used herein, the term "enzyme" refers to any dehalogenase, i.e., any enzyme capable of dehalogenating a nitrogen-free organohalogen compound. Preferably, the enzyme is obtained from a living cell, which is thereafter used for the dehalogenation of nitrogen-free organohalogen compounds. Suitable enzymes include those produced by the microorganisms identified above.

Although the precise identity of the enzymes of the method has not been determined, the enzymes which effectuate the method belong to the class of enzymes variously termed "haloalcohol dehalogenases" or "hydrogen halide lyase type dehalogenases" or "halohydrin hydrogen-halide lyases".

Thus, for dehalogenation, the invention contemplates the use of either living cells or an immobilized, unrefined cell-free extract or refined dehalogenase. The term "biodehalogenation" refers to the dehalogenation of an organohalogen compound using such materials.

In general, if an enzyme is employed, the enzyme may be added to the composition in an amount of from about $2.5 \times 10^{-6}$ to $1 \times 10^{-4}$ weight percent, based on the weight of the composition. However, the enzyme is preferably added to the composition in an amount of from about $2.5 \times 10^{-5}$ to $0.75 \times 10^{-4}$ weight percent, most preferably in an amount of from about $4 \times 10^{-5}$ to $6 \times 10^{-5}$ weight percent, based on the weight of the composition.

Suitable biocatalysts can also be employed. Such biocatalysts can be readily selected by those of ordinary skill in the art. *Agrobacterium tumefaciens* HK7 (NCIMB 40313) represents another biocatalyst for use in the method of the present invention. NCIMB 40313 was deposited on Aug. 30, 1990. *Agrobacterium tumefaciens* HK7, as deposited under NCIMB 40313, based upon recent tests may be *Agrobacterium radiobacter* biovar 1, which one having ordinary skill in the art would expect to having similar activities as *Agrobacterium tumefaciens* HK7. The most preferred biocatalyst for use in the method of the present invention is a two-component mixture of one or both of *Agrobacterium tumefaciens* HK7 and *Agrobacterium radiobacter* biovar 1 with *Arthrobacter histidinolovorans*. To ensure that both bacteria are present in the biodehalogenation process, it is preferred to start the process with one or both of *Agrobacterium tumefaciens* and *Agrobacterium radiobacter* biovar 1, and to subsequently add the *Arthrobacter histidinolovorans*. This would especially be the situation wherein the biodehalogenation process is run in a continuous mode.

As noted above, although the precise identity of the enzymes which make the method operable has not been made, it is believed that the enzymes which effectuate the method belong to the class of enzymes termed "hydrogen halide lyase type dehalogenase".

The method of biodehalogenation in accordance with the present invention is carried out by contacting a microorganism or cell-free enzyme-containing extract with the aqueous composition containing the unwanted organohalogen contaminants. Such contact is typically achieved by forming a slurry or suspension of the microorganism or cell-free extract in the aqueous composition, with sufficient stirring.

If desired, the microorganism or enzymes can be removed from the product stream by filtration, sedimentation, centrifugation or other means known to those skilled in the art. Alternatively the microorganisms or enzymes can remain in the final product and optionally deactivated by thermal sterilization (e.g., by treatment at 140° C. for 20 seconds) or by the addition of a suitable concentration of a suitable biocidal agent. Suitable biocidal agents can be readily selected by those of ordinary skill in the art. Thus, deactivation of the microorganism can be performed by reducing the pH of the aqueous mixture to 2.8, then adding a proprietary biocidal agent (e.g. Proxell® BD biocidal agent, which comprises 1,2-benzisothiazolin-3-one) in sufficient quantity, normally 0.02% to 0.1%, based on the weight of the aqueous composition. The biocidal agent may be added along with potassium sorbate.

The removal of the microorganism may be performed by one or more of the steps of filtration, centrifugation, sedimentation, or any other known techniques for removing microbes from a mixture. The microorganisms mineralize the nitrogen-free organohalogen compounds, producing $CO_2$, water, and biomass, with no glycerol left in the resin. Where the biocatalyst is an immobilized dehalogenase, the product of the reaction is glycidol.

A problem associated with the removal of the microbes from the mixture is that intensive methods of separation, such as microfiltration, remove not only microbes but also particles of cationic polymer, with the result that the wet strength properties are reduced, which is undesirable. Therefore, it is preferable to leave the deactivated microorganism in the mixture to avoid the problem of reducing wet strength properties.

The CPD-forming species in the resin can also be reduced, and/or inhibited and/or removed by base treatment. In particular, the resin can be treated with at least one basic agent to raise the pH of the solution containing the polyamine-epihalohydrin resin to a pH of at least about 8, more preferably at least about 9, more preferably at least about 10, with a preferred upper limit being about 12.5, and a preferred pH range of about 10 to 12 for a sufficient period of time and at a sufficient temperature to remove and/or inhibit CPD-forming species in the resin to obtain a storage stable product. The temperature is preferably at least about 20° C., more preferably at least about 40° C., even more preferably at least about 50° C., even more preferably at least about 55° C., and even more preferably at least about 60° C., with the upper temperature being preferably less than about 80° C., and can be as high as 100° C.

It is understood that the temperature, time and pH are related so that as the temperature and pH are increased, the time of base treatment can be shortened to remove the CPD-forming species. Thus, the time of treatment can be made shorter with increasing temperature and pH, and is preferably at least about 1 minute, even more preferably at least about 3 min, and most preferably at least about 5 min. The treatment time can be as long as about 24 hours, but is preferably up to about 4 hours and most preferably up to about 1 hour. Preferred combinations of temperature, time and pH include the time of treatment preferably being about 5 minutes at 50° C. and pH of 11.5, and 5 minutes at 55° C. and a pH of 10.5 to 11.5. Without being wished to be bound by theory it is noted that for higher pH's, shorter periods of time should be used, because the molecular weight of the resin may get too high and the solution can gel.

For base treatment according to the present invention, the polyamide-epihalohydrin reaction, preferably polyamide-epichlorohydrin reaction, has an epihalohydrin, preferably epichlorohydrin, to secondary amine group molar ratio of less than 1, more preferably less than about 0.8, with a preferred range being about 0.5 to 0.8, and a preferred value being about 0.8. Thus, in other words and being exemplary with respect to epichlorohydrin, less than 1 mole of epichlorohydrin is utilized for each secondary amine group of the polyamide, and more preferably less than about 0.8 mole of epichlorohydrin is utilized for each secondary amine group.

As noted above and without wishing to be limited by theory, it is noted that epichlorohydrin is more reactive with secondary amine than with acid end groups. Therefore, by having a lower value of epichlorohydrin, the epichlorohydrin will preferentially react with the secondary amine than with acid end groups. Also, as the epichlorohydrin to secondary amine ratio increases there are more CPD forming species, and would be more CPD forming species to remove when base treating. Still further, if excess of epichlorohydrin is present, after the secondary amines react with the epichlorohydrin, there would still be epichlorohydrin present to react with the acid end groups, which would be capable of forming the CPD-forming species.

It is further noted that there may actually be an increase of CPD during base treatment, such as when Kymene®ULX is base treated. However, as discussed above, any CPD that will be released by the treatment should be readily soluble, and can therefore be at least partially washed away from the resin. For example, when the resin with released CPD is included in a paper product, the CPD can be at least partially washed out of the paper product, and, due to the treatment, the resin in the paper product will not produce CPD or will not produce undesirable amounts of CPD. Still further, during base treatment, the CPD is reacted to glycidol, which is hydrolyzed to glycerol.

The resin solids for base treatment, based upon the weight of the composition, can be at least about 1%, preferably at least about 2%, preferably at least about 6%, more preferably at least about 8% and most preferably at least about 10%. The resin solids for base treatment can be up to about 40 wt %, preferably up to about 25 wt %, and most preferably up to about 15 wt %. After base treatment, the resin can be diluted, typically, with water.

When referring to the pH, reference is being made to the pH of the solution immediately after addition of the basic agent. The pH can vary after addition of the basic agent, or can be maintained at the initial pH.

Both organic and inorganic bases can be used as the basic agent in the present invention. A base is defined as any proton acceptor (see *Advanced Organic Chemistry, Third Ed.;* Jerry March; John Wiley & Sons: New York, 1985, p 218–236, incorporated herein by reference.) Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides, alkaline earth alkoxides, and alkali metal phosphates, such as sodium phosphate and potassium phosphate. Preferably, the base will be alkali metal hydroxides (lithium hydroxide, sodium hydroxide and potassium hydroxide) or alkali metal carbonates (sodium carbonate and potassium carbonate). Most preferably, the base comprises inorganic bases including sodium hydroxide and potassium hydroxide, which are especially preferred for their low cost and convenience.

After the base treatment, the resin is preferably stabilized and stored prior to use. The resin can be stabilized by the addition of an acid in a manner as discussed above. Thus, the product can be stabilized to permit storage by improving the gelation stability by adding sufficient acid to reduce the pH to less than about 6, preferably less than about 5, and most preferably less than about 4, with a preferred range being a pH from about 2.5 to 4. As noted above, any suitable inorganic or organic acid such as hydrochloric acid, sulfuric acid, methanesulfonic acid, nitric acid, formic acid, phosphoric and acetic acid may be used to stabilize the product. Non-halogen containing acids, such as sulfuric acid, are preferred.

According to the present invention, the resin is storage stable with respect to CPD and gelation. With respect to gelation, the resin is storage stable, when stored at 25° C., for at least two days, and is more preferably stable for at least one week, more preferably for at least one month, more preferably for at least three months, and is even more preferably for at least six months.

The acid stabilization is preferably performed about 1 minute to about 24 hours after base treatment, preferably about 1 minute to about 6 hours, most preferably about 1 minute to about 1 hour after the base treatment. The acid stabilized resin can be stored for extended period of time, such as greater than about 6 months. Of course, the stabilized resin can be used at any time after stabilization including about 1 minute to 24 weeks after acidification, about 1 minute to 2 weeks after acidification, and about 1 minute to 24 hours after acidification.

As with the acid treatment to remove, inhibit and/or reduce CPD-forming species, for the base treatment, the resin having at least reduced levels of formation of CPD can be a resin as produced in a resin synthesis process without further treatment. Moreover, the resin can be treated by various processes prior to reduction and/or removal of the CPD-forming species. Still further, after treatment to reduce and/or remove CPD-forming species, the resin can be treated by various processes. Yet still further, the resin can be treated by various processes prior to reduction and/or removal of the CPD-forming species, and the resin can also be treated by various processes after treatment to reduce and/or remove CPD-forming species. For example, the resin can be treated by various processes, such as processes to remove low molecular weight epihalohydrin and epihalohydrin by-products, e.g., epichlorohydrin and epichlorohydrin by-products, for example, CPD in the resin solution. Without limiting the treatments or resins that can be utilized, it is noted that resins, such as Kymene®SLX2, Kymene®617 and Kymene®557LX (available from Hercules Incorporated, Wilmington, Del.), could be treated prior to and/or subsequent to reduction or removal of CPD-forming species with a base ion exchange column, such as disclosed in U.S. Pat. No. 5,516,885 and WO 92/22601; with carbon adsorption, such as disclosed in WO 93/21384; membrane separation, e.g., ultrafiltration; extraction, e.g, ethyl acetate, such as disclosed in U.S. Statutory Invention Registration H1613; or biodehalogenation, such as disclosed in U.S. application Ser. No. 08/482,398, now U.S. Pat. No. 5,972,691, WO 96/40967 and U.S. Pat. Nos. 5,470,742, 5,843,763 and 5,871,616. The disclosures of each of these documents is incorporated by reference in their entireties. In particular, one preferred manner of applying base treatment to remove or reduce CPD-forming species includes base treatment after biodehalogenation of the resin.

As another method to produce polyamine-epihalohydrin resin products which have reduced levels of formation of CPD upon storage and minimized levels of CPD in paper products is by treating the resin utilizing either organic or inorganic bases, or organic or inorganic acids, such as described above, to raise or lower the pH of the resin solution to a pH less than 7, with a preferred pH range being about 5.5 to less than 7, with one preferred pH being about 6 for a sufficient period of time and at a sufficient temperature to remove and/or inhibit CPD-forming species in the resin. This method of treatment is referred to herein as the pH modified treatment. Preferably, the base comprises alkali metal hydroxides (lithium hydroxide, sodium hydroxide and potassium hydroxide) or alkali metal carbonates (sodium carbonate and potassium carbonate) or alkali metal bicarbonates (sodium bicarbonate and potassium bicarbonate). Preferred acids include hydrochloric acid, sulfuric acid, methanesulfonic acid, nitric acid, formic acid, phosphoric acid and acetic acid. Non-halogen containing acids, such as sulfuric acid, are preferred.

The time of treatment can be made shorter with increasing temperature and increasing pH. The temperature is preferably within the range of about 30° C. to 80° C., the pH is preferably about 6, and the time of treatment is preferably about 3 hours to 14 days, with a preferred time of treatment being up to about 24 hours, more preferably up to about 6 hours. Preferred combinations of temperature, time and pH, include at 30° C., a pH of about 6 and a treatment time of about 6 days; and at 50° C., a pH of about 6, and a treatment time of about 6 hours.

As with the other treatments to remove, inhibit and/or reduce CPD-forming species, for the pH modified treatment, the resin having at least reduced levels of formation of CPD can be a resin as produced in a resin synthesis process without further treatment. Moreover, the resin can be treated by various processes prior to reduction and/or removal of the CPD-forming species. Still further, after treatment to reduce and/or remove CPD-forming species, the resin can be treated by various processes. Yet still further, the resin can be treated by various processes prior to reduction and/or removal of the CPD-forming species, and the resin can also be treated by various processes after treatment to reduce and/or remove CPD-forming species. For the sake of brevity, a complete description of these processes is not being repeated.

As still another method of producing polyamine-epihalohydrin resin products which have reduced levels of formation of CPD upon storage and minimized levels of CPD in paper products, the resin can be treated with other catalysts that will remove and/or reduce the CPD forming species. For example, the resin can be treated with enzymes. Thus, for example, the CPD-forming species in the resin can also be reduced and/or removed by treating the resin with an enzymatic agent that is capable of releasing CPD-forming species from the resin. The enzymatic agent can comprise one or more enzymes that are capable of releasing the CPD-forming species from the resin, such as at least one of esterases, lipases and proteases. A particularly preferred enzymatic agent according to the present invention is ALCALASE, which is obtainable from Novo Nordisk Biochem, North America, Inc. Franklinton, N.C.

It is noted that following the guidelines set forth in the instant application one having ordinary skill in the art would be capable of determining enzymatic agents that are useful to remove CPD-forming species.

The use of enzymatic agents to release the CPD-forming species is beneficial in that base treatment to rebuild molecular weight, such as that which is utilized with an acid treatment is utilized to remove CPD-forming species, as described in the acid treatment embodiment of the present invention, is not needed. However, base treatment to ensure a desired molecular weight can be utilized with the enzymatic aspect of the present invention in a similar manner to the base treatment utilized with the acid treatment. Also, enzyme-treated resin provides greater wet strength effectiveness relative to the acid treatment that utilizes base treatment to rebuild molecular weight.

The at least one enzymatic agent is preferably added to the resin under conditions to provide a concentration of enzyme and suitable conditions to achieve sufficient hydrolysis of CPD forming species in the resin. For example, depending upon the enzymatic agent, the temperature can be at least about 0° C., preferably about 10° C. to 80° C., and more preferably about 20° C. to 60° C. The reaction time can be about 3 minutes to 350 hours, more preferably about 30 minutes to 48 hours, more preferably about 1 hour to 24 hours, and even more preferably about 2 hours to 6 hours. The pH of the enzymatic reactions will depend on the pH dependence of the specific enzyme. The pH can be from about 1 to 11, more preferably about 2 to 10, even more preferably about 2.5 to 9, and even more preferably about 7 to 9. The concentration of the enzyme will depend upon its activity. For example, in the case of ALCALASE, the enzyme can be present in an amount of about 0.0025 g of ALCALASE (as received) to 30 g (as received) polyaminopolyamide-epichlorohydrin resin to 2.5 g of ALCALASE (as received) to 30 g (as received) polyaminopolyamide-epichlorohydrin resin, also the enzyme can be present in an amount of about 0.025 g of ALCALASE (as received) to 30 g (as received) polyaminopolyamide-epichlorohydrin resin to 0.25 g of ALCALASE (as received) to 30 g (as received) polyaminopolyamide-epichlorohydrin resin.

The preferred reaction conditions can be varied by using the appropriate types and amounts of enzymes. For example, if the enzymatic agent has protease activity with a polyaminopolyamide-epichlorohydrin resin, reaction conditions above about pH 8 and 40° C. are practical. Practical being defined as obtaining a reduced CPD-forming resin while having a resin with the desired viscosity.

As with the above-discussed procedures for removing and/or reducing CPD-forming species, the enzyme treatment can be applied on resins as produced in a resin synthesis process without further treatment. Moreover, the resins can be treated by various processes prior to reduction and/or removal of the CPD-forming species. Still further, after treatment to reduce and/or remove CPD-forming species, the resin can be treated by various processes. Yet still further, the resin can be treated by various processes prior to reduction and/or removal of the CPD-forming species, and the resin can also be treated by various processes after treatment to reduce and/or remove CPD-forming species. For the sake of brevity, a complete description of these processes is not being repeated.

While the above-mentioned processes are directed to removal of the CPD forming species from the polymer backbone in a late stage of the resin synthesis, as noted above, there are other approaches directed to the inhibition, reduction and/or elimination of the amount of CPD forming species, such as CPD ester, that can be formed during the epichlorohydrin reaction. Without wishing to be bound by theory, CPD ester is formed by the reaction of epichlorohydrin with residual carboxylic acid groups present in the prepolymer, such as polyaminoamide prepolymer. Usually the carboxylic acid groups are end groups. Reducing the amount of residual carboxylic acid groups present in the prepolymer will result in a reduction of the amount of CPD ester formed in the resin. This may be achieved by reducing, minimizing or completely eliminating carboxylic acid groups (also referred to as acid groups or carboxylic acids) or residual carboxylic acid functionality (also referred to as acid functionality and carboxylic functionality) in the polyaminoamide prepolymer, to thereby obtain, as discussed below, a low acid number prepolymer.

Preferably, the polyaminopolyamide-epihalohydrin resin is produced from a polyaminoamide prepolymer having an acid functionality less than about 0.5 milliequivalents/dry gram of prepolymer, more preferably less than about 0.25 milliequivalents/dry gram of prepolymer, even more preferably less than about 0.1 milliequivalents/dry gram of prepolymer, even more preferably less than about 0.07 milliequivalents/dry gram of prepolymer, and even more preferably less than about 0.05 milliequivalents/dry gram of prepolymer, and most preferably would be undetectable, i.e., it is preferred that the acid functionality be zero or as close to zero as possible.

Expressed in another manner, the polyaminopolyamide-epihalohydrin resin is produced from a polyaminoamide prepolymer having an acid end group concentration of less than about 5% as measured by $^{13}$C NMR analysis, more preferably less than about 2.5%, even more preferably less than about 1%, even more preferably less than about 0.7%, and even more preferably less than about 0.5%, and most preferably would be undetectable, i.e., it is preferred that the acid end group concentration be zero or as close to zero as possible.

The amount of carboxylic acid groups present in a polyaminoamide prepolymer can be determined by spectroscopy (NMR, IR) or by titration. Preferably, the carboxylic acid groups are determined utilizing NMR, because this technique is more sensitive, especially when measuring low amounts of acid groups in the resin, such as when the acid groups are equal to 0.25 milliequivalents/dry gram of prepolymer or less. A typical procedure for determining the acid number of prepolymer by $^{13}$C NMR analysis is described in Example 60 with respect to adipic acid and diethylenetriamine (DETA).

Moreover, as noted above, titration can be utilized to determine the number of acid groups, especially when the number of acid groups is greater than 0.25 milliequivalents/ per dry gram. The procedure for determining the amount of acid groups utilizing titration is set forth in Example 12.

The procedure for determining RSV is also set forth in Example 12.

Preferably, the prepolymer has an RSV of at least about 0.05 dL/g (deciliter per gram), more preferably at least about 0.075 dL/g, even more preferably at least about 0.1 dL/g. The RSV is preferably less than about 0.5 dL/g, more preferably less than about 0.25 dL/g, even more preferably less than about 0.2 dL/g, and even more preferably less than about 0.15 dL/g. The RSV is preferably about 0.075 to 0.2 dL/g, more preferably about 0.1 to 0.15 dL/g.

Preferred combinations of acid functionality of the prepolymer from which the polyamidopolyamine resin is produced and the RSV of the prepolymer are wherein the prepolymer has an acid functionality less than about 0.5 milliequivalents/dry gram of prepolymer and a RSV of about 0.05 to about 0.25 dL/g, more preferably about 0.075 to 0.2 dL/g, and even more preferably about 0.1 to 0.15 dL/g; the prepolymer has an acid functionality of less than about 0.25 milliequivalents/dry gram of prepolymer and a RSV of about 0.05 to about 0.25 dL/g, more preferably about 0.075 to 0.2 dL/g, and even more preferably 0.1 to 0.15 dL/g; the prepolymer has an acid functionality of less than about 0.1 milliequivalents/dry gram of prepolymer and a RSV of about 0.05 to about 0.25 dL/g, more preferably about 0.075 to 0.2 dL/g, and even more preferably about 0.1 to 0.15 dL/g; the prepolymer has an acid functionality of less than about 0.07 milliequivalents/dry gram of prepolymer and a RSV of about 0.05 to about 0.25 dL/g, more preferably about 0.075 to 0.2 dL/g, and even more preferably about 0.1 to 0.15 dL/g; and the prepolymer has an acid functionality of less than about 0.05 milliequivalents/dry gram of prepolymer and a RSV of about 0.05 to about 0.25 dL/g, more preferably about 0.075 to 0.2 dL/g, and even more preferably about 0.1 to 0.15 dL/g.

Preferred combinations of acid end group concentration, as measured by $^{13}$C NMR analysis, of the prepolymer from which the polyamidopolyamine resin is produced and the RSV of the prepolymer are wherein the prepolymer has an acid end group concentration of less than about 5% and a RSV of about 0.05 to about 0.25 dL/g, more preferably about 0.075 to 0.2 dL/g, and even more preferably about 0.1 to 0.15 dL/g; the prepolymer has an acid end group concentration of less than about 2.5% and a RSV of about 0.05 to about 0.25 dL/g, more preferably about 0.075 to 0.2 dL/g, and even more preferably 0.1 to 0.15 dL/g; the prepolymer has an acid end group concentration of less than about 1% and a RSV of about 0.05 to about 0.25 dL/g, more preferably about 0.075 to 0.2 dL/g, and even more preferably about 0.1 to 0.15 dL/g; the prepolymer has an acid end group concentration of less than about 0.7% and a RSV of about 0.05 to about 0.25 dL/g, more preferably about 0.075 to 0.2 dL/g, and even more preferably about 0.1 to 0.15 dL/g; and the prepolymer has an acid end group concentration of less than about 0.5% and a RSV of about 0.05 to about 0.25 dL/g, more preferably about 0.075 to 0.2 dL/g, and even more preferably about 0.1 to 0.15 dL/g.

The choice of dicarboxylic acid or dicarboxylic acid derivative used in the synthesis of the polyaminoamide can have a significant effect on the acid end group concentration of the polyaminoamide and the polyamidopolyamine resin prepared from it. In particular and without wishing to be bound by theory, it is hypothesized that 6 and 7 carbon aliphatic dicarboxylic acids and their derivatives, such as adipic and pimelic acids, and to a lesser extent an 8 carbon aliphatic dicarboxylic acid and its derivatives, such as suberic acid, can undergo side reactions during the course of the polyaminoamide synthesis that result in increased levels of acid end groups. These side reactions are believed to originate with a deprotonation of the carbon alpha to the carbonyl group in the dicarboxylic acid, its derivatives or in the polyaminoamide backbone. The conditions of the polyaminoamide synthesis are conducive to such a deprotonation reaction because of the basic conditions under which the reaction is carried out. The deprotonation reaction is then followed by an intramolecular reaction of the resulting anion with the other carbonyl group of the diacid moiety to form a 5-membered ring in the case of adipic acid, a 6-membered ring in the case of pimelic acid and a 7-membered ring in the case of suberic acid. These cyclic byproducts can generate carboxylic acid end groups either under the conditions of the polyaminoamide synthesis or when the polyaminoamide is dissolved in water. Dicarboxylic acids that have the potential to form 5, 6, and 7-membered rings as a result of this type of intramolecular reaction are less favored than dicarboxylic acids that will not form these structures. The use of glutaric acid or its derivatives significantly reduce the formation of such a cyclic byproduct since the intramolecular reaction would result in the formation of a 4-membered ring which is much less favored energetically than formation of 5, 6, and 7-membered rings. Similarly, succinic acid, malonic acid, oxalic acid, azeleic acids and their derivatives would be expected to have a much lower tendency to undergo this type of side reaction. Moreover, esters are preferred over acids. For example, with respect to the above, it is noted that glutaric acid provides a lower concentration of acid end groups than adipic acid, dimethyl glutarate provides a lower concentration of acid end groups than glutaric acid, dimethyl adipate is preferred over adipic acid, and preferred esters include dimethyl glutarate and dimethyl succinate. Exemplary preferred materials include DBE 4, DBE 5 and DBE 9, which are respectively, dimethyl succinate, dimethyl glutarate, and a 2/1 mixture of dimethyl glutarate/dimethyl succinate, obtainable from Dupont.

One method to minimize carboxylic acid groups is to use endcapping agents in the preparation of the prepolymer (generally referred to herein as "endcapping" or "endcapped prepolymer"). For example, when preparing an endcapped polyaminoamide prepolymer one may replace a portion of the diacid with a monofunctional acid and/or may replace a portion of the polyalkylenepolyamine with a monofunctional amine. Various procedures, conditions and materials can be utilized when preparing the prepolymer, including conventional procedures, conditions and materials, and include those described herein. Starting with an equimolar mixture of diacid and polyalkylenepolyamine, for every 1 mole of diacid or polyalkylenepolyamine removed a quantity of preferably about 2 moles of monofunctional acid or monofunctional amine endcapper is used. In this regard, as the replaced moles of monofunctional acid is lowered below 2, the prepolymer ends up with increased amine end groups, whereas the molecular weight of the prepolymer is lowered as the replaced moles of monofunctional acid is raised above 2 moles. In contrast, as the replaced moles of monofunctional amine is lowered below 2, the prepolymer ends up with acid groups, whereas the molecular weight of the prepolymer is lowered as the replaced moles of monofunctional amine is raised above 2 moles.

One can control the molecular weight of a condensation polymer by adjusting the relative amounts of bifunctional and monofunctional reactants (endcappers) in the system. The theory of molecular weight control and the effect of monofunctional additives for condensation polymer is well known, as see, for example, P. J. Flory, "Principles of Polymer Chemistry", pp. 91–95, Cornell University Press, Ithaca N.Y. (1953), which is incorporated by reference in its entirety. $DP_n$ is defined as the number-average degree of polymerization or the average number of monomer units in a polymer chain. Equation 1 defines the $DP_n$ in terms of the molar ratios of the components, assuming complete reaction of all functional groups.

$$DP_n=(1+r)/(1-r) \quad [1.]$$

where r is defined as the ratio of the monomer units and is calculated as follows:

$$r=A/(B+2C) \quad [2.]$$

A and B are the difunctional monomer components and C is the monofunctional component (end-capper). The quantity r will always be less than 1.

In this invention, a controlled molecular weight prepolymer is prepared by using specific amounts of a monofunctional reactant. The prepolymer composition may be defined in terms of a polyaminoamide prepared from A parts dicarboxylic acid, B parts polyalkylenepolyamine and C parts monofunctional endcapping moiety, all parts given as molar quantities.

When A>B the endcapping moiety will be a monofunctional amine and C will equal about 2(A−B). When B>A the endcapper will be a monofunctional acid and C will be equal to about 2(B−A). For this case Equation [2.] is rewritten as:

$$r=B/(A+2C) \quad [3.]$$

The prepolymers should have a molecular weight that is sufficiently high so that the resulting resin is capable of providing sufficient wet strength to a substrate, such as paper. Moreover, the molecular weight of the prepolymers should not be so high so that the resulting resin gels. Preferably, the prepolymers have a range of $DP_n$ of from about 5 to 50, more preferably a range of from about 10 to 50, and most preferably a range of $DP_n$ is from about 15 to 50.

Various temperatures and reaction times can be utilized in the reaction, including conventional temperatures and time forming prepolymers. Temperatures of between about 125° C. and 260° C. are preferred, more preferably between about 165° C. and 200° C., and the reaction mixtures are maintained at these temperatures for preferably between about 3 to 12 hours, more preferably between about 6 to 10 hours.

Suitable monofunctional amines include, but are not limited to, monofunctional primary amines, including monoalkyl amines and monoalkanol amines, and monofunctional secondary amines, including dialkyl amines and dialkanol amines.

Monofunctional primary amines include, but are not limited to butylamine, ethanolamine (i.e., monoethanolamine, or MEA), cyclohexylamine, 2-methylcyclohexylamine, 3-methylcyclohexylamine, 4-methylcyclohexylamine, benzylamine, isopropanolamine (i.e., monoisopropanolamine), mono-sec-butanolamine, 2-amino-2-methyl-1-propanol, tris(hydroxymethyl)aminomethane, tetrahydrofurfurylamine, furfurylamine, 3-amino-1,2-propanediol, 1-amino-1-deoxy-D-sorbitol, and 2-amino-2-ethyl-1,3-propanediol. Monofunctional secondary amines include, but are not limited to, diethylamine, dibutylamine, diethanolamine (i.e., DEA), di-n-propylamine, diisopropanolamine, di-sec-butanolamine, and N-methylbenzylamine.

Monofunctional carboxylic acids suitable for the endcapped polyaminoamide prepolymer include, but are not limited to, benzoic acid, 2-hydroxybenzoic acid (i.e., salicylic acid), 3-hydroxybenzoic acid, acetic acid, phenylacetic acid, propionic acid, butyric acid, valeric acid, caproic acid, caprylic acid, 2-ethylhexanoic acid, oleic acid, ortho-toluic acid, meta-toluic acid, and para-toluic acid, ortho-methoxybenzoic acid, meta-methoxybenzoic acid, and para-methoxybenzoic acid.

Monofunctional carboxylic acid esters suitable for the endcapped polyaminoamide prepolymer include, but are not limited to, methyl acetate, ethyl acetate, methyl benzoate, ethyl benzoate, methyl propionate, ethyl propionate, methyl butyrate, ethyl butyrate, methyl phenyl acetate, and ethyl phenyl acetate.

The volatility of the endcapping agent should be low enough so that this agent remains in the prepolymerization reaction at the temperature at which the reaction is being conducted. Particularly, when the prepolymer is prepared by thermally driven polycondensation, volatility is a significant feature of the endcapping agent; in this instance, an endcapping agent of lesser volatility is preferred. The boiling point of the endcapping agent should be high enough so that, at the temperature being employed to drive off the condensation product—i.e., water where a diacid reactant is used, and alcohol in the case of diester—the agent is not also removed.

These endcapped polyaminoamide prepolymers can then be converted to polyaminoamide-epihalohydrin resins, preferably polyaminoamide-epichlorohydrin resins, according to the practices and procedures described earlier. The resins produced from these polyaminoamide prepolymers can also be subjected to biodehalogenation to remove epihalohydrin, e.g., epichlorohydrin, based residual by-products, and these resins form CPD in the wet strength resin solution or in the paper product at a much reduced rate. In addition to biodehalogenation, the polyaminoamide-epichlorohydrin resins may be treated to reduce or remove CPD forming species by any desired treatment, such as by utilizing the above-described acid treatment, and/or treated with any procedure for removing halogen-containing residuals.

Expanding upon the above, it is once again noted that any combination of treatments may be employed in order to bring about desired low levels of CPD forming species and/or low levels of halogen-containing residuals in the resin. Thus, the reduced acid group resin can be treated to reduce or remove CPD forming species and/or halogen-containing residuals, and therefore obtain even lower levels of formation of CPD upon storage or reduce the level of halogen-containing residuals therein. For example, the resin can be treated by various processes, such as processes to remove low molecular weight epihalohydrin and epihalohydrin by-products, e.g., epichlorohydrin and epichlorohydrin by-products, for example, CPD in the resin solution, and/or to remove CPD forming species that may still be present in the resin. Without limiting the treatments that can be utilized, it is noted that produced low acid resins could by various techniques, such as the acid treatments disclosed herein, and as in U.S. application Ser. No. 09/330,200 to obtain an even further reduction of CPD-forming species. Still further, the resins could with treated with a base ion exchange column, such as disclosed in U.S. Pat. No. 5,516,885 and WO 92/22601; with carbon adsorption, such as disclosed in WO 93/21384; membrane separation, e.g., ultrafiltration; extraction, e.g, ethyl acetate, such as disclosed in U.S. Statutory Invention Registration H1613; or biodehalogenation, such as disclosed in U.S. application Ser.

No. 08/482,398, now U.S. Pat. No. 5,972,691, WO 96/40967 and U.S. Pat. Nos. 5,470,742, 5,843,763 and 5,871,616. The disclosures of each of these documents is incorporated by reference in their entireties.

Moreover, the acid groups can be reduced by variation of the dicarboxylic acid/polyalkylenepolyamine molar ratio and the cook profile in the prepolymer synthesis. This route to obtaining polyaminoamide prepolymers with low levels of acid groups employs an excess of polyalkylenepolyamine in the synthesis. This variation is generally referred to herein as "amine excess reaction" or "amine excess prepolymer". This involves using a polyalkylenepolyamine to diacid molar ratio of greater than 1 which results in a polyaminoamide with a preponderance of amine endgroups. Moreover, various procedures, conditions and materials can be utilized when preparing the prepolymer, including conventional procedures, conditions and materials, and include those described herein.

Expanding upon the above, it is noted that altering the stoichiometry of polyalkylenepolyamine to dibasic acid, i.e., diethylenetriamine to adipic acid, to have an excess of the polyalkylene polyamine results in more carboxyl groups being converted to amide groups, thereby reducing the acid group concentration in the prepolymer. The stoichiometry of polyalkylenepolyamine to dibasic acid, e.g., diethylenetriamine to adipic acid, can range from greater than about 1.0:1.0, on a molar basis, to 1.7:1.0, more preferably, greater than about 1.01:1.0 to 1.4:1.0.

While changing of the stoichiometry of the reagents in favor of excess polyalkylenepolyamine results in polyaminoamides with lower acid group concentrations for a given time/temperature cook profile, it also results in lower molecular weights for the polymer. This lower molecular weight has a detrimental effect on the ability of the resulting resin to impart significant wet strength properties into paper. In order to maintain the desired molecular weight characteristics of the polymer, extended cook times and/or higher temperatures are employed to build prepolymers with low acid group concentrations. Therefore, temperatures between about 125° C. and 260° C. are used to cook the prepolymer reaction mixture, preferably between about 165° C. and 200° C., and the reaction mixtures are maintained at these temperatures for between about 3 to 12 hours, preferably between about 6 to 10 hours. These conditions result in polyaminoamides with reduced acid groups. As with the above-discussed end-capping, the prepolymers should have a molecular weight that is sufficiently high so that the resulting resin is capable of providing sufficient wet strength to a substrate, such as paper. Moreover, the molecular weight of the prepolymers should not be so high so that the resulting resin gels. Thus, as discussed above with respect to end-capping, the prepolymers preferably have a range of $DP_n$ of from about 5 to 50, more preferably a range of from about 10 to 50, and most preferably a range of $DP_n$ is from about 15 to 50.

Preferably, the temperature of the reaction for forming the prepolymer is varied from one or more lower temperatures during one or more initial stages of the reaction and raised to one or more higher temperatures during one or more later stages of the reaction. In this manner, the molecular weight of the prepolymer can be built up during the lower temperature stage, while avoiding volatization of low molecular species, e.g., monomers. The temperature can then be raised to reduce or remove the acid groups while raising the molecular weight. For example, the prepolymer reaction can be initially performed at temperatures of about 125 to 200° C., preferably about 140 to 180° C., for about 0.5 to 5 hours, more preferably about 1 to 4 hours. The reaction temperature can then be raised to about 150 to 260° C., more preferably about 180 to 225° C., in one or more stages, and maintained at this one or more higher temperatures for about 0.25 to 10 hours, more preferably about 0.5 to 5 hours.

Alternatively, instead of raising the temperature, longer cooking times can be utilized to build-up the molecular weight of the prepolymer. Additionally, the temperature can be raised to a lower extent, with an increase in cook time.

The amine excess prepolymer can then be converted to polyaminoamide-epihalohydrin resins, such as polyaminoamide-epichlorohydrin resins, according to the practices and procedures described earlier. These resins can also be subjected to any treatment and/or any combination of treatments, such as discussed herein with respect to end capping. For example, the resin can be subjected to any treatment and/or any combination of treatments to reduce or remove CPD forming species and/or reduce and/or remove halogen-containing residuals.

Another method of making polyaminoamide prepolymers with low levels of residual acid functionality is to add a reactive amine at later stages of the polycondensation reaction in forming the prepolymer with continued heating in order to amidate any residual acid groups. This method is referred to herein as "post-added amine reaction" or "post-added amine prepolymer". Preferably, the polycondensation reaction is at least about 70% complete, more preferably at least about 80% complete, and even more preferably at least about 90% complete when the reactive amine is added. The degree of conversion, and hence the degree of completion of the polycondensation reaction can be determined by monitoring the amount of distillate, i.e., the amount of water or alcohol, that is formed during the reaction and comparing this to the theoretical value.

In order to facilitate the reaction with the reactive amine, a vacuum, e.g., a slight vacuum to a high vacuum, may be applied to the reactor to aid in removal of the byproducts formed in the condensation reaction of the reactive amine with carboxylic acid groups. Also, a gas sparge, e.g., an inert gas sparge, such as with nitrogen, argon and/or helium, may be introduced to the reactor to aid in the removal of condensation byproducts. This procedure can be performed while applying vacuum or under conditions of normal atmospheric pressure.

While not wishing to be bound by any particular theory, monofunctional amines can be utilized in which instance it would appear that amide, alkyl and/or hydrocarbon end groups would form. Moreover, polyfunctional amines can be utilized in which instance it would appear that amides would be formed.

The initial stages of the prepolymer reaction can be initially performed at temperatures of about 125° C. to 200° C., preferably about 140° C. to 180° C., for about 0.5 to 5 hours, more preferably about 1 to 4 hours. After the post-addition of the amine compound, the reaction temperature can then be maintained or can be raised to about 150° C. to 225° C., more preferably about 170° C. to 225° C., in one or more stages, and maintained at this one or more higher temperatures for about 0.25 to 10 hours, more preferably about 0.5 to 5 hours.

The post-added amine should be added in an amount such that the total molar quantity of polyalkylenepolyamine plus post-added amine is greater than the total molar amount of dicarboxylic acid. The initial molar ratio of polyalkylenepolyamine to dicarboxylic acid can range from about 0.6:1.0 to 1.4:1.0, preferably about 0.8:1.0 to 1.2:1.0, more preferably about 0.9:1.0 to 1.1:1.0 and most preferably about 0.95:1.0 to 1.05:1.0. The post-added amine is preferably added in a quantity such that the ratio of polyalkylenepolyamine to dicarboxylic acid to post-added amine is in the range of about 0.6:1.0:0.7 to 1.4:1.0:0.3, preferably about 0.8:1.0:0.4 to 1.2:1.0:0.2, more preferably about 0.9:1.0:0.2 to 1.1:1.0:0.1 and most preferably about 0.95:1.0:0.1 to 1.05:1.0:0.05.

A polyaminoamide prepared from an equimolar mixture of polyalkylenepolyamine and diacid will theoretically have an equal number of amine and carboxylic acid groups. By adding a reactive amine in the later stages of the reaction, the acid groups present in the polyaminoamide can be amidated. The reactive amine may be any substance that contains at least one primary or secondary amine functionality and may contain a mixture of primary and secondary amine functionalities. This may be a monofunctional amine, difunctional amine or polyfunctional amine. This reactive amine is referred to as a "post-added amine". Preferred post-added amines are aliphatic amines.

Suitable monofunctional primary amines include, but are not limited to, butylamine, amylamine, hexylamine, heptylamine octylamine, nonylamine, decylamine, ethanolamine (i.e., monoethanolamine, or MEA), cyclohexylamine, allylamine, 2-methylcyclohexylamine, 3-methylcyclohexylamine, 4-methylcyclohexylamine, benzylamine, isopropanolamine (i.e., monoisopropanolamine), mono-sec-butanolamine, 2-(2-aminoethoxy)ethanol, 2-amino-2-methyl-1-propanol, tris(hydroxymethyl)aminomethane, tetrahydrofurfurylamine, furfurylamine, 3-amino-1,2-propanediol, 1-amino-1-deoxy-D-sorbitol, morpholine aminoethylmorpholine and 2-amino-2-ethyl-1,3-propanediol. Among the monofunctional secondary amines which are suitable are diethylamine, dibutylamine, diethanolamine (i.e., DEA), di-n-propylamine, diisopropanolamine, di-sec-butanolamine, pyrrolidine, piperidine, diallylamine, and N-methylbenzylamine.

Examples of appropriate diamines include, but are not limited to, ethylenediamine, propylenediamine, hexamethylenediamine, 1,10-diaminodecane, 1,3-diamino-3-hydroxypropane, 2-(2-aminoethylamino)ethanol, 1,2-diaminocyclohexane, 1,10-diaminodecane, and piperazine.

Polyfunctional amines that may be used as the post-added amine include, but are not limited to, aminoethyl piperazine, the polyalkylene polyamines, including polyethylene polyamines, polypropylene polyamines, polybutylene polyamines, polypentylene polyamines, polyhexylene polyamines and so on and their mixtures may be employed of which the polyethylene polyamines represent an economically preferred class. More specifically, the polyalkylene polyamines contemplated for use may be represented as polyamines in which the nitrogen atoms are linked together by groups of the formula —$C_nH_{2n}$— where n is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a satisfactory starting material. The term "polyalkylene polyamine" employed in the claims, therefore, refers to and includes any of the polyalkylene polyamines referred to above or to a mixture of such polyalkylene polyamines and derivatives thereof.

The post-capped polyaminoamides can then be converted to polyaminoamide-epihalohydrin resins, such as polyaminoamide-epichlorohydrin resins, according to the practices and procedures described earlier. These resins can also be subjected to any treatment and/or any combination of treatments, such as discussed herein with respect to end capping and amine excess treatment during the reaction. For example, the resin can be subjected to any treatment and/or any combination of treatments to reduce or remove CPD forming species and/or reduce and/or remove halogen-containing residuals.

Moreover, any manner of providing polyamine-epihalohydrin resin having reduced and/or removed CPD-forming species can be utilized alone or in combination according to the instant invention. When utilized in combination, the techniques can be utilized simultaneously, sequentially or in an overlapping manner. For example, and without limiting the combinations according to the present invention, treatment with an enzymatic agent can be followed by acid or base treatment.

Moreover, it noted that a mixture of wet strength agents can be utilized according to the present invention. For example, it is noted that cationic water-soluble resins, derived from the reaction of epihalohydrins, such as epichlorohydrin, and polyalkylene polyamines, such as ethylenediamine (EDA), bis-hexamethylenetriamine (BHMT) and hexamethylenediamine (HMDA) have long been known. These polyalkylene polyamine-epihalohydrin resins are described in patents such as U.S. Pat. No. 3,655,506 to J. M. Baggett, et al. and others such as U.S. Pat. Nos. 3,248,353 and 2,595,935 to Daniel et al. from which their generic description as "Daniel's Resins" arises. The disclosures of these patents are incorporated by reference herein in their entireties.

While not wishing to be bound by theory, these polyamine-epihalohydrin resins do not have acid end groups, and therefore appear to not include CPD-forming species, e.g., CPD esters. Thus, while their wet strength abilities are less than those of polyaminopolyamide-epihalohydrin resins, it is beneficial to include the polyalkylene amine-epihalohydrin resins in admixture with the polyaminopolyamide-epihalohydrin resins in view of their lower cost and their lack of formation of CPD upon storage.

The polyalkylene polyamine employed in the present invention can preferably be selected from the group consisting of polyalkylene polyamines of the formula:

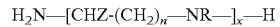

where:
n=1–7,
x=1–6
R=H or $CH_2Y$,
Z=H or $CH_3$,
and
Y=$CH_2Z$, H, $NH_2$, or $CH_3$,
polyalkylene polyamines of the formula:

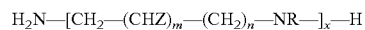

where:
m=1–6, n=1–6, and m+n=2–7,
R=H or $CH_2Y$,
Z=H or $CH_3$,
and
Y=$CH_2Z$, H, $NH_2$, or $CH_3$,
and mixtures thereof.

Polyalkylene polyamine-epihalohydrin resins comprise the water-soluble polymeric reaction product of epihalohydrin and polyalkylene polyamine. In making Daniel's Resins the polyalkylene polyamine is added to an aqueous mixture of the epihalohydrin so that during the addition the temperature of the mixture does not exceed 60° C. Lower temperatures lead to further improvements, though too low a temperature may build dangerously latent reactivity into the system. The preferred temperatures fall within the range of about 25° C. to about 60° C. More preferred is a range of from about 30° C. to about 45° C.

Alkylation of the polyamine occurs rapidly proceeding to form secondary and tertiary amines depending on the relative amounts of epihalohydrin and polyamine. The levels of epihalohydrin and polyamine are such that between about 50% and 100% of the available amine nitrogen sites are alkylated to tertiary amines. Preferred levels are between about 50% and about 80% alkylation of the amine nitrogen sites. Excess epihalohydrin beyond that required to fully alkylate all the amine sites to the tertiary amine is less preferred because this results in increased production of epihalohydrin byproducts.

Following complete addition of the polyamine, the temperature of the mixture is allowed to rise and/or the mixture is heated to effect crosslinking and azetidinium formation. The crosslinking rate is a function of concentration, temperature, agitation, and the addition conditions of the polyamine, all of which can be readily determined by those skilled in the art. The crosslinking rate can be accelerated by the addition of small shots of the polyamine or other polyamines of the present invention or addition of various alkalies at or near the crosslinking temperature.

The resin can be stabilized against further crosslinking to gelation by addition of acid, dilution by water, or a combination of both. Acidification to pH 5.0 or less is generally adequate.

The preferred polyamines are bishexamethylenetriamine, hexamethylenediamine, and their mixtures.

In order to more clearly describe the present invention, the following non-limiting examples are provides for the purpose of representation, and are not to be construed as limiting the scope of the invention. All parts and percentages in the examples are by weight unless indicated otherwise. Moreover, ND in the Examples indicates "Not Detected".

EXAMPLES

Comparative Example 1

Accelerated Aging of a Polyaminopolyamide-epichlorohydrin (epi) Resin (Control).

Kymene® ULX2 wet-strength resin, a polyaminopolyamide-epi resin which contains less than about 5 ppm of DCP and less than about 50 ppm of CPD and is available from Hercules Incorporated (Wilmington, Del.), was obtained from the Voreppe, France plant, and had a total solids of 13.6 wt % and a pH of 2.7. This Kymene® is designated as Resin A. A portion of Resin A was charged into a bottle containing a magnetic stirrer and capped. The bottle was placed in a 50° C. water bath and maintained at 50° C. Periodically, an aliquot was removed from the bottle and submitted for GC analysis. The results are reported in Table 1. Another portion of Resin A was charged into a bottle and capped. The bottle was placed in a 32° C. oven and maintained at 32° C. Periodically, an aliquot was removed from the bottle and submitted for analysis by gas chromatography (GC). The results are reported in Table 1.

GC was used to determine epi and epi by-products in the treated and untreated resins using the following method. The resin sample was absorbed onto an Extrelut column (available from EM Science, Extrelut QE, Part #901003-1) and extracted by passing ethyl acetate through the column. A portion of the ethyl acetate solution was chromatographed on a wide-bore capillary column. If flame ionization detector (FID) was used, the components are quantitated using n-octanol as the internal standard. If an electrolytic conductivity (ELCD) detector or if the halogen-specific (XSD) detector was used, an external standard method using peak matching quantitation was employed. The data system was either a Millennium 2010 or HP ChemStation. The FID detector was purchased from Hewlett-Packard (HP) as part of a Model 5890 GC. The ELCD detector, Model 5220, was purchased from OI Analytical. The XSD detector was purchased from OI Analytical, Model 5360 XSD. The GC instrument used was a HP Model 5890 series II. The column was DB-WAX (Megabore, J&W Scientific, Inc.) 30 m×0.53 mm with 1.5 micron film thickness. For the FID and ELCD, the carrier gas was helium with a flow rate of 10 mL/min. The oven program was 35° C. for 7 minutes, followed by ramping at 8° C./min to 200° C. and holding at 200° C. for 5 minutes. The FID used hydrogen at 30 mL/min and air at 400 mL/min at 250° C. The ELCD used n-propanol as the electrolyte with an electrolyte flow rate setting of 50% with a reactor temperature of 900° C. The XSD reactor was operated in an oxidative mode at 1100° C. with a high purity air flow rate of 25 mL/min.

TABLE 1

| Temp (Celsius) | Time (hours) | 1,3-DCP (ppm) | 2,3-DCP (ppm) | 3-CPD (ppm) |
|---|---|---|---|---|
| 20 | 0 | ND | 0.6 | 3.6 |
| 50 | 25 | ND | 0.6 | 13.3 |
| 50 | 70 | ND | 0.6 | 20.6 |
| 50 | 146 | ND | 0.6 | 28.8 |
| 50 | 217 | ND | 0.7 | 36.3 |
| 50 | 369 | ND | 0.7 | 43.3 |
| 50 | 386 | ND | 0.8 | 47.0 |
| 50 | 482 | ND | 0.5 | 52.0 |
| 32 | 72 | ND | 0.6 | 11.0 |
| 32 | 96 | ND | 0.6 | 13.0 |
| 32 | 144 | ND | 0.7 | 16.1 |
| 32 | 240 | ND | 0.6 | 21.9 |
| 32 | 408 | ND | 0.5 | 28.7 |
| 32 | 576 | ND | 0.7 | 34.3 |
| 32 | 744 | ND | 0.8 | 36.8 |
| 32 | 1248 | ND | 0.8 | 46.3 |
| 32 | 1584 | ND | 0.8 | 48.3 |

Comparative Example 2

Lab Biodehalogenation of a Polyaminopolyamide-epi Resin and Accelerated Aging.

Kymene® SLX2 wet-strength resin, a polyaminopolyamide-epi resin available from Hercules Incorporated (Wilmington, Del.), was obtained from the Voreppe, France plant, and had a total solids of 13.0 wt % and a pH of 2.9. This Kymene® resin is designated as Resin B. A 200 gram sample of Resin B was charged into a 3-necked, round-bottomed flask equipped with a magnetic stirrer, a condenser and an air sparge. The pH was adjusted to 5.8 with 10% aqueous sodium hydroxide. To the mixture was added 100 grams of a blend of microorganisms comprising an inoculum from a biodehalogenated polyaminopolyamide-epichiorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 2.4 grams of a nutrient solution. (The nutrient solution consisted of 8026 ppm of potassium dihydrogen phosphate, 27480 ppm of urea, 4160 ppm of magnesium sulfate, and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 10% aqueous sodium hydroxide. After 28 hours, a sample was removed and submitted for GC analysis. The mixture was cooled to room temperature, and the pH was adjusted to 3.0 with 10% sulfuric acid. The resin was subjected to accelerated aging as described in Comparative Example 1. The results are reported in Table 2.

TABLE 2

| Temp (Celsius) | Time (hours) | 1,3-DCP (ppm) | 2,3-DCP (ppm) | 3-CPD (ppm) |
|---|---|---|---|---|
| 20 | 0 | ND | 0.7 | 0.1 |
| 50 | 24 | 0.1 | 0.5 | 3.5 |
| 50 | 46 | 0.1 | 0.5 | 5.9 |
| 50 | 119 | 0.2 | 0.6 | 12.3 |
| 50 | 138 | 0.2 | 0.6 | 12.9 |
| 50 | 210 | 0.3 | 0.6 | 19.5 |
| 50 | 334 | 0.4 | 0.6 | 20.9 |
| 32 | 23 | 0.2 | 0.5 | 0.8 |
| 32 | 46 | 0.2 | 0.5 | 1.8 |
| 32 | 115 | 0.2 | 0.5 | 3.4 |
| 32 | 163 | 0.1 | 0.5 | 4.6 |
| 32 | 331 | 0.2 | 0.6 | 6.9 |
| 32 | 497 | 0.2 | 0.6 | 7.6 |
| 32 | 665 | 0.2 | 0.6 | 9.0 |
| 32 | 1001 | 0.2 | 0.5 | 13.1 |
| 32 | 1457 | 0.2 | 0.4 | 10.5 |

Comparative Example 3

Lab Biodehalogenation of a Polyaminopolyamide-epi Resin and Accelerated Aging.

A 180 gram sample of Resin B was charged into a 3-necked, round-bottomed flask equipped with a magnetic stirrer, a condenser, an air sparge and a pH meter. The pH was adjusted to 5.8 with 8.6 grams of 10% aqueous sodium hydroxide. To the mixture was added 18 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 1.6 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 10% aqueous sodium hydroxide. After 28 hours, the mixture was cooled to room temperature, the pH was adjusted to 3.0 with 10% sulfuric acid and 1.23 grams of biocide [Proxel® BD from Zeneca Biocides, 1,2-benzisothiazolin-3-one, (CAS name, 1,2-benzisothiazol-3(2H)-one, RN=2634-33-5), 19.3% active solids] was added. A sample was removed and submitted for GC analysis. The resin was subjected to accelerated aging as described in Comparative Example 1. The results are reported in Table 3.

TABLE 3

| Temp (Celsius) | Time (hours) | 1,3-DCP (ppm) | 2,3-DCP (ppm) | 3-CPD (ppm) |
|---|---|---|---|---|
| 20 | 0 | ND | 0.6 | 0.1 |
| 50 | 18 | ND | 0.6 | 2.2 |
| 50 | 42 | ND | 0.6 | 4.0 |
| 50 | 137 | ND | 0.6 | 8.4 |
| 50 | 161 | ND | 0.6 | 9.0 |
| 50 | 233 | ND | 0.7 | 11.9 |
| 50 | 355 | ND | 0.7 | 14.2 |
| 50 | 526 | ND | 0.6 | 18.9 |
| 50 | 670 | ND | 0.6 | 18.7 |
| 32 | 41 | ND | 0.6 | 0.8 |
| 32 | 113 | ND | 0.6 | 3.2 |
| 32 | 335 | ND | 0.6 | 5.6 |
| 32 | 522 | ND | 0.3 | 3.3 |
| 32 | 671 | ND | 0.7 | 9.8 |
| 32 | 977 | ND | 0.7 | 11.3 |
| 32 | 1697 | ND | 0.7 | 7.8 |

Example 1

Lab Biodehalogenation of an Acid-treated Polyaminopolyamide-epi Resin and Accelerated Aging.

A 250 g portion of Resin B was charged into a bottle containing a magnetic stirrer. The pH was adjusted to 1.0 with 96% sulfuric acid. The bottle was capped and placed in a 50° C. water bath and maintained at 50° C. Periodically, aliquots were removed from the bottle and submitted for GC analysis. After 24 hours, the resin was cooled and had pH of 1.1 and a total solids of 14.1 wt %. A 180 gram sample of this resin was charged into a 3-necked, round-bottomed flask equipped with a magnetic stirrer, a condenser, an air sparge and a pH meter. The pH was adjusted to 5.8 with 23.2 grams of 10% aqueous sodium hydroxide. To the mixture was added 18 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 1.6 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 10% aqueous sodium hydroxide. After 29 hours, the mixture was cooled to room temperature, the pH was adjusted to 3.0 with 10% sulfuric acid, and 0.57 grams of biocide [Proxel® BD from Zeneca Biocides, 1,2-benzisothiazolin-3-one, (CAS name, 1,2-benzisothiazol-3(2H)-one, RN=2634-33-5), 19.3% active solids] was added. A sample was removed and submitted for GC analysis. The resin was subjected to accelerated aging as described in Comparative Example 1. The results are reported in Table 4.

Using a pH lower than the typical storage pH reduced CPD reformation. This treatment resulted in about a 77–80% reduction in CPD reformation in the resin relative to an untreated control (Comparative Example 3) and about a 93% reduction relative to commercially obtained Kymene®ULX2 wet strength resin (Comparative Example 1).

TABLE 4

| Temp (Celsius) | Time (hours) | 1,3-DCP (ppm) | 2,3-DCP (ppm) | 3-CPD (ppm) |
|---|---|---|---|---|
| 20 | 0 | 0.0 | 0.8 | 0.1 |
| 50 | 17 | 0.0 | 0.8 | 0.3 |
| 50 | 88 | ND | 0.9 | 1.5 |
| 50 | 160 | ND | 0.8 | 2.7 |
| 50 | 255 | ND | 1.0 | 3.1 |
| 50 | 328 | ND | 0.9 | 3.2 |
| 50 | 496 | ND | 0.8 | 3.8 |
| 32 | 160 | ND | 0.9 | 0.8 |
| 32 | 256 | ND | 0.9 | 1.3 |
| 32 | 328 | ND | 1.0 | 2.8 |
| 32 | 496 | ND | 0.9 | 1.5 |
| 32 | 664 | ND | 0.9 | 1.9 |
| 32 | 1001 | ND | 1.0 | 2.3 |
| 32 | 1774 | ND | 1.1 | 3.6 |

Example 2

Lab Biodehalogenation of an Acid-treated Polyaminopolyamide-epi Resin and Accelerated Aging.

Kymene® SLX2 wet-strength resin which is a polyaminopolyamide-epi resin available from Hercules Incorporated was obtained from the Lilla Edet, Sweden plant, and had a 13.5 wt % total solids and a pH of 2.9. This Kymene® is designated as Resin C. A 900 gram portion of Resin C was charged into a 4-necked, round-bottomed flask equipped with an overhead stirrer and a condenser. The pH was adjusted to 1.0 with 12.2 grams of 96% sulfuric acid. The reaction mixture was heated to 50° C. with a water bath and maintained at 50° C. Periodically, aliquots were removed from the flask and submitted for GC analysis. After 24 hours, the resin was cooled and had pH of 1.1, a total solids of 14.9%. A 800 gram sample of this acid-treated resin was charged into a 4-necked, round-bottomed flask equipped with an overhead stirrer, a condenser, an air sparge and a pH meter. The pH was adjusted to 5.8 with 66.5 grams of 20% aqueous sodium hydroxide. To the mixture was added 80 grams of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 6.9 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 10% aqueous sodium hydroxide. After 45 hours, an aliquot was removed and submitted for GC analysis and the mixture was cooled to room temperature. A 190 gram portion was adjusted to pH 3.0 with 1.42 grams of 96% sulfuric acid and 2.3 grams of biocide solution was added. [The biocide solution consisted of 10% active Proxel® BD (from Zeneca Biocides) and 1.67% potassium sorbate in deionized water.] The resin was subjected to accelerated aging as described in Comparative Example 1. The results are reported in Table 5.

TABLE 5

| Temp (Celsius) | Time (hours) | 1,3-DCP (ppm) | 2,3-DCP (ppm) | 3-CPD (ppm) |
|---|---|---|---|---|
| 20 | 0 | ND | 1.1 | ND |
| 50 | 92 | ND | 1.1 | 1.0 |
| 50 | 164 | ND | 2.0 | 2.0 |
| 50 | 332 | ND | 1.3 | 2.0 |
| 32 | 332 | ND | 1.3 | 1.1 |
| 32 | 668 | ND | 1.1 | 1.4 |
| 32 | 1004 | ND | 1.3 | 1.9 |

Example 3

Crosslinking of Example 2 at 60° C.

A 175 gram sample of the resin of Example 2 was charged into a 4-necked, round-bottomed flask equipped with an overhead stirrer and a condenser. The pH was adjusted to 10.5 with 6.7 grams of 20% aqueous sodium hydroxide. The reaction mixture was heated to 60° C. by placing the flask in a temperature controlled water bath. The reaction mixture was maintained at 60° C. The Gardner-Holdt viscosity at 25° C. was monitored. After the Gardner-Holdt viscosity reached B (2.5 hours after base addition), the reaction was quenched by the addition of 2.4 grams of 96% sulfuric acid. The reaction mixture was allowed to cool to 25° C. The pH was adjusted to 2.8 with an additional 0.12 grams of 96% sulfuric acid and 2.1 grams of biocide solution was added. [The biocide solution consisted of 10% active Proxel® BD (from Zeneca Biocides) and 1.67% potassium sorbate in deionized water.] The resin had a total solids of 15.6 wt % and a Brookfield viscosity of 95 cps (spindle #2 at 60 rpm using a Brookfield DV-II viscometer at 25° C.). The resin was subjected to accelerated aging as described in Comparative Example 1. The results are reported in Table 6.

TABLE 6

| Temp (Celsius) | Time (hours) | 1,3-DCP (ppm) | 2,3-DCP (ppm) | 3-CPD (ppm) |
|---|---|---|---|---|
| 20 | 0 | 0.1 | 0.9 | 1.9 |
| 50 | 66 | 0.1 | 0.7 | 1.5 |
| 32 | 162 | 0.1 | 0.8 | 1.8 |
| 32 | 330 | 0.1 | 0.8 | 1.5 |
| 32 | 666 | 0.2 | 0.6 | 1.1 |

Example 4

Crosslinking of Example 2 at 50° C.

A 175 gram sample of the resin of Example 2 was charged into a 4-necked, round-bottomed flask equipped with an overhead stirrer and a condenser. The pH was adjusted to 10.5 with 6.2 grams of 20% aqueous sodium hydroxide. The reaction mixture was heated to 50° C. by placing the flask in a temperature controlled water bath. The reaction mixture was maintained at 50° C. The Gardner-Holdt viscosity at 25° C. was monitored. An additional 0.4 grams of 20% aqueous sodium hydroxide was added 3.3 hours after the base addition. After the Gardner-Holdt viscosity reached B-C (4.5 hours after initial base addition), the reaction was quenched by the addition of 2.3 grams of 96% sulfuric acid. The reaction mixture was allowed to cool to 25° C. The pH was adjusted to 2.8 with an additional 0.19 grams of 96% sulfuric acid and 1.9 grams of biocide solution was added. [The biocide solution consisted of 10% active Proxel® BD (from Zeneca Biocides) and 1.67% potassium sorbate in deionized water.] The resin had a total solids of 15.7 wt % and a Brookfield viscosity of 117 cps (spindle #2 at 60 rpm using a Brookfield DV-II viscometer at 25° C.). The resin was subjected to accelerated aging as described in Comparative Example 1. The results are reported in Table 7.

TABLE 7

| Temp (Celsius) | Time (hours) | 1,3-DCP (ppm) | 2,3-DCP (ppm) | 3-CPD (ppm) |
|---|---|---|---|---|
| 20 | 0 | 0.5 | 0.9 | 2.4 |
| 50 | 53 | 0.6 | 0.9 | 2.3 |
| 32 | 175 | 0.4 | 0.8 | 1.4 |
| 32 | 360 | 0.5 | 0.9 | 1.6 |

Comparative Example 4

Kymene® ULX2 wet-strength resin which is a polyaminopolyamide-epi resin available from Hercules Incorporated (Wilmington, Del.) was obtained from the Lilla Edet, Sweden plant, and had a 13.3 wt % total solids and a pH of 2.7. This resin is designated as Resin D. Resin D was subjected to accelerated aging as described in Comparative Example 1. The results are reported in Table 8.

TABLE 8

| Temp (Celsius) | Time (hours) | 1,3-DCP (ppm) | 2,3-DCP (ppm) | 3-CPD (ppm) |
|---|---|---|---|---|
| 20 | 0 | ND | 0.4 | 7.6 |
| 50 | 24 | ND | 0.4 | 16.3 |
| 50 | 96 | ND | 0.5 | 28.8 |
| 50 | 168 | ND | 0.5 | 35.7 |
| 50 | 380 | ND | 0.5 | 45.9 |
| 32 | 167 | ND | 0.5 | 22.3 |
| 32 | 432 | ND | ND | 34.9 |
| 32 | 864 | ND | 0.4 | 47.7 |

Example 5

Synthesis of a High-solids Polyaminopolyamide Resin Followed by Acid-treatment and Biodehalogenation.

A 1-L jacketed resin kettle was fitted with a condenser, a pH meter, a temperature controlled circulating bath, an addition funnel and a mechanical stirrer. To the kettle was added 749.76 g of 51.2% aqueous poly(adipic acid-co-diethylenetriamine) (available from Hercules Incorporated) and 209.9 g of water. The solution was heated to 30° C. and then 149.9 g of epichlorohydrin (Aldrich, 99%) was added over about 3 minutes. The temperature was allowed to increase to 35° C. and was maintained at this temperature. Two hours after the addition of the epichlorohydrin, 225 g of water was added and the temperature was raised to 50° C. The Gardner-Holdt viscosity at 25° C. was monitored. After the Gardner-Holdt viscosity reached M, the reaction was quenched by the addition 325 g of water containing 38.73 g of 96% sulfuric acid. The reaction mixture was allowed to cool to 25° C. The pH was adjusted to 2.8 with an additional 9.17 grams of 96% sulfuric acid and 75 grams of water was added. The total solids content of this resin was 33.0% and 1687 grams of resin was recovered. The resin was diluted to 25% solids with 539.8 grams of water. A 2-L jacketed resin kettle was fitted with a condenser, a pH meter, a temperature controlled circulating bath and a mechanical stirrer. To the kettle was added 1944 grams of this resin and the pH was adjusted to 1.0 with 35.1 grams of 96% sulfuric acid and the temperature was raised and maintained at 50° C. After 24 hours, the reaction mixture was cooled to 21° C. and the pH was adjusted from 1.1 to 2.8 with 202.1 g of 10% aqueous sodium hydroxide. A 1440 gram sample of this resin was adjusted to pH 5.8 with 176.4 grams of 10% aqueous sodium hydroxide. To a 4-necked, round-bottomed flask equipped with an overhead stirrer, a condenser, an air sparge and a pH meter was charged 800 grams of this resin and 80.0 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 6.9 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 20% aqueous sodium hydroxide. After 86 hours, the mixture was cooled to room temperature and refrigerated.

Example 6

Crosslinking of Example 5.

A 200 gram sample of the resin of Example 5 was charged into a 4-necked, round-bottomed flask equipped with an overhead stirrer and a condenser. The pH was adjusted to 9.1 with 6.0 grams of 20% aqueous sodium hydroxide. The reaction mixture was heated to 60° C. by placing the flask in a temperature controlled water bath. The reaction mixture was maintained at 60° C. The Gardner-Holdt viscosity at 25° C. was monitored. After the Gardner-Holdt viscosity reached K-L (144 minutes after base addition), the reaction was quenched by the addition of 2.8 grams of 96% sulfuric acid in 30 grams of deionized water. The reaction mixture was allowed to cool to 25° C. and 98 grams of additional deionized water was added. The pH was adjusted to 2.8 with an additional 0.28 grams of 96% sulfuric acid and 3.78 grams of biocide solution was added. [The biocide solution consisted of 10% active Proxel® BD (from Zeneca Biocides) and 1.67% potassium sorbate in deionized water.] The resin had a total solids of 13.6%. The resin was subjected to accelerated aging as described in Comparative Example 1. The results are reported in Table 9.

TABLE 9

| Temp (Celsius) | Time (hours) | 1,3-DCP (ppm) | 2,3-DCP (ppm) | 3-CPD (ppm) |
|---|---|---|---|---|
| 20 | 0 | ND | 1.3 | 1.3 |
| 50 | 72 | 0.2 | 1.7 | 1.5 |
| 50 | 168 | ND | 1.3 | 2.0 |
| 50 | 336 | ND | 1.0 | 1.9 |
| 32 | 168 | ND | 1.6 | 1.7 |
| 32 | 336 | ND | 1.6 | 1.9 |
| 32 | 672 | ND | 1.9 | 2.5 |

Example 7

Handsheet Evaluation of Examples 2, 3, 4, 5, 6 and Comp. Example 4.

Paper handsheets were prepared on a Noble and Wood handsheet machine at pH 7.5 with 50:50 Rayonier bleached Kraft:Crown Vantage bleached hardwood Kraft dry lap pulp refined to 500 mL Canadian standard freeness. Sheets were generated having 40 lb/3000 sq. ft. basis weight containing 0.5–1.0% of treated resin (based on the solids of untreated resin). Handsheets were wet pressed to 33% solids and dried on a drum drier at 230° C. for 55 seconds to give 3–5% moisture. Some of the handsheets were oven-cured at 80° C. for 30 minutes. The paper was conditioned according to TAPPI Method T-402 and tested. Dry tensile strength was determined using TAPPI Method T-494. Wet tensile strength was determined using TAPPI Method T-456 with a two hour soak time. Some of the paper was natural aged by conditioning at greater than two weeks at 50% relative humidity and at 23° C. and then tested. Dry tensile strength was determined using TAPPI Method T-494. Wet tensile strength was determined using TAPPI Method T-456 with a two hour soak time. To measure CPD in paper products, five grams of the paper product was extracted with water according to the method described in European standard EN 647, dated October 1993. Then 5.80 grams of sodium chloride was dissolved into 20 ml of water extract. The salted aqueous extract was transferred to a 20 gram capacity Extrelut column and allowed to saturate the column for 15 minutes. After three washes of 3 ml ethyl acetate and saturation of the column, the Extrelut column was eluted until 300 ml of eluent has been recovered in about 1 hour. The 300 ml of ethyl acetate extract was concentrated to about 5 ml using a 500 ml Kuderna-Danish concentrating apparatus (if necessary, further concentrating was done by using a micro Kuderna-Danish apparatus). The concentrated extract was analyzed by GC using a halogen specific detector (XSD).

Results for oven-cured paper are reported in Table 10 and for natural aged paper in Table 11. Although the acid treatment reduces the effectiveness of the resin (Examples 2 and 5), most of the effectiveness was recovered by adjusting the pH of the resin with a base and allowing it to crosslink (Examples 3, 4 and 6).

TABLE 10

Oven-Cured Paper

Basis Wt. Normalized

| Example | % Added | pH | dry tensile lbs/in | wet tensile lbs/in | % wet/dry | % of Comp. Ex. 4 | CPD in Paper (ppb) |
|---|---|---|---|---|---|---|---|
| Blank | — | 7.5 | 18.50 | 0.52 | 3 | 11 | <30 |
| Comp. Ex. 4 | 0.50 | 7.5 | 25.15 | 4.86 | 19 | 100 | — |
| Comp. Ex. 4 | 1.00 | 7.5 | 27.92 | 6.01 | 22 | 100 | 319 |
| Example 4 | 0.50 | 7.5 | 24.39 | 4.40 | 18 | 91 | — |
| Example 4 | 1.00 | 7.5 | 23.79 | 5.29 | 22 | 88 | <30 |
| Example 3 | 0.50 | 7.5 | 24.06 | 4.39 | 18 | 90 | — |
| Example 3 | 1.00 | 7.5 | 26.15 | 5.30 | 20 | 88 | <30 |
| Example 6 | 0.50 | 7.5 | 26.08 | 4.59 | 18 | 94 | — |
| Example 6 | 1.00 | 7.5 | 25.93 | 5.88 | 23 | 98 | 36 |
| Example 2 | 0.50 | 7.5 | 22.70 | 2.94 | 13 | 61 | — |
| Example 2 | 1.00 | 7.5 | 22.55 | 4.05 | 18 | 67 | <30 |
| Example 5 | 0.50 | 7.5 | 22.27 | 3.24 | 15 | 67 | — |
| Example 5 | 1.00 | 7.5 | 23.38 | 4.46 | 19 | 74 | 39 |

TABLE 11

Natural Aged Paper

Basis Wt. Normalized

| Example | % Added | pH | dry tensile lbs/in | wet tensile lbs/in | % wet/dry | % of Comp. Ex. 4 | CPD in Paper (ppb) |
|---|---|---|---|---|---|---|---|
| Blank | — | 7.5 | 19.87 | 0.64 | 3 | 14 | — |
| Comp. Ex. 4 | 0.50 | 7.5 | 25.04 | 4.66 | 19 | 100 | — |
| Comp. Ex. 4 | 1.00 | 7.5 | 26.28 | 5.67 | 22 | 100 | 330 |
| Example 4 | 0.50 | 7.5 | 23.75 | 3.95 | 17 | 85 | — |
| Example 4 | 1.00 | 7.5 | 26.61 | 5.03 | 19 | 89 | <30 |
| Example 3 | 0.50 | 7.5 | 24.05 | 4.02 | 17 | 86 | — |
| Example 3 | 1.00 | 7.5 | 26.11 | 5.37 | 21 | 95 | — |
| Example 6 | 0.50 | 7.5 | 23.58 | 4.27 | 18 | 92 | — |
| Example 6 | 1.00 | 7.5 | 26.34 | 5.50 | 21 | 97 | 66 |
| Example 2 | 0.50 | 7.5 | 21.60 | 2.60 | 12 | 56 | — |
| Example 2 | 1.00 | 7.5 | 22.92 | 3.55 | 15 | 63 | — |
| Example 5 | 0.50 | 7.5 | 21.61 | 3.03 | 14 | 65 | — |
| Example 5 | 1.00 | 7.5 | 22.41 | 4.08 | 18 | 72 | — |

Comparative Example 5

Lab Biodehalogenation of a Polyaminopolyamide-epi Resin.

A 400 gram sample of Resin C was charged into a 4-necked, round-bottomed flask equipped with an overhead stirrer, a condenser, an air sparge and a pH meter. The pH was adjusted to 5.8 with 11.19 grams of 20% aqueous sodium hydroxide. To the mixture was added 40 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 3.47 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 20% aqueous sodium hydroxide. After 46 hours, a sample was removed and submitted for GC analysis, the mixture was cooled to room temperature, the pH was adjusted to 2.8 with 2.58 g of 96% sulfuric acid and 5.41 grams of biocide solution was added. [The biocide solution consisted of 10% active Proxel® BD (from Zeneca Biocides) and 1.67% potassium sorbate in deionized water.] The resin had a total solids of 14.1 wt %.

Example 8

Lab Biodehalogenation of an Acid-treated Polyaminopolyamide-epi Resin and Accelerated Aging.

A 847 gram portion of Resin C was charged into a 4-necked, round-bottomed flask equipped with an overhead stirrer and a condenser. The pH was adjusted to 1.0 with 10.3 grams of 96% sulfuric acid. The reaction mixture was heated to 80° C. with a water bath and maintained at 80° C. Periodically, aliquots were removed from the flask and submitted for GC analysis. After 3 hours, the resin was cooled and had pH of 1.1. The pH was adjusted to 2.9 with 27.3 grams of 20% aqueous sodium hydroxide. This resin had a total solids of 14.5%. A 400 gram sample of this acid-treated resin was charged into a 4-necked, round-bottomed flask equipped with an overhead stirrer, a condenser, an air sparge and a pH meter. The pH was adjusted to 5.8 with 14.13 grams of 20% aqueous sodium hydroxide. To the mixture was added 40 grams of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 3.47 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens*(HK7). The flask was placed in a 30° C. water bath and maintained at 30° C. The pH was maintained at 5.8 by periodic addition of 20% aqueous sodium hydroxide. After 46 hours, a sample was removed and submitted for GC analysis and the mixture was cooled to room temperature.

Example 9

Crosslinking of Example 8 at 60° C.

A 175 gram sample of the resin of Example 8 was charged into a 4-necked, round-bottomed flask equipped with an overhead stirrer, a condenser and a pH meter. The pH was adjusted to 10.5 with 5.94 grams of 20% aqueous sodium hydroxide. The reaction mixture was heated to 60° C. by placing the flask in a temperature controlled water bath. The reaction mixture was maintained at 60° C. The Gardner-Holdt viscosity at 25° C. was monitored. After the Gardner-Holdt viscosity reached B-C (2.5 hours after base addition), the reaction was quenched by the addition of 2.1 grams of 96% sulfuric acid. The reaction mixture was allowed to cool to 25° C. The pH was adjusted to 2.8 with an additional 0.25 grams of 96% sulfuric acid and 2.1 grams of biocide solution was added. [The biocide solution consisted of 10% active Proxel® BD (from Zeneca Biocides) and 1.67% potassium sorbate in deionized water.] The resin had a total solids of 15.4 wt %.

Example 10

Handsheet Evaluation of Examples 2, 4, 8, 9 and Comp. Examples 4 and 5.

The procedure of Example 7 was used to evaluate Examples 2, 4, 8, 9 and Comp. Examples 4 and 5. Results for oven-cured paper are reported in Table 12. The results with the two different acid treatment conditions were similar (Example 4, pH 1.0 at 50° C. for 24 hours compared to Example 9, pH 1.0 at 80° C. for 3 hours). Although the acid treatment reduces the effectiveness of the resin (Example 8), most of the effectiveness was recovered by adjusting the pH of the resin with a base and allowing it to crosslink (Example 9).

TABLE 12

| Example | % Added | pH | Basis Wt. Normalized dry tensile lbs/in | Basis Wt. Normalized wet tensile lbs/in | % wet/dry | % of Comp. Ex. 4 | CPD in Paper (ppb) |
|---|---|---|---|---|---|---|---|
| Blank | — | 7.5 | 18.50 | 0.52 | 3 | 11 | <30 |
| Comp. Ex. 4 | 0.50 | 7.5 | 22.74 | 4.18 | 18 | 100 | |
| Comp. Ex. 4 | 1.00 | 7.5 | 27.22 | 6.00 | 22 | 100 | 344 |
| Example 4 | 0.50 | 7.5 | 25.26 | 4.43 | 18 | 106 | |
| Example 4 | 1.00 | 7.5 | 26.97 | 5.44 | 20 | 91 | <30 |
| Comp. Ex. 5 | 0.50 | 7.5 | 23.59 | 4.59 | 19 | 110 | |
| Comp. Ex. 5 | 1.00 | 7.5 | 23.63 | 5.44 | 23 | 91 | 269 |
| Example 8 | 0.50 | 7.5 | 21.50 | 2.86 | 13 | 68 | |
| Example 8 | 1.00 | 7.5 | 23.32 | 4.16 | 18 | 69 | 36 |
| Example 9 | 0.50 | 7.5 | 24.38 | 4.48 | 18 | 107 | |
| Example 9 | 1.00 | 7.5 | 24.48 | 5.13 | 21 | 85 | <30 |

Example 11

Acid Test

The amount of CPD producing species can be estimated using the following test. A portion of resin to be tested was charged into a bottle containing a magnetic stirrer. The pH was adjusted to 1.0 with 96% sulfuric acid. The bottle was capped and placed in a 50° C. water bath and maintained at 50° C. with stirring. Periodically, aliquots were removed from the bottle and submitted for GC analysis. The CPD produced after 24 hours is used to estimate the amount of CPD producing species. This test clearly shows the reduction in the CPD-producing species (Examples 1–6 compared to Resins A–D from Comparative Examples in Table 13, reported in wet basis of the resin).

TABLE 13

| 12.1 Resin | Time (hours) | GC detector | 1,3-DCP (ppm) | 2,3-DCP (ppm) | 3-CPD (ppm) |
|---|---|---|---|---|---|
| Resin A | 0 | FID | ND | 1 | 10 |
| Resin A | 6 | FID | ND | 1 | 82 |
| Resin A | 24 | FID | ND | 1 | 204 |
| Resin A | 96 | FID | ND | 2 | 203 |
| Resin A | 168 | FID | ND | 1 | 205 |
| Resin B | 0 | FID | 475 | ND | 181 |
| Resin B | 6 | FID | 483 | ND | 357 |
| Resin B | 24 | FID | 459 | ND | 473 |
| Resin C | 0 | FID | 830 | 2 | 356 |
| Resin C | 2 | FID | 834 | 2 | 482 |
| Resin C | 6 | FID | 833 | 2 | 541 |
| Resin C | 24 | FID | 828 | 2 | 755 |
| Example 1 | 24 | XSD | ND | 0.9 | 13.9 |
| Example 1 | 192 | XSD | ND | 0.9 | 17.7 |
| Example 2 | 0 | XSD | ND | 0.1 | ND |
| Example 2 | 24 | XSD | ND | 1.3 | 4.5 |
| Example 2 | 48 | XSD | ND | 1.2 | 6.8 |
| Example 3 | 0 | XSD | 0.1 | 0.8 | 2.1 |
| Example 3 | 24 | XSD | 0.1 | 0.8 | 2.1 |
| Example 3 | 48 | XSD | 0.1 | 0.8 | 2.3 |
| Example 4 | 0 | XSD | 0.5 | 0.9 | 1.9 |
| Example 4 | 24 | XSD | 0.6 | 0.9 | 4.3 |
| Example 4 | 48 | XSD | 0.6 | 1.0 | 4.7 |
| Resin D | 0 | FID | ND | 1 | 13 |
| Resin D | 2 | FID | ND | ND | 50 |
| Resin D | 6 | FID | ND | ND | 115 |
| Resin D | 24 | FID | ND | ND | 242 |
| Resin D | 50 | FID | ND | ND | 290 |
| Example 5 | 0 | FID | ND | 5 | 4 |
| Example 5 | 24 | FID | ND | 4 | 25 |
| Example 5 | 48 | FID | ND | 3 | 32 |
| Example 6 | 0 | XSD | 0.1 | 1.7 | 1.0 |
| Example 6 | 24 | XSD | 0.1 | 1.8 | 8.9 |
| Example 6 | 48 | XSD | ND | 1.7 | |

Example 12

Preparation of Endcapped Polyaminoamide Prepolymer

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 33.18 g hexanoic acid (caproic acid, 0.2856 mole) dropwise through an addition funnel, followed by 417.55 g adipic acid (2.857 mole) through a powder funnel while stirring the reaction mixture. The temperature of the reaction mixture was maintained below 125° C. by controlling the rate at which the adipic acid was added to the reaction. The temperature was raised to 170° C. and maintained there for 4 hours. A vacuum of 7.5" water was applied throughout this period. During this time distillate was removed through the Dean-Stark trap. The total amount of distillate removed was 105 mL. The theoretical amount of distillate was 108 mL (6.0 moles water). A volume of 640 mL of hot water (~70° C.) was cautiously added to the product which was stirred until the prepolymer was dissolved. After cooling to room temperature the product was bottled. The total solids of this product was 50.51 wt % and the reduced specific viscosity (RSV) was 0.1088 dL/g measured in 1.0N $NH_4Cl$ at 2.0%.

The amine number and acid number were determined by titration.

Amine number titrations were performed as follows: This method is used for the determination of total amine content of polyaminoamide prepolymers. The sample is dissolved in a 1:1 ethylene glycol-isopropanol mixture. The resulting solution is titrated potentiometrically with 1 N hydrochloric acid using a combination pH electrode available from Beckman Instruments, Inc., 2500 Harbor Blvd., Fullerton, Calif. 92634, Cat. No. 39537, or equivalent, and an automatic titrator, equipped with a 20 mL buret. More specifically, 3 to 4 grams of sample, weighed to the nearest 0.0001 g, in duplicate, are added into a 100–150 mL beaker containing a small stirring bar, such as a magnetic stirring bar having a 1½" length. A 1:1 ethylene glycol-isopropanol mixture (prepared by combining, in a container, 1 liter of ethylene glycol, laboratory grade, available from VWR Scientific, Cat. No. JTL715, or Fisher Scientific, Cat. No. E177, or equivalent, with 1 liter of isopropanol, e.g., isopropyl alcohol (2-propanol), laboratory grade, available from VWR Scientific, Cat. No. VW3250, or equivalent) is added to the beaker. Place the beaker on a magnetic stirrer, such as a magnetic stirrer available from VWR Scientific Co., and stir to dissolve. To expedite dissolution, place the beaker on a steam bath or in a heated water bath. Insert the electrode in the solution and set up the titrator for mV titrations. Set the rate of titration at approximately 2 mL/min. Titrate the sample solution potentiometrically with standardized 1 N HCl solution (prepared by adding approximately 400 mL of 1:1 ethylene glycol-isopropanol to a 1 liter volumetric flask, adding 92 mL of concentrated hydrochloric acid, such as, hydrochloric acid, concentrated, reagent grade, available from VWR Scientific, Cat. No. VW3110, or equivalent, mixing thoroughly, allowing the solution to cool to room temperature, and diluting to volume with 1:1 ethylene glycol-isopropanol, which is standardized using 2 to 3 grams of tri(hydroxymethyl)aminomethane (THAM), while maintaining mixing, but avoiding splashing the sample on the sides of the beaker. Determine the volume of titrant consumed at the equivalence point, which is the midpoint of the major inflection (NOTE: For example, when the sample size is 3.5 grams, approximately 7.2 mL of 1.16 N HCl is consumed to reach the equivalence point. Calculate the amine concentration in the sample, as meq/g, on a dry basis, using Equation 4.

$$\frac{V2 \times N \times 100}{W2 \times TS} = \text{meq/g total amines} \qquad \text{Eq (4)}$$

where:
V2=volume of titrant consumed by the sample, mL
N=normality of the titrant
W2=weight of sample, g
TS=% total solids of prepolymer sample Acid number titrations are performed as follows:

Examine the sample visually. If the sample has begun to crystallize and appears hazy, gently warm the sample in a container in a warm water bath or over an oven or steam bath until it is clear and homogeneous. Mix well before weighing.

Weigh two 5-g portions of sample, to the nearest 0.0001 g, into separate beakers or flasks. Add neutralized ethyl alcohol (such as, denatured ethyl alcohol, 90%—available from VWR Scientific, Cat. No. VW0470, or Fisher Scientific, Cat. No. A995-4, or equivalent, which is neutralized to a faint pink phenolphthalein end point with 0.1 N alcoholic KOH solution using a phenolphthalein indicator solution, 1%) to each in an amount of 60–100 mL so as to cover the electrode, and stir or swirl to dissolve the sample. Insert the electrode (a combination pH electrode, such as available from Beckman Instruments, Inc., 2500 Harbor Blvd., Fullerton, Calif. 92634, Cat. No. 39537, or equivalent) into the solution and turn on the stirrer to maintain a mild vortex of stirred solution, and using an automatic titrator equipped with a 20 mL buret and stirrer, titrate each sample with 0.1 N alcoholic KOH past the inflection endpoint, and determine the volume of titrant consumed at the midpoint of the inflection, measuring the titration volume to 0.01 mL.) Typical titration parameters for a Metrohm titrator are: titration rate=2 mL/min for a 20 mL buret and recorder range=pH 14 full scale. Calculate the acid concentration in the samples as meq/g, on a dry basis, using Equation 5.

$$\frac{V \times N \times 100}{Ws \times TS} = \text{meq/g Acid} \qquad \text{Eq (5)}$$

where:
N=normality of KOH titrant
V=volume of KOH titrated to the end point
Ws=weight of prepolymer sample, g
TS=% total solids of prepolymer sample This material had an amine number of 5.25 meq/g and an acid number of 0.356 meq/g, determined as described above.

The reduced specific viscosity (RSV) of the prepolymer is determined by utilizing a 2 wt % solution of the polymer in 1 N ammonium chloride (obtained by adding 53.5+/−0.1 g of NH4Cl to a 1 liter container, and diluting to volume with distilled water) at 25° C. using a Ubbelohde viscometer, i.e., Ubbelohde Viscometer tubes, No. 1, with Viscometer Constant C=0.01, available from Visco Systems, Yonkers, N.Y., or Schott, Hofheim, Germany, or Brinkmann Instruments, Westbury, N.Y. Flow times of the 2 wt % polymer solution and the ammonium chloride pure solvent are measured and the relative viscosity (Nrel) calculated. The reduced viscosity is calculated from the relative viscosity. This method is based on ASTM D446.

Example 13

Preparation of Endcapped Polyaminoamide Prepolymer

A 1000 mL resin kettle fitted with condenser, Dean-Stark trap, thermocouple, addition funnel and mechanical stirrer was charged with 294.78 g diethylenetriamine (DETA, 2.8947 mole) and 12.86 g ethanolamine (monoethanolamine, MEA). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 170° C. and maintained there for 4 hours. a vacuum of 7.5" water was applied throughout this period. During this time distillate was removed through the Dean-Stark trap. The total amount of distillate removed was 102 mL. The theoretical amount of distillate was 108 mL (6.0 moles water). a volume of 640 mL of hot water (~70° C.) was cautiously added to the product which was stirred until the prepolymer was dissolved. After cooling to room temperature the product was bottled. The total solids of this product was 51.56 wt % and the RSV was 0.1263 dL/g, determined in 1.0N $NH_4Cl$ at 2.0%. This material had an amine number of 5.25 meq/g and an acid number of 0.330 meq/g, determined by titration as previously described.

Example 14

Preparation of Endcapped Polyaminoamide Prepolymer

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 28.25 g 2,2-dimethylolpropionic acid (DMPA, 2,2-bis(hydroxymethyl)propionic acid; 0.2106 mole) followed by 423.03 g adipic acid (2.8947 mole) through a powder funnel while stirring the reaction mixture. The temperature of the reaction mixture was maintained below 125° C. by controlling the rate at which the adipic acid was added to the reaction. The temperature was raised to 170° C. and maintained there for 4 hours. a vacuum of 7.5" water was applied throughout this period. During this time distillate was removed through the Dean-Stark trap. The total amount of distillate removed was 96 mL. The theoretical amount of distillate was 108 mL (6.0 moles water). a volume of 650 mL of hot water (~70° C.) was cautiously added to the product which was stirred until the prepolymer was dissolved. After cooling to room temperature the product was bottled. The total solids of this product was 51.00 wt % and the RSV was 0.1377 dL/g, determined in 1.0N $NH_4Cl$ at 2.0%. This material had an amine number of 5.50 meq/g and an acid number of 0.38 meq/g, determined by titration as previously described.

Example 15

Preparation of Endcapped Polyaminoamide Prepolymer

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 26.99 g cyclohexanecarboxylic acid (0.2106 mole) followed by 423.03 g adipic acid (2.8947 mole) through a powder funnel while stirring the reaction mixture. The temperature of the reaction mixture was maintained below 125° C. by controlling the rate at which the adipic acid was added to the reaction. The temperature was raised to 170° C. and maintained there for 4 hours. a vacuum of 7.5" water was applied throughout this period. During this time distillate was removed through the Dean-Stark trap. The total amount of distillate removed was 95 mL. The theoretical amount of distillate was 108 mL (6.0 moles water). a volume of 650 mL of hot water (~70° C.) was cautiously added to the product which was stirred until the prepolymer was dissolved. After cooling to room temperature the product was bottled. The total solids of this product was 47.98 wt % and the RSV was 0.1186 dL/g, determined in 1.0N $NH_4Cl$ at 2.0%. This material had an amine number of 5.36 meq/g and an acid number of 0.27 meq/g, determined by titration as previously described.

Example 16

Preparation of Polyaminoamide Prepolymer Using Post-added Amine Method

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 150° C. and maintained there for 1 hour. During this time 15 mL distillate was removed through the Dean-Stark trap. The temperature was then raised to 160° C. and maintained there for 1 hour. During this time an additional 50 mL distillate was removed through the Dean-Stark trap. The temperature was then raised to 170° C. and maintained there for 1 hour. During this time an additional 25 mL distillate was removed through the Dean-Stark trap. At this point, 19.38 g (0.15 mole) of 1-(2-aminoethyl)piperazine was added to the reactor. The temperature was then raised to 180° C. and maintained there for 2 hours. During the two hour cook at 180° C. a vacuum of 10" Hg was maintained in the reactor. During this time an additional 35 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 49.60 wt % and the RSV was 0.1008 dL/g, determined in 1.0N $NH_4Cl$ at 2.0%. This material had an amine number of 5.67 meq/g and an acid number of 0.0685 meq/g, determined by titration as previously described.

Example 17

Preparation of Polyaminoamide Prepolymer Using Post-added Amine Method

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 150° C. and maintained there for 1 hour. During this time 20 mL distillate was removed through the Dean-Stark trap. The temperature was then raised to 160° C. and maintained there for 1 hour. During this time an additional 60 mL distillate was removed through the Dean-Stark trap. The temperature was then raised to 170° C. and maintained there for 1 hour. During this time an additional 25 mL distillate was removed through the Dean-Stark trap. At this point, 15.48 g (0.15 mole) of DETA was added to the reactor. The temperature was then raised to 180° C. and maintained there for 2 hours. During the two hour cook at 180° C. a vacuum of 10" Hg was maintained in the reactor. During this time an additional 10 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 49.33 wt % and the RSV was 0.0977 dL/g, determined in 1.0N NH$_4$Cl at 2.0%. This material had an amine number of 5.92 meq/g and an acid number of 0.0203 meq/g, determined by titration as previously described.

Example 18

Preparation of Polyaminoamide Prepolymer Using Post-added Amine Method

A 1000 mL resin kettle fitted with condenser, Dean-Stark trap, thermocouple, addition funnel and mechanical stirrer was charged with 309.5 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 150° C. and maintained there for 1 hour. During this time 15 mL distillate was removed through the Dean-Stark trap. The temperature was then raised to 160° C. and maintained there for 1 hour. During this time an additional 60 mL distillate was removed through the Dean-Stark trap. The temperature was then raised to 170° C. and maintained there for 1 hour. During this time an additional 30 mL distillate was removed through the Dean-Stark trap. At this point, 15.48 g (0.15 mole) of DETA was added to the reactor. The temperature was maintained at 170° C. for an additional hour. During this period an additional 5 mL distillate was removed through the Dean-Stark trap. The temperature was then raised to 180° C. and maintained there for 2 hours. During the two hour cook at 180° C. a vacuum of 10" Hg was maintained in the reactor. During this time an additional 35 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 49.65 wt % and the RSV was 0.1071 dL/g, determined in 1.0N NH$_4$Cl at 2.0%. This material had an amine number of 5.86 meq/g and an acid number of 0.0201 meq/g, determined by titration as previously described.

Example 19

Preparation of Polyaminopolyamide-epichlorohydrin (PAE) Resin From Endcapped Polyaminoamide Prepolymer A 1000 mL 4-necked flask fitted with condenser, thermocouple and mechanical stirrer was charged with 213.75 g endcapped polyaminoamide prepolymer from Example 9 and 240.00 g deionized (DI) water. To this stirred solution was quickly added 37.01 g epichlorohydrin (0.40 mole). The reaction temperature was maintained at 38–40° C. for 2 hours. At this point 162 g of DI dilution water was added to the reaction and the reaction was heated to 60° C. When the reaction temperature reached 60° C. a solution of 1.32 g concentrated sulfuric acid in 15.7 g DI water was added. The viscosity of the reaction mixture was monitored by the use of Gardner-Holt tubes. After 128 minutes at 60° C. a Gardner-Holt viscosity of "J" was attained. a solution of 5.28 g concentrated sulfuric acid in 125 g DI water was added to terminate the reaction. An additional 518 g DI water was added when the resin was transferred to a bottle. The pH of the resin solution was adjusted to 2.70 using concentrated sulfuric acid. The total solids of this resin was 11.40 wt % and the RSV was 0.6004 dL/g, determined in 1.0N NH$_4$Cl at 2.0%.

Example 20

Preparation of PAE Resin from Endcapped Polyaminoamide Prepolymer

A 1000 mL 4-necked flask fitted with condenser, thermocouple and mechanical stirrer was charged with 213.33 g endcapped polyaminoamide prepolymer from Example 10 and 235.00 g deionized (DI) water. To this stirred solution was quickly added 37.01 g epichlorohydrin (0.40 mole). The reaction temperature was maintained at 38–40° C. for 2 hours. At this point 162 g of DI dilution water was added to the reaction and the reaction was heated to 60° C. When the reaction temperature reached 60° C. a solution of 1.32 g concentrated sulfuric acid in 15.7 g DI water was added. The viscosity of the reaction mixture was monitored by the use of Gardner-Holt tubes. After 50 minutes at 55° C. a Gardner-Holt viscosity of "M" was attained. a solution of 5.28 g concentrated sulfuric acid in 125 g DI water was added to terminate the reaction. An additional 518 g DI water was added when the resin was transferred to a bottle. The pH of the resin solution was adjusted to 2.70 using concentrated sulfuric acid. The total solids of this resin was 11.91 wt % and the RSV was 0.6612 dL/g, determined in 1.0N NH$_4$Cl at 2.0%.

Example 21

Preparation of Amine-terminated Polyaminoamide Prepolymer from Glutaric Acid and DETA

A 1000 mL resin kettle fitted with condenser, Dean-Stark trap, thermocouple, addition funnel and mechanical stirrer was charged with 324.99 g diethylenetriamine (DETA, 3.15 mole). To this reactor was added 396.36 g glutaric acid (3.00 mole) through a powder funnel while stirring the reaction mixture over a period of one hour. The temperature increased from 23.4° C. to 134.8° C. during the addition of glutaric acid to the reactor. The temperature was raised to 170° C. and was held at this temperature for 4 hours while distillate was collected in the Dean-Stark trap. A total of 105 mL distillate were collected in the Dean-Stark trap during this time. At this point heating was discontinued and a volume of 610 mL of hot water (~70° C.) was then cautiously added to the product which was stirred until the prepolymer was dissolved. After cooling to room temperature the product was bottled. The total solids of this product was 48.17 wt % and the RSV was 0.1688 dL/g, determined in 1.0N $NH_4Cl$ at 2.0%. This material had an amine number of 5.90 meq/g and an acid number of 0.30 meq/g, determined by titration as previously described. The acid endgroup concentration was determined to be 2.09% from the carbon 13 NMR spectrum (See Example 60).

Example 22

Preparation of Amine-terminated Polyaminoamide Prepolymer from Glutaric Acid and DETA

A 1000 mL resin kettle fitted with condenser, Dean-Stark trap, thermocouple, addition funnel and mechanical stirrer was charged with 332.73 g diethylenetriamine (DETA, 3.225 mole). To this reactor was added 396.36 g glutaric acid (3.00 mole) through a powder funnel while stirring the reaction mixture over a period of 25 minutes. The temperature increased from 21.9° C. to 128.7° C. during the addition of glutaric acid to the reactor. The temperature was raised to 170° C. and was held at this temperature for 4 hours while distillate was collected in the Dean-Stark trap. A total of 103 mL distillate were collected in the Dean-Stark trap during this time. At this point heating was discontinued and a volume of 610 mL of hot water (~70° C.) was then cautiously added to the product which was stirred until the prepolymer was dissolved. After cooling to room temperature the product was bottled. The total solids of this product was 47.43 wt % and the RSV was 0.1373 dL/g, determined in 1.0N $NH_4Cl$ at 2.0%. This material had an amine number of 6.14 meq/g and an acid number of 0.20 meq/g, determined by titration as previously described. The acid endgroup concentration was determined to be 2.60% from the carbon 13 NMR spectrum (see Example 60).

Example 23

Preparation of Amine-terminated Polyaminoamide Prepolymer from Glutaric Acid and DETA

A 1000 mL resin kettle fitted with condenser, Dean-Stark trap, thermocouple, addition funnel and mechanical stirrer was charged with 332.73 g diethylenetriamine (DETA, 3.225 mole). To this reactor was added 396.36 g glutaric acid (3.00 mole) through a powder funnel while stirring the reaction mixture over a period of 19 minutes. The temperature increased from 21.3° C. to 134.8° C. during the addition of glutaric acid to the reactor. The temperature was raised to 185° C. and was held at this temperature for 4 hours while distillate was collected in the Dean-Stark trap. A total of 115 mL distillate were collected in the Dean-Stark trap during this time. At this point heating was discontinued and a volume of 610 mL of hot water (~70° C.) was then cautiously added to the product which was stirred until the prepolymer was dissolved. After cooling to room temperature the product was bottled. The total solids of this product was 49.69 wt % and the RSV was 0.1699 dL/g, determined in 1.0N $NH_4Cl$ at 2.0%. This material had an amine number of 6.22 meq/g and an acid number of 0.13 meq/g, determined by titration as previously described. The acid endgroup concentration was determined to be 1.35% from the carbon 13 NMR spectrum (see Example 60).

Example 24

Preparation of Amine-terminated Polyaminoamide Prepolymer from Dimethyl Glutarate and DETA

A 1000 mL resin kettle fitted with condenser, Dean-Stark trap, thermocouple, addition funnel and mechanical stirrer was charged with 336.43 g diethylenetriamine (DETA, 3.2661 mole). To this reactor was added 480.51 g dimethyl glutarate (3.00 mole) through an addition funnel while stirring the reaction mixture. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 105 mL distillate were collected in the Dean-Stark trap during this time. The temperature was then raised to 120° C. and maintained there for 30 minutes. During this time an additional 100 mL distillate was removed through the Dean-Stark trap. The temperature was then raised to 150° C. and maintained there for 45 minutes. During this time an additional 30 mL distillate was removed through the Dean-Stark trap. The temperature was then raised to 185° C. and maintained there for 4 hours. During this time an additional 15 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 47.92 wt % and the RSV was 0.1450 dL/g, determined in 1.0N $NH_4Cl$ at 2.0%. This material had an amine number of 6.93 meq/g and an acid number of 0.16 meq/g, determined by titration as previously described. The acid endgroup concentration was determined to be 0.99% from the carbon 13 NMR spectrum (see Example 60).

Example 25

Preparation of Amine-terminated Polyaminoamide Prepolymer from Dimethyl Glutarate and DETA

A 1000 mL resin kettle fitted with condenser, Dean-Stark trap, thermocouple, addition funnel and mechanical stirrer was charged with 348.20 g diethylenetriamine (DETA, 3.375 mole). To this reactor was added 480.51 g dimethyl glutarate (3.00 mole) through an addition funnel while stirring the reaction mixture. The temperature was raised to 100° C. and the reaction was refluxed at this temperature for 1 hour. At the end of the one hour reflux 0the condenser configuration was changed to distill through a Dean-Stark trap. The reaction was held at 100° C. for an additional 1 hours while distillate was collected in the Dean-Stark trap. A total of 65 mL distillate were collected in the Dean-Stark trap during this time. The temperature was then raised to 120° C. and maintained there for 30 minutes. During this time an additional 60 mL distillate was removed through the Dean-Stark trap. The temperature was then raised to 150° C. and maintained there for 45 minutes. During this time an additional 110 mL distillate was removed through the Dean-Stark trap. The temperature was then raised to 185° C. and maintained there for 4 hours. During this time an additional 13 mL distillate was removed through the Dean-Stark trap. At this point heating was discontinued and the reaction was allowed to cool to 170° C. When the temperature had reached 170° C., a volume of 610 mL of hot water (~70° C.) was then cautiously added to the product which was stirred until the prepolymer was dissolved. After cooling to room temperature the product was bottled. The total solids of this product was 51.05 wt % and the RSV was 0.1230 dL/g, determined in 1.0N $NH_4Cl$ at 2.0%. This material had an amine number of 6.91 meq/g and an acid number of 0.12 meq/g, determined by titration as previously described. The acid endgroup concentration was determined to be 0.66% from the carbon 13 NMR spectrum (see Example 60).

Example 26

Preparation of Amine-terminated Polyaminoamide Prepolymer from Dimethyl Glutarate and DETA with Post-addition of DETA A 1000 mL resin kettle fitted with condenser, Dean-Stark trap, thermocouple, addition funnel and mechanical stirrer was charged with 322.97 g diethylenetriamine (DETA, 3.1305 mole). To this reactor was added 480.51 g dimethyl glutarate (3.00 mole) through an addition funnel while stirring the reaction mixture. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 85 mL distillate were collected in the Dean-Stark trap during this time. The temperature was then raised to 120° C. and maintained there for 30 minutes. During this time an additional 115 mL distillate was removed through the Dean-Stark trap. The temperature was then raised to 150° C. and maintained there for 45 minutes. During this time an additional 33 mL distillate was removed through the Dean-Stark trap. An additional 13.46 g DETA (0.1305 moles) was then added to the reactor and the temperature was raised to 185° C. and maintained there for 4 hours. During this time an additional 23 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 48.22 wt % and the RSV was 0.1515 dL/g, determined in 1.0N $NH_4Cl$ at 2.0%. This material had an amine number of 6.43 meq/g and an acid number of 0.12 meq/g, determined by titration as previously described. The acid endgroup concentration was determined to be 0.85% from the carbon 13 NMR spectrum (see Example 60).

Example 27

Preparation of Amine-terminated Polyaminoamide Prepolymer from Dimethyl Adipate and DETA with Post-addition of DETA A 1000 mL resin kettle fitted with condenser, Dean-Stark trap, thermocouple, addition funnel and mechanical stirrer was charged with 322.97 g diethylenetriamine (DETA, 3.1305 mole). To this reactor was added 522.60 g dimethyl adipate (3.00 mole) through an addition funnel while stirring the reaction mixture. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours with this configuration. No distillate was collected in the Dean-Stark trap during this time. The temperature was then raised to 120° C. and maintained there for 30 minutes. During this time 88 mL distillate was collected in the Dean-Stark trap. The temperature was then raised to 150° C. and maintained there for 45 minutes. During this time an additional 132 mL distillate was removed through the Dean-Stark trap. An additional 13.46 g DETA (0.1305 moles) was then added to the reactor and the temperature was raised to 185° C. and maintained there for 4 hours. During this time an additional 60 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 48.84 wt % and the RSV was 0.1074 dL/g, determined in 1.0N $NH_4Cl$ at 2.0%. This material had an amine number of 6.25 meq/g and an acid number of 0.12 meq/g, determined by titration as previously described. The acid endgroup concentration was determined to be 3.76% from the carbon 13 NMR spectrum (see Example 60).

Example 28

Preparation of Amine-terminated Polyaminoamide Prepolymer from Dimethyl Glutarate and DETA with Post-addition of DETA A 1000 mL resin kettle fitted with condenser, Dean-Stark trap, thermocouple, addition funnel and mechanical stirrer was charged with 336.43 g diethylenetriamine (DETA, 3.2661 mole). To this reactor was added 480.51 g dimethyl glutarate (3.00 mole) through an addition funnel while stirring the reaction mixture. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 95 mL distillate were collected in the Dean-Stark trap during this time. The temperature was then raised to 120° C. and maintained there for 30 minutes. During this time an additional 103 mL distillate was removed through the Dean-Stark trap. The temperature 0was then raised to 150° C. and maintained there for 45 minutes. During this time an additional 35 mL distillate was removed through the Dean-Stark trap. An additional 13.46 g DETA (0.1305 moles) was then added to the reactor and the temperature was raised to 190° C. and maintained there for 4 hours. During this time an additional 17 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 48.17 wt % and the RSV was 0.1458 dL/g, determined in 1.0N $NH_4Cl$ at 2.0%. This material had an amine number of 6.25 meq/g and an acid number of 0.10 meq/g, determined by titration as previously described. The acid endgroup concentration was determined to be 1.18% from the carbon 13 NMR spectrum (see Example 60.

Example 29

Preparation of Amine-terminated Polyaminoamide Prepolymer from Dimethyl Glutarate and DETA with Added Sulfuric Acid A 1000 mL resin kettle fitted with condenser, Dean-Stark trap, thermocouple, addition funnel and mechanical stirrer was charged with 336.43 g diethylenetriamine (DETA, 3.2661 mole). To this reactor was added dropwise 29.24 g of a 25% aqueous solution of sulfuric acid. The temperature rose from 21.2° C. to 36.5° C. during the addition of the sulfuric acid. Then a quantity of 480.51 g dimethyl glutarate (3.00 mole) was added to the reactor through an addition funnel while stirring the reaction mixture. The reaction mixture's temperature had dropped to 25.6° C. by the end of the dimethyl glutarate addition. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 145 mL distillate were collected 0in the Dean-Stark trap during this time. The temperature was then raised to 120° C. and maintained there for 30 minutes. During this time an additional 85 mL distillate was removed through the Dean-Stark trap. The temperature was then raised to 150° C. and maintained there for 45 minutes. During this time an additional 33 mL distillate was removed through the Dean-Stark trap. The temperature of the reaction was then increased to 185° C. and maintained there for 4 hours. During this time an additional 17 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 46.30 wt % and the RSV was 0.1674 dL/g, determined in 1.0N $NH_4Cl$ at 2.0%. This material had an amine number of 5.83 meq/g and an acid number of 0.32 meq/g, determined by titration as previously described. The acid endgroup concentration was determined to be 0.73% from the carbon 13 NMR spectrum (see Example 60).

Example 30

Preparation of Amine-terminated Polyaminoamide Prepolymer from Dimethyl Glutarate and DETA with Added Sulfuric Acid A 1000 mL resin kettle fitted with condenser, Dean-Stark trap, thermocouple, addition funnel and mechanical stirrer was charged with 336.43 g diethylenetriamine (DETA, 3.2661 mole). To this reactor was added dropwise 58.48 g of a 25% aqueous solution of sulfuric acid. The temperature rose from 21.3° C. to 60.0° C. during the addition of the sulfuric acid. Then a quantity of 480.51 g dimethyl glutarate (3.00 mole) was added to the reactor through an addition funnel while stirring the reaction mixture. The reaction mixture's temperature had dropped to 38.6° C. by the end of the dimethyl glutarate addition. The temperature was raised to 100° C. and the reaction was refluxed at this temperature for 1 hour. At the end of the one hour reflux the condenser configuration was changed to distill through 0a Dean-Stark trap. The reaction was held at 100° C. for an additional 1.5 hours while distillate was collected in the Dean-Stark trap. A total of 180 mL distillate were collected in the Dean-Stark trap during this time. The temperature was then raised to 120° C. and maintained there for 30 minutes. During this time an additional 60 mL distillate was removed through the Dean-Stark trap. The temperature was then raised to 150° C. and maintained there for 45 minutes. During this time an additional 30 mL distillate was removed through the Dean-Stark trap. The temperature of the reaction was then increased to 185° C. and maintained there for 4 hours. During this time an additional 25 mL distillate was removed through the Dean-Stark trap. At this point heating was discontinued and the reaction was allowed to cool to 150° C. When the temperature had reached 150° C., a volume of 610 mL of hot water (~70° C.) was then cautiously added to the product which was stirred until the prepolymer was dissolved. After cooling to room temperature the product was bottled. The total solids of this product was 47.99 wt % and the RSV was 0.1653 dL/g, determined in 1.0N $NH_4Cl$ at 2.0%. This material had an amine number of 5.58 meq/g and an acid number of 0.65 meq/g, determined by titration as previously described. The acid endgroup concentration was determined to be 0.47% from the carbon 13 NMR spectrum (see Example 60).

Example 31

Preparation of Amine-terminated Polyaminoamide Prepolymer from Dimethyl Glutarate and DETA with Added Sulfuric Acid A 1000 mL resin kettle fitted with condenser, Dean-Stark trap, thermocouple, addition funnel and mechanical stirrer was charged with 336.43 g diethylenetriamine (DETA, 3.2661 mole). To this reactor was added dropwise 58.48 g of a 25% aqueous solution of sulfuric acid. The temperature rose from 21.6° C. to 57.0° C. during the addition of the sulfuric acid. Then a quantity of 480.51 g dimethyl glutarate (3.00 mole) was added to the reactor through an addition funnel while stirring the reaction mixture. The reaction mixture's temperature had dropped to 36.9° C. by the end of the dimethyl glutarate addition. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 170 mL distillate were collected in the Dean-Stark trap during this time. The temperature was then raised to 120° C. and maintained there for 30 minutes. During this time an additional 60 mL distillate was removed through the Dean-Stark trap. The temperature was then raised to 150° C. and maintained there for 45 minutes. During this time an additional 35 mL distillate was removed through the Dean-Stark trap. The temperature of the reaction was then increased to 190° C. and maintained there for 4 hours. During this time an additional 23 mL distillate was removed through the Dean-Stark trap. At this point heating was discontinued and the reaction was allowed to cool to 175° C. When the temperature had reached 175° C., a volume of 610 mL of hot water (~70° C.) was then cautiously added to the product which was stirred until the prepolymer was dissolved. After cooling to room temperature the product was bottled. The total solids of this product was 48.27 wt % and the RSV was 0.1735 dL/g, determined in 1.0N $NH_4Cl$ at 2.0%. This material had an amine number of 5.84 meq/g and an acid number of 0.54 meq/g, determined by titration as previously described. The acid endgroup concentration was determined to be 0.44% from the carbon 13 NMR spectrum (see Example 60).

Example 32

Preparation of Amine-terminated Polyaminoamide Prepolymer from Dimethyl Glutarate and DETA with Added Sulfuric Acid A 1000 mL resin kettle fitted with condenser, Dean-Stark trap, thermocouple, addition funnel and mechanical stirrer was charged with 336.43 g diethylenetriamine (DETA, 3.2661 mole). To this reactor was added dropwise 116.96 g of a 25% aqueous solution of sulfuric acid. The temperature rose from 22.1° C. to 78.6° C. during the addition of the sulfuric acid. Then a quantity of 480.51 g dimethyl glutarate (3.00 mole) was added to the reactor through an addition funnel while stirring the reaction mixture. The reaction mixture's temperature had dropped to 53.7° C. by the end of the dimethyl glutarate addition. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 195 mL distillate were collected in the Dean-Stark trap during this time. The temperature was then raised to 120° C. and maintained there for 30 minutes. During this time an additional 65 mL distillate was removed through the Dean-Stark trap. The temperature was then raised to 150° C. and maintained there for 45 minutes. During this time an additional 40 mL distillate was removed through the Dean-Stark trap. The temperature of the reaction was then increased to 185° C. and maintained there for 4 hours. During this time an additional 38 mL distillate was removed through the Dean-Stark trap. At this point heating was discontinued and the reaction was allowed to cool to 160° C. When the temperature had reached 160° C., a volume of 610 mL of hot water (~70° C.) was then cautiously added to the product which was stirred until the prepolymer was dissolved. After cooling to room temperature the product was bottled. The total solids of this product was 49.44 wt % and the RSV was 0.1716 dL/g, determined in 1.0N $NH_4Cl$ at 2.0%. This material had an amine number of 5.48 meq/g and an acid number of 1.03 meq/g, determined by titration as previously described. The acid endgroup concentration was determined to be 0.17% from the carbon 13 NMR spectrum (see Example 60).

Example 33

Preparation of Amine-terminated Polyaminoamide Prepolymer from Dimethyl Glutarate and DETA with Added Sulfuric Acid A 1000 mL resin kettle fitted with condenser, Dean-Stark trap, thermocouple, addition funnel and mechanical stirrer was charged with 336.43 g diethylenetriamine (DETA, 3.2661 mole). To this reactor was added dropwise 29.42 g of concentrated sulfuric acid. The temperature rose from 20.8° C. to 51.4° C. during the addition of the sulfuric acid. Then a quantity of 480.51 g dimethyl glutarate (3.00 mole) was added to the reactor through an addition funnel while stirring the reaction mixture. The reaction mixture's temperature had dropped to 37.8° C. by the end of the dimethyl glutarate addition. The temperature was raised to 100° C. and the reaction was refluxed at this temperature for 1 hour. At the end of the one hour reflux the condenser configuration was changed to distill through a Dean-Stark trap. The reaction was held at 100° C. for an additional 1.5 hours while distillate was collected in the Dean-Stark trap. A total of 110 mL distillate were collected in the Dean-Stark trap during this time. The temperature was then raised to 120° C. and maintained there for 30 minutes. During this time an additional 95 mL distillate was removed through the Dean-Stark trap. The temperature was then raised to 150° C. and maintained there for 45 minutes. During this time an additional 35 mL distillate was removed through the Dean-Stark trap. The temperature of the reaction was then increased to 185° C. and maintained there for 4 hours. During this time an additional 18 mL distillate was removed through the Dean-Stark trap. At this point heating was discontinued and the reaction was allowed to cool to 167° C. When the temperature had reached 167° C., a volume of 610 mL of hot water (~70° C.) was then cautiously added to the product which was stirred until the prepolymer was dissolved. After cooling to room temperature the product was bottled. The total solids of this product was 49.64 wt % and the RSV was 0.1622 dL/g, determined in 1.0N $NH_4Cl$ at 2.0%. This material had an amine number of 5.22 meq/g and an acid number of 1.05 meq/g, determined by titration as previously described. The acid endgroup concentration was determined to be 0.38% from the carbon 13 NMR spectrum (see Example 60).

Example 34

Preparation of PAE Resin from Amine-terminated Polyaminoamide Prepolymer of Example 24

A 1000 mL 4-necked flask fitted with condenser, thermocouple and mechanical stirrer was charged with 199.89 g amine terminated polyaminoamide prepolymer from Example 24 and 120.00 g deionized (DI) water. The pH of this solution was adjusted to 9.5 by adding 3.34 g of concentrated sulfuric acid. To this stirred solution was quickly added 43.95 g epichlorohydrin (0.475 mole). The temperature of the reaction was held at 38–42° C. for two hours. At the end of the 2 hours the pH of the reaction had dropped to 7.91. At this point 177.00 g DI water were added to the reaction and the pH was adjusted to 7.0 by the addition of 4.46 g of concentrated sulfuric acid. The reaction temperature was then increased to 60° C. When the reaction temperature reached 60° C. the viscosity of the reaction mixture was monitored by the use of Gardner-Holt tubes. After 92 minutes at 60° C. a Gardner-Holt viscosity of "E" was attained. The pH had dropped to 5.75 at this point. A quantity of 185.00 g DI dilution water was added and the temperature was maintained at 60° C. while continuing to monitor the viscosity using Gardner-Holt tubes. A Gardner-Holt viscosity of "H" was attained after an additional 86 minutes and heating of the reaction was discontinued. The pH of the reaction was 5.31 at this point. A solution of 5.28 g concentrated sulfuric acid in 125 g DI water was added to terminate the reaction. An additional 240 g DI water was added when the resin was transferred to a bottle. The pH of the resin solution was adjusted to 2.70 using 5.28 g concentrated sulfuric acid. The total solids of this resin was 13.86 wt % and the RSV was 0.4958 dL/g, determined in 1.0N $NH_4Cl$ at 2.0%. The Brookfield viscosity of the product was 57.5 cps (spindle #2 at 60 rpm using a Brookfield DV-II viscometer at 25° C.). Analysis for epichlorohydrin hydrolysis products showed 1,3-dichloro-2-propanol (DCP) at 353 ppm and 3-chloro-1,2-propanediol (CPD) at 186 ppm.

Example 35

Preparation of PAE Resin from Amine-terminated Polyaminoamide Prepolymer Made from Dimethyl Glutarate and DETA with Post-addition of DETA of Example 28

A 1000 mL 4-necked flask fitted with condenser, thermocouple and mechanical stirrer was charged with 198.85 g amine terminated polyaminoamide prepolymer from Example 28 and 120.00 g deionized (DI) water. The pH of this solution was adjusted to 9.5 by adding 3.10 g of concentrated sulfuric acid. To this stirred solution was quickly added 46.27 g epichlorohydrin (0.50 mole). The temperature of the reaction was held at 38–42° C. for two hours. At the end of the 2 hours the pH of the reaction had dropped to 7.65. At this point 177.00 g DI water were added to the reaction and the pH was adjusted to 7.25 by the addition of 1.85 g of concentrated sulfuric acid. The reaction temperature was then increased to 60° C. When the reaction temperature reached 60° C. the viscosity of the reaction mixture was monitored by the use of Gardner-Holt tubes. After 60 minutes at 60° C. a Gardner-Holt viscosity of "E" was attained. The pH had dropped to 6.03 at this point. A quantity of 185.00 g DI dilution water was added and the temperature was maintained at 60° C. while continuing to monitor the viscosity using Gardner-Holt tubes. A Gardner-Holt viscosity of "H" was attained after an additional 37 minutes and heating of the reaction was discontinued. The pH of the reaction was 5.55 at this point. A solution of 5.28 g concentrated sulfuric acid in 125 g DI water was added to terminate the reaction. An additional 240 g DI water was added when the resin was transferred to a bottle. The pH of the resin solution was adjusted to 2.70 using 1.48 g concentrated sulfuric acid. The total solids of this resin was 13.84 wt % and the RSV was 0.7053 dL/g, determined in 1.0N $NH_4Cl$ at 2.0%. The Brookfield viscosity of the product was 105 cps (spindle #2 at 60 rpm using a Brookfield DV-II viscometer at 25° C.). Analysis for epichlorohydrin hydrolysis products showed 1,3-dichloro-2-propanol (DCP) at 581 ppm and 3-chloro-1,2-propanediol (CPD) at 252 ppm.

Example 36

Preparation of PAE Resin from Amine-terminated Polyaminoamide Prepolymer Made from Dimethyl Glutarate and DETA with Added Sulfuric Acid of Example 32

A 1000 mL 4-necked flask fitted with condenser, thermocouple and mechanical stirrer was charged with 203.28 g amine terminated polyaminoamide prepolymer from Example 32 and 120.00 g deionized (DI) water. The pH of this solution was adjusted to 9.25 by adding 1.75 g of concentrated sulfuric acid. To this stirred solution was quickly added 46.27 g epichlorohydrin (0.50 mole). The temperature of the reaction was held at 38–42° C. for two hours. At the end of the 2 hours the pH of the reaction had dropped to 7.40. At this point 177.00 g DI water were added to the reaction and the pH was adjusted to 7.01 by the addition of 1.80 g of concentrated sulfuric acid. The reaction temperature was then increased to 60° C. When the reaction temperature reached 60° C. the viscosity of the reaction mixture was monitored by the use of Gardner-Holt tubes. After 60 minutes at 60° C. a Gardner-Holt viscosity of "E" was attained. The pH had dropped to 5.89 at this point. A quantity of 185.00 g DI dilution water was added and the temperature was maintained at 60° C. while continuing to monitor the viscosity using Gardner-Holt tubes. A Gardner-Holt viscosity of "H" was attained after an additional 37 minutes and heating of the reaction was discontinued. The pH of the reaction was 5.53 at this point. A solution of 5.28 g concentrated sulfuric acid in 125 g DI water was added to terminate the reaction. An additional 240 g DI water was added when the resin was transferred to a bottle. The pH of the resin solution was adjusted to 2.70 using 6.87 g concentrated sulfuric acid. The total solids of this resin was 14.22 wt % and the RSV was 0.7505 dL/g, determined in 1.0N $NH_4Cl$ at 2.0%. The Brookfield viscosity of the product was 87.5 cps (spindle #2 at 60 rpm using a Brookfield DV-II viscometer at 25° C.). Analysis for epichlorohydrin hydrolysis products showed 1,3-dichloro-2-propanol (DCP) at 806 ppm and 3-chloro-1,2-propanediol (CPD) at 315 ppm.

Example 37

Preparation of PAE Resin from Amine-terminated Polyaminoamide Prepolymer Made from Dimethyl Glutarate and DETA with Added Sulfuric Acid of Example 32

A 1000 mL 4-necked flask fitted with condenser, thermocouple and mechanical stirrer was charged with 203.28 g amine terminated polyaminoamide prepolymer from Example 32 and 120.00 g deionized (DI) water. The pH of this solution was adjusted to 9.25 by adding 1.23 g of concentrated sulfuric acid. To this stirred solution was quickly added 50.89 g epichlorohydrin (0.55 mole). The temperature of the reaction was held at 38–42° C. for two hours. At the end of the 2 hours the pH of the reaction had dropped to 7.41. At this point 194.00 g DI water were added to the reaction and the pH was adjusted to 7.13 by the addition of 1.10 g of concentrated sulfuric acid. The reaction temperature was then increased to 60° C. When the reaction temperature reached 60° C. the viscosity of the reaction mixture was monitored by the use of Gardner-Holt tubes. After 70 minutes at 60° C. a Gardner-Holt viscosity of "E" was attained. The pH had dropped to 5.92 at this point. A quantity of 208.00 g DI dilution water was added and the temperature was maintained at 60° C. while continuing to monitor the viscosity using Gardner-Holt tubes. A Gardner-Holt viscosity of "H" was attained after an additional 51 minutes and heating of the reaction was discontinued. The pH of the reaction was 5.62 at this point. A solution of 5.00 g concentrated sulfuric acid in 125 g DI water was added to terminate the reaction. An additional 240 g DI water was added when the resin was transferred to a bottle. The pH of the resin solution was adjusted to 2.70 using 1.12 g concentrated sulfuric acid. The total solids of this resin was 14.08 wt % and the RSV was 0.6151 dL/g, determined in 1.0N $NH_4Cl$ at 2.0%. The Brookfield viscosity of the product was 67.5 cps (spindle #2 at 60 rpm using a Brookfield DV-II viscometer at 25° C.). Analysis for epichlorohydrin hydrolysis products showed 1,3-dichloro-2-propanol (DCP) at 1,317 ppm and 3-chloro-1,2-propanediol (CPD) at 390 ppm.

Example 38

Preparation of PAE Resin from Amine-terminated Polyaminoamide Prepolymer Made from Dimethyl Glutarate and DETA of Example 25

A 1000 mL 4-necked flask fitted with condenser, thermocouple and mechanical stirrer was charged with 184.7 g amine terminated polyaminoamide prepolymer from Example 25 and 130.00 g deionized (DI) water. The pH of this solution was adjusted to 9.25 by adding 4.42 g of concentrated sulfuric acid. To this stirred solution was quickly added 55.52 g epichlorohydrin (0.60 mole). The temperature of the reaction was held at 38–42° C. for two hours. At the end of the 2 hours the pH of the reaction had dropped to 7.27. At this point 206 g DI water were added to the reaction. The reaction temperature was then increased to 60° C. When the reaction temperature reached 60° C. the viscosity of the reaction mixture was monitored by the use of Gardner-Holt tubes. After 154 minutes at 60° C. the Gardner-Holt viscosity had only increased to "C". In order to speed up the reaction 2.92 g of 20% NaOH was added to bring the pH from 5.48 to 5.78. The viscosity increased to "E" 25 minutes after the pH adjustment. A quantity of 210.00 g DI dilution water was added and the temperature was maintained at 60° C. while continuing to monitor the viscosity using Gardner-Holt tubes. After 71 minutes the Gardner-Holt viscosity had only gone to "D" and was not increasing. The pH was adjusted form 5.41 to 5.62 by the addition of 1.94 g of 20% NaOH. A Gardner-Holt viscosity "H" was attained after an additional 32 minutes and heating of the reaction was discontinued. The pH of the reaction was 5.51 at this point. A solution of 5.28 g concentrated sulfuric acid in 125 g DI water was added to terminate the reaction. An additional 240 g DI water was added when the resin was transferred to a bottle. The pH of the resin solution was adjusted to 2.70 using 0.85 g concentrated sulfuric acid. The total solids of this resin was 13.29 wt % and the RSV was 0.7173 dL/g, determined in 1.0N $NH_4Cl$ at 2.0%. The Brookfield viscosity of the product was 70 cps (spindle #2 at 60 rpm using a Brookfield DV-II viscometer at 25° C.). Analysis for epichlorohydrin hydrolysis products showed 1,3-dichloro-2-propanol (DCP) at 852 ppm and 3-chloro-1,2-propanediol (CPD) at 272 ppm.

Example 39

Biodehalogenation and Acid Test of the PAE Resin of Example 36

A 332.86 gram sample of the PAE resin of Example 36 and 133.14 g deionized water were charged into a one liter 4-necked, round-bottomed flask equipped with an overhead stirrer, a condenser, an air sparge and a pH meter. The pH was adjusted to 5.8 with 6.13 grams of 20% aqueous sodium hydroxide. To the mixture was added 36.98 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 6.93 grams of a nutrient solution. (The nutrient solution consisted of 8026 ppm of potassium dihydrogen phosphate, 24780 ppm of urea, 4160 ppm of magnesium sulfate and 840 ppm of calcium chloride in tap water.) The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis, the mixture was cooled to room temperature, the pH was adjusted to 2.8 with 2.58 g of 96% sulfuric acid and 5.41 grams of biocide solution was added. [The biocide solution consisted of 10% active Proxel® BD (from Zeneca Biocides) and 1.67% potassium sorbate in deionized water.] The resin had a total solids of 13.44 wt %.

The sample was analyzed for epichlorohydrin and epichlorohydrin hydrolysis products by GC as described previously. The analysis showed no detectable epichlorohydrin, DCP or CPD.

A 150.84 g sample of the biodehalogenated resin was placed in an 8 oz. glass jar and the pH was adjusted to 1.0 with 3.61 g concentrated sulfuric acid. The jar was placed in a 50° C. water bath for 24 hours while being stirred with a magnetic stirrer. The sample was then cooled to room temperature and adjusted to pH 2.81 with 3.86 g of 30% NaOH solution. This material was analyzed for epichlorohydrin and epichlorohydrin hydrolysis products by GC as described previously. The analysis showed no detectable epichlorohydrin, 0.23 ppm 1,3-DCP, 0.47 ppm 2,3-DCP and 2.62 ppm CPD.

Example 40

Papermaking with the Biodehalogenated PAE Resin of Example 39

Paper handsheets were prepared on a Noble and Wood handsheet machine at pH 7.5 with 50:50 Rayonier bleached Kraft:Crown Vantage bleached hardwood Kraft dry lap pulp refined to 500 mL Canadian standard freeness. Sheets were generated having 40 lb/3000 sq. ft. basis weight containing 1.0% of the biodehalogenated resin of Example 39. Handsheets were wet pressed to 33% solids and dried on a drum drier at 230° C. for 55 seconds to give 3–5% moisture. Some of the handsheets were oven-cured at 80° C. for 30 minutes. The paper was conditioned according to TAPPI Method T-402 and tested. Dry tensile strength was determined using TAPPI Method T-494. Wet tensile strength was determined using TAPPI Method T-456 with a two hour soak time. Some of the paper was natural aged by conditioning at greater than two weeks at 50% relative humidity and at 23° C. and then tested. Dry tensile strength was determined using TAPPI Method T-494. Wet tensile strength was determined using TAPPI Method T-456 with a two hour soak time. To measure CPD in paper products, five grams of the paper product was extracted with water according to the method described in European standard EN 647, dated October 1993. Then 5.80 grams of sodium chloride was dissolved into 20 ml of water extract. The salted aqueous extract was transferred to a 20 gram capacity Extrelut column and allowed to saturate the column for 15 minutes. After three washes of 3 ml ethyl acetate and saturation of the column, the Extrelut column was eluted until 300 ml of eluent has been recovered in about 1 hour. The 300 ml of ethyl acetate extract was concentrated to about 5 ml usin, a 500 ml Kuderna-Danish concentrating apparatus (if necessary, further concentrating was done by using a micro Kuderna-Danish apparatus). The concentrated extract was analyzed by GC using a halogen specific detector (XSD).

The oven-cured paper gave a wet tensile strength value of 5.68 lb/in and the naturally aged paper had a wet tensile strength value of 4.99 lb/in. The oven cured sample was analyzed for epichlorohydrin and epichlorohydrin hydrolysis products and was found to contain no epichlorohydrin or DCP and 113 ppb of CPD. This compares to 638 ppb CPD for Comparative Example 4 (see Table 10).

Example 41

Biodehalogenation and Acid Test of the PAE Resin of Example 37

A 520.00 gram sample of the PAE resin of Example 37 was charged into a one liter 4-necked, round-bottomed flask equipped with an overhead stirrer, a condenser, an air sparge and a pH meter. The pH was adjusted to 5.8 with 8.62 grams of 20% aqueous sodium hydroxide. To the mixture was added 60.00 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 6.93 grams of a nutrient solution. (The nutrient solution consisted of 8,026 ppm of potassium dihydrogen phosphate, 24,780 ppm of urea, 4,160 ppm of magnesium sulfate and 840 ppm of calcium chloride in tap water.) The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis, the mixture was cooled to room temperature, the pH was adjusted to 2.8 with 1.40 g of 96% sulfuric acid and 7.41 grams of biocide solution was added. [The biocide solution consisted of 10% active Proxel® BD (from Zeneca Biocides) and 1.67% potassium sorbate in deionized water.] The resin had a total solids of 11.76 wt %.

The sample was analyzed for epichlorohydrin and epichlorohydrin hydrolysis products by GC as described previously. The analysis showed no detectable epichlorohydrin, DCP or CPD and 1.05 ppm of 2,3-DCP.

A 151.47 g sample of the biodehalogenated resin was subjected to the acid test by placing it in an 8 oz. glass jar and the pH was adjusted to 1.0 with 1.88 g concentrated sulfuric acid. The jar was placed in a 50° C. water bath for 24 hours while being stirred with a magnetic stirrer. The sample was then cooled to room temperature and adjusted to pH 2.60 with 4.15 g of 30% NaOH solution. This material was analyzed for epichlorohydrin and epichlorohydrin hydrolysis products by GC as described previously. The analysis showed no detectable epichlorohydrin or 1,3-DCP, 0.57 ppm 2,3-DCP and 5.53 ppm CPD.

Example 42

Papermaking with the Biodehalogenated PAE Resin of Example 41

Paper handsheets were prepared on a Noble and Wood handsheet machine at pH 7.5 with 50:50 Rayonier bleached Kraft:Crown Vantage bleached hardwood Kraft dry lap pulp refined to 500 mL Canadian standard freeness. Sheets were generated having 40 lb/3000 sq. ft. basis weight containing 1.0% of the biodehalogenated resin of Example 41. Handsheets were wet pressed to 33% solids and dried on a drum drier at 230° C. for 55 seconds to give 3–5% moisture. Some of the handsheets were oven-cured at 80° C. for 30 minutes. The paper was conditioned according to TAPPI Method T-402 and tested. Dry tensile strength was determined using TAPPI Method T-494. Wet tensile strength was determined using TAPPI Method T-456 with a two hour soak time. Some of the paper was natural aged by conditioning at greater than two weeks at 50% relative humidity and at 23° C. and then tested. Dry tensile strength was determined using TAPPI Method T-494. Wet tensile strength was determined using TAPPI Method T-456 with a two hour soak time. To measure CPD in paper products, five grams of the paper product was extracted with water according to the method described in European standard EN 647, dated October 1993. Then 5.80 grams of sodium chloride was dissolved into 20 ml of water extract. The salted aqueous extract was transferred to a 20 gram capacity Extrelut column and allowed to saturate the column for 15 minutes. After three washes of 3 ml ethyl acetate and saturation of the column, the Extrelut column was eluted until 300 ml of eluent has been recovered in about 1 hour. The 300 ml of ethyl acetate extract was concentrated to about 5 ml using a 500 ml Kuderna-Danish concentrating apparatus (if necessary, further concentrating was done by using a micro Kuderna-Danish apparatus). The concentrated extract was analyzed by GC using a halogen specific detector (XSD). The oven-cured paper gave a wet tensile strength value of 5.76 lb/in and the naturally aged paper had a wet tensile strength value of 5.43 lb/in. The oven cured sample was analyzed for epichlorohydrin and epichlorohydrin hydrolysis products and was found to contain no epichlorohydrin or DCP and 133 ppb of CPD. This compares to 638 ppb CPD for Comparative Example 4 (see Table 10).

Example 43

Biodehalogenation and Acid Test of the PAE Resin of Example 34

A 400.00 gram sample of the PAE resin of Example 34 and 148 g deionized water were charged into a one liter 4-necked, round-bottomed flask equipped with an overhead stirrer, a condenser, an air sparge and a pH meter. The pH-was adjusted to 5.8 with 7.80 grams of 20% aqueous sodium hydroxide. To the mixture was added 46.20 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value consisted of 8,026 ppm of potassium dihydrogen phosphate, 24,780 ppm of urea, 4,160 ppm of magnesium sulfate and 840 ppm of calcium chloride in tap water. The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis, the mixture was cooled to room temperature, the pH was adjusted to 2.23 with 96% sulfuric acid and 7.41 grams of biocide solution was added. [The biocide solution consisted of 10% active Proxel® BD (from Zeneca Biocides) and 1.67% potassium sorbate in deionized water.] The resin had a total solids of 10.45 wt %.

The sample was analyzed for epichlorohydrin and epichlorohydrin hydrolysis products by GC as described previously. The analysis showed no detectable epichlorohydrin, 1,3-DCP or CPD and 0.56 ppm of 2,3-DCP.

A 150.01 sample of the biodehalogenated resin was subjected to the acid test by placing it in an 8 oz. glass jar and the pH was adjusted to 1.0 with 2.33 g concentrated sulfuric acid. The jar was placed in a 50° C. water bath for 24 hours while being stirred with a magnetic stirrer. The sample was then cooled to room temperature and adjusted to pH 2.83 with 5.47 g of 30% NaOH solution. This material was analyzed for epichlorohydrin and epichlorohydrin hydrolysis products by GC as described previously. The analysis showed no detectable epichlorohydrin or 1,3-DCP, 0.39 ppm 2,3-DCP and 2.7 ppm CPD.

Example 44

Biodehalogenation and Acid Test of the PAE Resin of Example 35

A 359.20 gram sample of the PAE resin of Example 35 and 137.9 g deionized water were charged into a one liter 4-necked, round-bottomed flask equipped with an overhead stirrer, a condenser, an air sparge and a pH meter. The pH was adjusted to 5.8 with 6.66 grams of 20% aqueous sodium hydroxide. To the mixture was added 46.20 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value consisted of 8,026 ppm of potassium dihydrogen phosphate, 24,780 ppm of urea, 4,160 ppm of magnesium sulfate and 840 ppm of calcium chloride in tap water. The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis, the mixture was cooled to room temperature, the pH was adjusted to 2.8 with 96% sulfuric acid and 7.41 grams of biocide solution was added. [The biocide solution consisted of 10% active Proxel® BD (from Zeneca Biocides) and 1.67% potassium sorbate in deionized water.] The resin had a total solids of 10.65 wt %.

The sample was analyzed for epichlorohydrin and epichlorohydrin hydrolysis products by GC as described previously. The analysis showed no detectable epichlorohydrin, 1,3-DCP or CPD and 0.46 ppm of 2,3-DCP.

A 150.05 g sample of the biodehalogenated resin was subjected to the acid test by placing it in an 8 oz. glass jar and the pH was adjusted to 1.0 with 2.24 g concentrated sulfuric acid. The jar was placed in a 50° C. water bath for 24 hours while being stirred with a magnetic stirrer. The sample was then cooled to room temperature and adjusted to pH 2.81 with 5.38 g of 20% NaOH solution. This material was analyzed for epichlorohydrin and epichlorohydrin hydrolysis products by GC as described previously. The analysis showed no detectable epichlorohydrin or 1,3-DCP, 0.49 ppm 2,3-DCP and 3.27 ppm CPD.

Example 45

Biodehalogenation and Acid Test of the PAE Resin of Example 38

A 400.00 gram sample of the PAE resin of Example 38 and 131.6 g deionized water were charged into a one liter 4-necked, round-bottomed flask equipped with an overhead stirrer, a condenser, an air sparge and a pH meter. The pH was adjusted to 5.8 with 7.26 grams of 20% aqueous sodium hydroxide. To the mixture was added 46.20 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value consisted of 8,026 ppm of potassium dihydrogen phosphate, 24,780 ppm of urea, 4,160 ppm of magnesium sulfate and 840 ppm of calcium chloride in tap water. The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis, the mixture was cooled to room temperature, the pH was adjusted to 2.73 with 2.23 g 96% sulfuric acid and 7.41 grams of biocide solution was added. [The biocide solution consisted of 10% active Proxel® BD (from Zeneca Biocides) and 1.67% potassium sorbate in deionized water.] The resin had a total solids of 10.45 wt %. The sample was analyzed for epichlorohydrin and epichlorohydrin hydrolysis products by GC as described previously. The analysis showed no detectable epichlorohydrin, 1,3-DCP or CPD and 0.63 ppm of 2,3-DCP.

A 150.02 g sample of the biodehalogenated resin was subjected to the acid test by placing it in an 8 oz. glass jar and the pH was adjusted to 1.0 with 2.19 g concentrated sulfuric acid. The jar was placed in a 50° C. water bath for 24 hours while being stirred with a magnetic stirrer. The sample was then cooled to room temperature and adjusted to pH 2.81 with 4.97 g of 30% NaOH solution. This material was analyzed for epichlorohydrin and epichlorohydrin hydrolysis products by GC as described previously. The analysis showed no detectable epichlorohydrin or 1,3-DCP, 0.58 ppm 2,3-DCP and 3.95 ppm CPD.

Example 46

Preparation of PAE Resin from Endcapped Polyaminoamide Prepolymer

A 1000 mL 4-necked flask fitted with condenser, thermocouple and mechanical stirrer was charged with 219.71 g endcapped polyaminoamide prepolymer from Example 11 and 235.00 g deionized (DI) water. To this stirred solution was quickly added 37.01 g epichlorohydrin (0.40 mole). The reaction temperature was maintained at 38–40° C. for 2 hours. At this point 162 g of DI dilution water was added to the reaction and the reaction was heated to 55° C. When the reaction temperature reached 55° C. a solution of 1.32 g concentrated sulfuric acid in 15.7 g DI water was added. The viscosity of the reaction mixture was monitored by the use of Gardner-Holt tubes. After 50 minutes at 60° C. a Gardner-Holt viscosity of "I" to "J" was attained. a solution of 5.28 g concentrated sulfuric acid in 125 g DI water was added to terminate the reaction. An additional 518 g DI water was added when the resin was transferred to a bottle. The pH of the resin solution was adjusted to 2.70 using concentrated sulfuric acid. The total solids of this resin was 12.72 wt % and the RSV was 0.6248 dL/g, determined in 1.0N $NH_4Cl$ at 2.0%.

Example 47

Preparation of PAE Resin from Polyaminoamide Prepolymer Prepared by the Post-added Amine Method A 1000 mL 4-necked flask fitted with condenser, thermocouple and mechanical stirrer was charged with 215.00 g polyaminoamide prepolymer from Example 12 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 1.65 g concentrated sulfuric acid in 15.7 g DI water was added. The viscosity of the reaction mixture was monitored by the use of Gardner-Holt tubes. After 47 minutes at 60° C. a Gardner-Holt viscosity of "L" was attained. a solution of 5.28 g concentrated sulfuric acid in 125 g DI water was added to terminate the reaction. An additional 518 g DI water was added when the resin was transferred to a bottle. The pH of the resin solution was adjusted to 2.70 using concentrated sulfuric acid. The total solids of this resin was 12.31 wt % and the RSV was 0.5966 dL/g, determined in 1.0N $NH_4Cl$ at 2.0%.

Example 48

Preparation of PAE Resin from Polyaminoamide Prepolymer Prepared by the Post-added Amine Method A 1000 mL 4-necked flask fitted with condenser, thermocouple and mechanical stirrer was charged with 215.00 g polyaminoamide prepolymer from Example 12 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 1.98 g concentrated sulfuric acid in 15.7 g DI water was added. The viscosity of the reaction mixture was monitored by the use of Gardner-Holt tubes. After 60 minutes at 60° C. a Gardner-Holt viscosity of "I" was attained. a solution of 5.28 g concentrated sulfuric acid in 125 g DI water was added to terminate the reaction. An additional 518 g DI water was added when the resin was transferred to a bottle. The pH of the resin solution was adjusted to 2.67 using concentrated sulfuric acid. The total solids of this resin was 11.82 wt % and the RSV was 0.6360 dL/g, determined in 1.0N $NH_4Cl$ at 2.0%.

Example 49

Preparation of PAE Resin from Polyaminoamide Prepolymer Prepared by the Post-added Amine Method A 1000 mL 4-necked flask fitted with condenser, thermocouple and mechanical stirrer was charged with 214.78 g polyaminoamide prepolymer from Example 18 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 2.64 g concentrated sulfuric acid in 15.7 g DL water was added. The viscosity of the reaction mixture was monitored by the use of Gardner-Holt tubes. After 75 minutes at 60° C. a Gardner-Holt viscosity of "I" to "J" was attained. a solution of 5.28 g concentrated sulfuric acid in 125 g DI water was added to terminate the reaction. An additional 518 g DI water was added when the resin was transferred to a bottle. The pH of the resin solution was adjusted to 2.74 using concentrated sulfuric acid. The total solids of this resin was 12.01 wt % and the RSV was 0.5214 dL/g, determined in 1.0N $NH_4Cl$ at 2.0%.

Example 50

Preparation of PAE Resin from Polyaminoamide Prepolymer Prepared by the Post-added Amine Method A 1000 mL 4-necked flask fitted with condenser, thermocouple and mechanical stirrer was charged with 216.18 g polyaminoamide prepolymer from Example 17 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 2.64 g concentrated sulfuric acid in 15.7 g DI water was added. The viscosity of the reaction mixture was monitored by the use of Gardner-Holt tubes. After 98 minutes at 60° C. a Gardner-Holt viscosity of "J" was attained. a solution of 5.28 g concentrated sulfuric acid in 125 g DI water was added to terminate the reaction. An additional 518 g DI water was added when the resin was transferred to a bottle. The pH of the resin solution was adjusted to 2.72 using concentrated sulfuric acid. The total solids of this resin was 11.82 wt % and the RSV was 0.7517 dL/g, determined in 1.0N $NH_4Cl$ at 2.0%.

Example 51

Preparation of PAE Resin from Polyaminoamide Prepolymer Prepared by the Post-added Amine Method A 1000 mL 4-necked flask fitted with condenser, thermocouple and mechanical stirrer was charged with 214.78 g polyaminoamide prepolymer from Example 18 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 2.64 g concentrated sulfuric acid in 15.7 g DI water was added. The viscosity of the reaction mixture was monitored by the use of Gardner-Holt tubes. After 74 minutes at 60° C. a Gardner-Holt viscosity of "E" was attained. The reaction was then diluted with 259 g DI water. The temperature was maintained at 60° C. while continuing to monitor the viscosity with Gardner-Holt tubes. After an additional 19 minutes at 60° C., the reaction mixture had achieved a Gardner-Holt viscosity of "G" to "H". a solution of 5.28 g concentrated sulfuric acid in 125 g DI water was then added to terminate the reaction. An additional 259 g DI water was added when the resin was transferred to a bottle. The pH of the resin solution was adjusted to 2.73 using concentrated sulfuric acid. The total solids of this resin was 12.20 wt % and the RSV was 0.7159 dL/g, determined in 1.0N $NH_4Cl$ at 2.0%.

Example 52

Preparation of PAE Resin from Polyaminoamide Prepolymer Prepared by the Post-added Amine Method A 1000 mL 4-necked flask fitted with condenser, thermocouple and mechanical stirrer was charged with 216.18 g polyaminoamide prepolymer from Example 17 and 256.00 g deionized (DI) water. To this stirred solution was quickly added 41.64 g epichlorohydrin (0.45 mole). The reaction temperature was maintained at 38–40° C. for 2 hours. At this point 162 g of DI dilution water was added to the reaction and the reaction was heated to 60° C. When the reaction temperature reached 60° C. a solution of 2.64 g concentrated sulfuric acid in 15.7 g DI water was added. The viscosity of the reaction mixture was monitored by the use of Gardner-Holt tubes. After 102 minutes at 60° C. a Gardner-Holt viscosity of "E" was attained. The reaction was then diluted with 259 g DI water. The temperature was maintained at 60° C. while continuing to monitor the viscosity with Gardner-Holt tubes. After an additional 34 minutes at 60° C., the reaction mixture had achieved a Gardner-Holt viscosity of "H". a solution of 5.28 g concentrated sulfuric acid in 125 g DI water was added to terminate the reaction. An additional 259 g DI water was added when the resin was transferred to a bottle. The pH of the resin solution was adjusted to 2.65 using concentrated sulfuric acid. The total solids of this resin was 12.11 wt % and the RSV was 0.7491 dL/g, determined in 1.0N $NH_4Cl$ at 2.0%.

Example 53

Preparation of Polyaminoamide Prepolymer Using Post-added Amine Method

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 170° C. and maintained there for 2 hours. During this time 105 mL distillate was removed through the Dean-Stark trap. At this point, 15.48 g (0.15 mole) of DETA was added to the reactor. The temperature was then raised to 180° C. and maintained there for 2 hours. During this time an additional 10 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 48.71 wt % and the RSV was 0.1129 dL/g, determined in 1.0N $NH_4Cl$ at 2.0%. This material had an amine number of 5.85 meq/g and an acid number of 0.144 meq/g, determined by titration as previously described.

Example 54

Preparation of Polyaminoamide Prepolymer Using Post-added Amine Method

A 1000 mL resin kettle fitted with condenser, Dean-Stark trap, thermocouple, addition funnel and mechanical stirrer was charged with 309.51 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 170° C. and maintained there for 2 hours. During this time 100 mL distillate was removed through the Dean-Stark trap. At this point, 15.48 g (0.15 mole) of DETA was added to the reactor. The temperature was then raised to 180° C. and maintained there for 2 hours. During the two hour cook at 180° C. a vacuum of 10" Hg was maintained in the reactor. During this time an additional 15 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 50.15 wt % and the RSV was 0.1042 dL/g, determined in 1.0N $NH_4Cl$ at 2.0%. This material had an amine number of 5.94 meq/g and an acid number of 0.0818 meq/g, determined by titration as previously described.

Example 55

Preparation of Polyaminoamide Prepolymer Using Post-added Amine Method a 1000 mL resin kettle fitted with condenser, Dean-Stark trap, thermocouple, addition funnel and mechanical stirrer was charged with 309.5 g diethylenetriamine (DETA, 3.00 mole). To this reactor was added 438.42 g adipic acid (3.00 mole) through a powder funnel while stirring the reaction mixture. The temperature of the reaction mixture was maintained below 125° C. by controlling the rate at which the adipic acid was added to the reaction. The temperature was raised to 170° C. and maintained there for 2 hours. During this time 93 mL distillate was removed through the Dean-Stark trap. At this point, 15.48 g (0.15 mole) of DETA was added to the reactor. The temperature was then raised to 180° C. and maintained there for 2 hours. During the two hour cook at 180° C. a vacuum of 15" Hg was maintained in the reactor. During this time an additional 35 mL distillate was removed through the Dean-Stark trap. a volume of 640 mL of hot water (~70° C.) was then cautiously added to the product which was stirred until the prepolymer was dissolved. After cooling to room temperature the product was bottled. The total solids of this product was 49.02 wt % and the RSV was 0.1020 dL/g, determined in 1.0N $NH_4Cl$ at 2.0%. This material had an amine number of 6.00 meq/g and an acid number of 0.0449 meq/g, determined by titration as previously described.

Example 56

Biodehalogenation—General Procedure for the Lab Scale Biodehalogenation of Polyaminoamide-epichlorohydrin and Polyamine-epichlorohydrin Wet Strength Resins in Batch Mode 1) Preparation of Preculture of HKC on Kymene® 617

50 mls of Kymene® 617 was adjusted to a pH value of 5.8 by the addition of 25% w/w sodium hydroxide solution. To this was then added 0.5 mls of a nutrient package (consisting of 33 g of urea; 5 g of potassium dihydrogen phosphate; 5.0 g of magnesium sulphate heptahydrate and 1.0 g of calcium chloride monohydrate dissolved in 1 liter of demineralized water), and 100 µl of 10% sterile yeast extract solution (from Difco). This mixture was then transferred to a 250 ml Erlenmeyer flask. To this was then added 0.25 mls of HKC stock. The flask was then placed in an orbital shaker (200–250 rpm), and the material allowed to incubate at 30° C. for twenty four hours.

2) Biodehalogenation of Polyaminoamide-epichlorohydrin Wet Strength Resin 25 mls of the polyaminoamide-epichlorohydrin resin was adjusted to a pH value of 5.8 by the addition of 25% w/w sodium hydroxide solution. To this was then added 0.25 mls of a nutrient package (consisting of 33 g of urea; 5 g of potassium dihydrogen phosphate; 5.0 g of magnesium sulphate heptahydrate and 1.0 g of calcium chloride monohydrate dissolved in 1 liter of water), 100 µl of 10% yeast extract solution and 5 mls of sterilized water. This mixture was then transferred to a 250 ml Erlenmeyer flask and then inoculated with 1 ml of the Kymene® 617 pre-culture prepared in the procedure above. The flask was then placed in an orbital shaker (200–250 rpm), and the material allowed to incubate at 30° C. for forty eight hours.

After forty eight hours, the resin was transferred to a 50 ml falcon tube and then pH adjusted to a value of 2.8 by the dropwise addition of 96% w/w sulphuric acid. 53 µl of potassium sorbate solution (94 mg/ml) and 50 µl of Proxel® BD (from Zeneca Biocides) were then added to the resin, and the sample thoroughly mix by a high shear mixer.

Example 57

Effect of Carboxylic Acid Group Content of Polyaminoamide Polymer on Reformation of CPD in Wet Strength Resin Solution To 686.0 g (6.65 moles) of diethylenetriamine, in a two liter flange flask equipped with thermocouple, overhead mechanical stirrer and Dean & Stark column with condenser, was added a total of 1023.0 g (7.0 moles) of adipic. The adipic acid was added in small portions to the flask over approximately one hour, the temperature being maintained at less than 120° C. during this time. The reaction mixture is then heated to 155° C. over a 45 minute period at which point a large amount of condensation water is produced in the reaction flask. This water is produced, condensed and collected in the Dean & Stark throughout the remainder of the reaction. The reaction mixture is then maintained at a temperature of 155° C. for one hour and then heated to 170° C. over a one hour period. It was then maintained at 170° C. Two hundred minutes after the addition of the adipic acid the reaction mixture was killed by the addition of 800 g of water and cooled to 55° C. After dismantling of the equipment and transferring the polyaminoamide polymer solution to a five liter beaker, a further 600 g of water was added and mixed in. The acid number of the prepolymer was determined to be 0.70 meq/dry gram of polymer (PREPOLYMER 1).

A second polyaminoamide prepolymer was prepared according to the procedure described above with the exception that 940.3 g (6.43 moles) of adipic acid was added to 670.6 g (6.50 moles) of diethylenetriamine and the reaction was maintained at 170° C. for an extra sixty minutes before killing with 800 g of water. The acid number of the prepolymer was determined to be 0.36 meq/dry gram of prepolymer (PREPOLYMER 2).

These two polymers, and blends of these polymers, were then converted to polyaminoamide-epichlorohydrin resins by the following general procedure.

To 505 g of 30% solids polymer solution (151.5 g dry polymer), charged to a one liter flask equipped with thermocouple, overhead mechanical stirrer and condenser, and at a temperature of 25° C., was added 60.9 g of epichlorohydrin as quickly as possible. The ensuing exotherm, raised the temperature to 40° C. An ice/water bath was applied to prevent the temperature exceeding a value of 40° C. Once the exotherm had subsided, the temperature was maintained at 40° C. Two hours and forty five minutes after the addition of epichlorohydrin, the reaction mixture was diluted with 387.7 g of water. Heat was then applied to raise the temperature to 70° C. over a forty five minute period. Twenty minutes into the heating up step, a mixture of 'x'd of 96.0% w/w sulphuric acid in 25 g of water was added. Heating was then continued until 70° C. had been attained. The reaction was then maintained at this temperature. The viscosity of the reaction mixture was monitored by periodic measurement of the Gardner-Holt viscosity at 25° C. When the reaction mixture had reached a Gardner-Holt viscosity of H+, a solution of 6 g of 96.0% w/w sulphuric acid in 200 g of water was added to kill the reaction. The reaction mixture was then cooled to 25° C., and then diluted further by the addition of 383.7 g of water. Finally the pH of the resin was adjusted to 2.7 by further dropwise addition of 96.0% w/w sulphuric acid.

The resins prepared are summarized in the Table 14 below.

TABLE 14

| Resin No. | dry basis (db) (parts by wt.) of PREPOLYMER 1 | dry basis (db) (parts by wt.) of PREPOLYMER 2 | Prepolymer acid no. (meq/dry g) | 'X' g of 96% w/w H$_2$SO$_4$ | Time at 70° C. (min) |
|---|---|---|---|---|---|
| 1 | 100 | — | 0.70 | — | 101 |
| 2 | 75 | 25 | 0.62 | 1.5 | 108 |
| 3 | 50 | 50 | 0.56 | 2.5 | 108 |
| 4 | 25 | 75 | 0.48 | 4.0 | 145 |
| 5 | — | 100 | 0.36 | 5.9 | 177 |

The resins prepared were then biodehalogenated in batch mode, according the procedures described in Example 56. These dehalogenated samples were placed in a 50° C. air convection oven and aged for two weeks. 3 ml aliquots of each sample were taken after one and two weeks at 50° C., and the CPD content of the resin was determined, according to the procedure described in Comparative Example 1.

The results are summarized in the Table 15 below.

TABLE 15

| Resin No. | Prepolymer acid no. (meq/dry g) | CPD after dehalogenation before 50° C. aging | CPD after dehalogenation and one week at 50° C. | CPD after dehalogenation and two weeks at 50° C. |
|---|---|---|---|---|
| 1 | 0.70 | <1 ppm | 25 ppm | 41 ppm |
| 2 | 0.62 | <1 ppm | 24 ppm | 36 ppm |
| 3 | 0.56 | <1 ppm | 26 ppm | 36 ppm |
| 4 | 0.48 | <1 ppm | 19 ppm | 24 ppm |
| 5 | 0.36 | 1 ppm | 17 ppm | 25 ppm |

Example 58

Preparation of a Polyamidoamide Epichlorohydrin Resin Starting from a Polyaminoamide Prepolymer with a Low Level of Residual Carboxylic Acid Group Functionality To 433.3 g (4.2 moles) of diethylenetriamine, in a one liter flange flask equipped with thermocouple, overhead mechanical stirrer and Dean & Stark column with condensor, was added a total of 438.4 g (3.0 moles) of adipic acid. The adipic acid was added in small portions to the flask over approximately one hour, the temperature being maintained at less than 120° C. during this time. The reaction mixture is then heated to 155° C. over a 45 minute period at which point a large amount of condensation water is produced in the reaction flask. This water is produced, condensed and collected in the Dean & Stark throughout the remainder of the reaction. The reaction mixture is then maintained at a temperature of 155° C. for one hour and then heated to 170° C. over a one hour period. It was then maintained at 170° C. for a further two hours and forty five minutes. At this point in the reaction, 82.2 g of condensate water has been collected and the acid number of the polymer was 0.21 meq/g, as determined by titration with alcoholic potassium hydroxide solution. Further heating at 170° C. produced a further 3.5 g of condensate water and reduced the acid number to 0.07 meq/g.

151.5 g of the dry polymer produced in the above description, was dissolved in 353.5 g of water to produce a 30% polymer solids solution. The temperature of this solution was 25° C. To this polymer solution was added 60.9 g (0.658 moles) of epichlorohydrin as quickly as possible. After epi addition the temperature began to rise due to the initial reaction exotherm, a cooling water bath was applied to prevent the temperature rising above 40° C. Once the exotherm has subsided, the temperature was maintained at 40° C. Two hours and forty five minutes after epi addition, the reaction mixture was diluted to 21.5% total solids by the addition of 422 g of water. The reaction mixture was then heated to 70° C. over a forty five minute period. Twenty minutes into the heating period, when the temperature is approximately 55° C., 8.0 g (0.078 moles) of 96% sulphuric acid was added to the reaction mixture to reduce the pH to a value of 7.1. Heating was maintained until the reaction temperature has reached 70° C. It was then maintained at this temperature for ninety five minutes. After this period of time at 70° C., the pH of the reaction had a value of 6.0. It was raised to a value of 6.5 by the addition of 12.5 g of 25% w/w sodium hydroxide solution. Forty five minutes after the addition of base, the reaction mixture was killed by the addition of 5.0 g of 96% sulphuric acid mixed in 200 g of water. a further 18.9 g of 96% sulphuric acid was then added to adjust the pH to a value of 2.7. This was then diluted to 15% total solids by the addition of 408 g of water. This wet strength resin was then biodehalogenated in batch mode according to the procedure described in Example 56.

Example 59

Handsheet Evaluation of Example 58 to Show Low CPD Reformation in Paper in Comparison to Kymene® ULX2 Control This example shows how paper made with the resin prepared in example 58 results in a significant reduction of the CPD found on paper as compared to paper made with a Kymene® ULX2 control.

Paper Making

Pulp was made from a 50/50 hardwood/softwood mixture (Scogcell Birch TCF, Encel Pine TCF). Process water of 100 ppm CaCO$_3$ hardness, 50 ppm CaCO$_3$ alkalinity and pH 6.8–7.0 was used for stock preparation. Paper was made at ambient temperature. Refining was carried out on a Hollander beater at 2.07% consistency for 22 minutes with 12 kg of weight in order to a freeness of 31° SR.

Handsheets were made on a Noble&Wood Handsheet Paper Machine to a grammage of 100 gsm. The dry content after wet press was 32.4%. The contact time on the drying cylinder was 75 sec at 105° C., the sheet was dried to a final moisture content of 4.3%.

Both the experimental and control resins were added at 1% and 2% db. CPD content of the paper was measured by the procedure as described in Example 7. The results are summarized in Table 16.

TABLE 16

| Resin sample code | CPD in paper at 1 wt % db resin addition | CPD in paper at 2 wt % db resin addition |
|---|---|---|
| Kymene ® ULX2 | 221 ppb | 407 ppb |
| Example 58 | 58 ppb | 104 ppb |

Example 60

Preparation and Evaluation of a Polyamidoamide Epichlorohydrin Resin Starting from a Polyaminoamide Prepolymer with a Low Level of Residual Carboxylic Acid Group Functionality Into a 350 liter stainless steel reactor was charged 80.0 kg (775.4 moles) of diethylenetriamine. After sparging the reactor with nitrogen, 107.9 kg (738.5 moles) of adipic acid was added to the reactor at an approximate rate of 2.7 kg per minute. Rate of addition was chosen such as to maintain the temperature below 120° C. After addition of the adipic acid, the reactor was heated to a temperature of 150° C., by controlled application of high pressure steam (9 bar) and hot oil (temperature of 180° C.). Once 150° C. had been attained, heating was maintained to raise the temperature further. Between 150° C. and 160° C., the reaction mixture began to froth and bubble for a few minutes, which then subsided. After this, condensate water appeared in the distillation system of the reactor, and the temperature fell back to 155° C. The reaction mixture was then heated to 170° C. as quickly as possible using the maximum heating settings for the reactor. During this heating up period, condensate water continued to be collected in the distillation system of the reactor. The reactor reached a temperature of 170° C. ninety five minutes after the first condensate water had been collected. 81.8% of the theoretical condensate water had been collected at this time. The temperature of the reactor was then maintained at 170° C. for 90 minutes. After this holding period, 91.8% of the theoretical condensate water had been collected. The temperature was then raised to 178° C., this temperature being achieved in seventy five minutes. Once the temperature had reached 178° C., 94% of the theoretical condensate water had been collected. The reactor was then maintained at a temperature between 178° C. and 180° C. for six hours, at the end of which 99.3% of the theoretical condensate water had been collected. The reaction mixture was then 'killed' by the addition of 86.9 kg of water. After cooling to 90° C., the polymer solution was discharged to a holding tank and diluted further by the addition of 74.4 kg of water. The acid number of this polymer solution was determined to be 0.14 meq/dry gram of polymer using $^{13}C$ NMR analysis as follows:

Charge a known amount of prepolymer at 0.75 g±0.001 g (on a dry basis) into a 2 ml Eppendorf tube. Add approximately 0.2 g of water, followed by 0.2 g of deuterium oxide (D$_2$0) and then thoroughly mix, to produce a 65 wt % viscous polymer solution. Add to this solution about a known amount of formic acid solution at 0.1 g±0.01 g, followed by 2–3 drops of neat acetonitrile. Thoroughly mix and transfer the sample to a dry NMR tube.

The following spectral parameters are can be used for a Varian Gemini 2000, 300 MHZ NMR Spectrometer (available from Varian B. V., Boerhavenplein 7, 4624 VT Bergen op Zoom, the Netherlands) in automated acquisition mode.

| Resonance Frequency | 300.105 MHZ ($^1H$ decoupling) |
|---|---|
|  | 75.469 MHZ ($^{13}C$) |
| # Data Points Acquired | 15360 |
| Acquisition Time | 409.3 microseconds |
| Relaxation Delay | 2.0 seconds |
| Pulse Width | 16.7 microseconds |
| Number of Scans | 2048 |
| Spectral Width | 18761.7 Hz |
| Line Broadening | 3.18 Hz |
| Probe Temperature | Room Temp. (21° C.) |

The spectrum is integrated between 160 ppm and 190 ppm, with the following assignments being made to the major signals in this region.

Polymer acid group, δ=182.2–182.5 ppm
Polymer amide groups, δ=177–176 ppm
Formic acid carboxyl group, δ=170.3 ppm The acid number of the polymer is then determined from knowledge of the integral of the polymer acid peak; the integral of the formic acid peak; the mass of polymer added and the molarity and mass of formic acid solution added. The following equation can be used to calculate the acid number:

$$\frac{\text{Integral}_{(formic\ acid)} * \text{mass of dry polymer}}{\text{Integral}_{(polymer\ acid\ groups)} * \text{mass of formic acid solution} * \text{molarity of formic acid solution}}$$

EXAMPLE

By NMR:

$$\frac{19.26 * 0.7487 \text{ g}}{2.45 * 0.1163 \text{ g} * 7.3M} = 0.144 \text{ meq/g}$$

By Titration:

$$\frac{3.33 \text{ mls} * 0.100N * 100}{4.9893 * 50.5\%} = 0.132 \text{ meq/g}$$

$$\frac{3.61 \text{ mls} * 0.100N * 100}{5.0650 * 50.5\%} = 0.141 \text{ meq/g}$$

Average value 0.137 meq/g

Into a 350 liter stainless steel reactor, 67.6 kg of the polymer solution, prepared in the above procedure, was charged followed by 46.0 kg of water to prepare a 30% total solids polymer solution. The temperature of this solution was 22° C. To this polymer solution, 16.0 kg (172.9 moles) of epichlorohydrin was added over a one minute period. The exothermic reaction which then ensued, raised the temperature of 40° C. in 15 minutes. Cooling water was then applied to the reactor to maintain the temperature at 40° C. Two hours after the addition of the epichlorohydrin, a mixture of 1.33 kg of 96% w/w sulphuric acid dissolved in 92.9 kg of water was added to the reactor as quickly as possible. The temperature of the reactor was then raised to 70° C. by the application of hot water (85° C.) to the heating coils of the reactor. This temperature was achieved in thirty five minutes. The reactor was then maintained at 70° C. for one hour and forty five minutes, at which point the reaction mixture was killed by the addition of a mixture of 1.6 kg of 96% w/w sulphuric acid dissolved in 22.5 kg of water. The reaction mixture was then cooled to 30° C. by the application of cold water to the heating coils. After attaining this temperature, the mixture was discharged to a holding tank and then diluted further by the addition of 150 kg of water. The pH of the mixture was then adjusted to a value of 2.6 by the addition of 340 g of 96% w/w sulphuric acid.

100 mls of the resin was then biodehalogenated in batch mode according the procedures described earlier in Example 56, specific weights and measures being adjusted to the larger scale.

Paper was made with this dehalogenated polyaminoamide-epichlorohydrin wet strength resin, according the procedures described in Example 59. Paper was also made with Kymene® ULX2 for comparative purposes. The wet strength of these papers, after oven curing (80° C. for thirty minutes) and conditioning at 23° C. and 50% relative humidity for twenty four hours, were evaluated according to the procedures described in Example 7. CPD in the paper samples were also determined according to the procedures also described in Example 7. The results of this evaluation are summarized in the Table 17 below.

TABLE 17

|  | % db addn | wet tensile (kNm$^{-1}$) | CPD in paper (ppb) |
|---|---|---|---|
| Example 60 | 1.0 | 1.488 | 59 |
| Kymene® ULX2 | 1.0 | 1.292 | 149 |

Example 61

Preparation of Polyaminoamide Prepolymer Using Excess Amine Method

A 1000 mL resin kettle fitted with condenser, Dean-Stark trap, thermocouple, addition funnel and mechanical stirrer was charged with 324.99 g diethylenetriamine (DETA, 3.15 mole). To this reactor was added 480.51 g dimethyl glutarate (3.00 mole) through an addition funnel while stirring the reaction mixture. The temperature was raised to 160° C. and maintained there for 4 hours. During this time 225 mL distillate was removed through the Dean-Stark trap. The product was isolated as the melt in an aluminum pan. A solution of 244.61 g of the solid prepolymer was mixed with 244.61 g water to form an aqueous solution. The total solids of this solution was 47.54 wt % and the RSV was 0.1287 dL/g, determined in 1.0N NH$_4$Cl at 2.0% as described previously. This material had an amine number of 6.18 meq/g and an acid number of 0.168 meq/g, determined by titration as previously described.

Example 62

Preparation of Polyaminoamide Prepolymer Using Excess Amine Method

A 1000 mL resin kettle fitted with condenser, Dean-Stark trap, thermocouple, addition funnel and mechanical stirrer was charged with 324.99 g diethylenetriamine (DETA, 3.15 mole). To this reactor was added 480.51 g dimethyl glutarate (3.00 mole) through an addition funnel while stirring the reaction mixture. The temperature was raised to 170° C. and maintained there for 4 hours. During this time 268 mL distillate was removed through the Dean-Stark trap. The product was isolated as the melt in an aluminum pan. a solution of 316.18 g of the solid prepolymer was mixed with 316.18 g water to form an aqueous solution. The total solids of this solution was 45.20 wt % and the RSV was 0.1289 dL/g, determined in 1.0N NH$_4$Cl at 2.0% as described previously. This material had an amine number of 6.28 meq/g and an acid number of 0.111 meq/g, determined by titration as previously described.

Example 63

Biodehalogenation and Handsheet Evaluation of Examples 49 and 50

A sample of 752.15 g of the resin of Example 49 was adjusted to pH 5.8 with 14.41 grams of 20% aqueous sodium hydroxide. To the mixture was added 85.17 grams of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 6.93 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 20% aqueous sodium hydroxide. After 48 hours, a sample was removed and submitted for GC analysis and the mixture was cooled to room temperature.

The resin of Example 50 was treated in a similar manner using a 753.43 g sample of the resin that was adjusted to pH 5.8 with 13.43 g of 20% aqueous sodium hydroxide and to which was added 85.21 grams of a blend of microorganisms comprising an inoculum from a biodehalogenated polyaminopolyamide-epichlorohydrin resin and 6.93 grams of a nutrient solution.

The procedures outlined in Example 7 were used to prepare and test paper containing the biodehalogenated resins. Only oven-aged samples were prepared. The results of paper testing and analysis for 3-CPD are shown in the Table 18 below.

TABLE 18

Testing of Oven-Aged Handsheets

| Sample | Add-on | Basis Wt. (#/ream) | Dry Tensile (#/inch) | Wet Tensile (#/inch) | 3-CPD in paper (ppb) |
|---|---|---|---|---|---|
| Blank | — | 39.5 | 14.38 | 0.39 | n.d. |
| Kymene® ULX2 | 1% | 40.4 | 21.03 | 4.39 | 244 |
| Biodehalogenated Ex. 49 | 1% | 39.1 | 22.19 | 4.72 | 74 |
| Biodehalogenated Ex. 50 | 1% | 39.7 | 20.31 | 4.50 | 89 |

Example 64

Lab Biodehalogenation of a Modified pH Treated Polyaminopolyamide-epi Resin and Accelerated Aging A 250 g portion of Resin B (see Comparative Example 2) was charged into a bottle containing a magnetic stirrer. The pH was adjusted to 6.0 with 31.5 g of 4% aqueous sodium hydroxide. An aliquot was removed from the bottle and submitted for GC analysis. The bottle was capped and placed in a 50° C. water bath and maintained at 50° C. After 6 hours, an aliquot was removed from the bottle and submitted for GC analysis. A 225 gram sample of this resin was charged into a 3-necked, round-bottomed flask equipped with a magnetic stirrer, a condenser, an air sparge and a pH meter. The pH was adjusted to 5.8 with 10% aqueous sodium hydroxide. To the mixture was added 112.5 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 2.7 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used had the following composition: *Arthrobacter histidinolovorans* (HK1) and *Agrobacterium tumefaciens* (HK7). The flask was placed in a 30° C. vater bath and maintained at 30° C. The pH was maintained at 5.8 by periodic addition of 10% aqueous sodium hydroxide. After 48 hours, a sample was removed and submitted for GC analysis. The mixture was cooled to room temperature and the pH was adjusted to 3.0 with 10% sulfuric acid. The resin was subjected to accelerated aging as described in Comparative Example 1. The results are reported in Table 19.

This treatment resulted in about a 49–52% reduction in CPD reformation in the resin relative to an untreated control (Comparative Example 2) and about a 73% reduction relative to commercially obtained Kymene® ULX2 wet-strength resin (Comparative Example 1).

TABLE 19

| Temp (Celsius) | Time (hours) | 1,3-DCP (ppm) | 2,3-DCP (ppm) | 3-CPD (ppm) |
| --- | --- | --- | --- | --- |
| 20 | 0 | ND | 0.5 | 0.1 |
| 50 | 70 | 0.3 | 0.6 | 6.7 |
| 50 | 89 | 0.3 | 0.6 | 7.7 |
| 50 | 112 | 0.3 | 0.6 | 8.4 |
| 50 | 161 | 0.9 | 1.5 | 14.3 |
| 50 | 233 | 0.3 | 0.5 | 10.0 |
| 50 | 328 | 0.3 | 0.5 | 10.1 |
| 32 | 65 | 0.3 | 0.5 | 1.4 |
| 32 | 89 | 0.3 | 0.5 | 1.9 |
| 32 | 160 | 0.3 | 0.5 | 3.1 |
| 32 | 328 | 0.2 | 0.5 | 3.9 |
| 32 | 496 | 0.2 | 0.5 | 1.4 |
| 32 | 664 | 0.3 | 0.5 | 8.9 |
| 32 | 832 | 0.2 | 0.5 | 8.7 |
| 32 | 1170 | 0.3 | 0.6 | 10.2 |
| 32 | 1504 | 0.3 | 0.6 | 10.9 |

Example 65

Lab Biodehalogenation of a Modified pH Treated Polyaminopolyamide-epi Resin and Accelerated Aging A 140 g portion of Resin B (see Comparative Example 2) was charged into a bottle containing a magnetic stirrer. The pH was adjusted to 5.8 with 17.4 g of 4% aqueous sodium hydroxide. The bottle was capped and placed in a 30° C. water bath and maintained at 30° C. Periodically, aliquots were removed from the bottle and submitted for GC analysis. After 7 days, the resin was diluted to 10 wt % solids. A 130 gram sample of this resin was charged into a 3-necked, round-bottomed flask equipped with a magnetic stirrer, a condenser, an air sparge and a pH meter. The pH was adjusted to 5.8 with 10% aqueous sodium hydroxide. To the mixture was added 65 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process proceeds. The inoculum was added, together with 1.6 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used had the following composition: *Arthrobacter histidinolovorans* (HK1) and *Agrobacterium tumefaciens* (HK7). The flask was placed in a 30° C. water bath and maintained at 30° C. The pH was maintained at 5.8 by periodic addition of 10% aqueous sodium hydroxide. After 28 hours, the mixture was cooled to room temperature and the pH was adjusted to 3.0 with 10% sulfuric acid. A sample was removed and submitted for GC analysis. The resin was subjected to accelerated aging as described in Comparative Example 1. The results are reported in Table 20.

TABLE 20

| Temp (Celsius) | Time (hours) | 1,3-DCP (ppm) | 2,3-DCP (ppm) | 3-CPD (ppm) | 3-CPD*1.3 (ppm) |
| --- | --- | --- | --- | --- | --- |
| 20 | 0 | ND | 0.5 | 0.0 | 0.0 |
| 50 | 22 | ND | 0.4 | 2.7 | 3.5 |
| 50 | 46 | ND | 0.5 | 4.4 | 5.7 |
| 50 | 138 | ND | 0.5 | 8.0 | 10.4 |
| 50 | 210 | ND | 0.5 | 8.8 | 11.5 |
| 32 | 22 | ND | 0.4 | 0.3 | 0.4 |
| 32 | 46 | ND | 0.4 | 0.9 | 1.2 |
| 32 | 186 | ND | 0.4 | 2.5 | 3.3 |
| 32 | 353 | ND | 0.4 | 4.2 | 5.4 |
| 32 | 521 | ND | 0.4 | 5.4 | 7.0 |
| 32 | 857 | ND | 0.4 | 6.5 | 8.5 |
| 32 | 1312 | ND | 0.4 | 8.6 | 11.2 |

When corrected for the dilution of the resin, this treatment resulted in a 41% reduction in CPD reformation in the resin relative to an untreated control (Comparative Example 2) and about a 68% reduction relative to commercially obtained Kymene® ULX2 (Comparative Example 1).

Comparative Example 6

Base-Treatment of Kymene® ULX2 Wet-strength Resin

Resin D (see Comparative Example 4) after refrigeration for one month had non-detectable 1,3-DCP, 0.5 ppm of 2,3-DCP and 11.3 ppm of CPD. To 127.4 g (wet basis) of Resin D in a glass bottle was added 15.9 g of deionized water. Magnetic stirring was started and the solution was heated to 55° C. with a water bath fitted with a Cole-Parmer Polystat® temperature controller. The pH was monitored with a Beckman 10 pH meter connected to an automatic temperature compensator and a Ross pH electrode, sure flow. The pH meter was calibrated daily with pH 7 and 10 buffer solutions. To the resin solution at 55° C. was injected 17.6 g (16.0 mL) of 10% (wt/wt) aqueous sodium hydroxide. (This gave a solution with 10 wt % resin solids). The peak pH was 10.9. The pH was 10.5 after 5 minutes at which time the resin was cooled rapidly to room temperature and analyzed by gas chromatography (GC). This analysis showed non-detectable 1,3-DCP, 0.2 ppm of 2,3-DCP and 0.3 ppm of CPD.

Example 66

Handsheet Evaluation of Comparative Example 6

The procedure of Example 7 was used to evaluate Comparative Example 6. Results for oven-cured paper are reported in Table 21 with respect to that previously indicated for Examples 2–6 and Comparative Example 4.

TABLE 21

Oven-Cured Paper.

| | | | Basis Wt. Normalized | | | |
|---|---|---|---|---|---|---|
| Example | % Added | pH | dry tensile lbs/in | wet tensile lbs/in | % wet/ dry | % of Comp. Ex. 4 | CPD in Paper (ppb) |
| Blank | — | 7.5 | 18.50 | 0.52 | 3 | 11 | <30 |
| Comp. Ex. 4 | 0.50 | 7.5 | 25.15 | 4.86 | 19 | 100 | — |
| Comp. Ex. 4 | 1.00 | 7.5 | 27.92 | 6.01 | 22 | 100 | 319 |
| Example 4 | 0.50 | 7.5 | 24.39 | 4.40 | 18 | 91 | — |
| Example 4 | 1.00 | 7.5 | 23.79 | 5.29 | 22 | 88 | <30 |
| Example 3 | 0.50 | 7.5 | 24.06 | 4.39 | 18 | 90 | — |
| Example 3 | 1.00 | 7.5 | 26.15 | 5.30 | 20 | 88 | <30 |
| Example 6 | 0.50 | 7.5 | 26.08 | 4.59 | 18 | 94 | — |
| Example 6 | 1.00 | 7.5 | 25.93 | 5.88 | 23 | 98 | 36 |
| Example 2 | 0.50 | 7.5 | 22.70 | 2.94 | 13 | 61 | — |
| Example 2 | 1.00 | 7.5 | 22.55 | 4.05 | 18 | 67 | <30 |
| Example 5 | 0.50 | 7.5 | 22.27 | 3.24 | 15 | 67 | — |
| Example 5 | 1.00 | 7.5 | 23.38 | 4.46 | 19 | 74 | 39 |
| Comp. Ex. 6 | 0.50 | 7.5 | 22.74 | 3.91 | 17 | 80 | — |
| Comp. Ex. 6 | 1.00 | 7.5 | 24.22 | 4.86 | 20 | 81 | <30 |

Example 67 pH Modified Treated Polyaminopolyamide-epi Resin

A 129.5 g portion of Resin D (see Comparative Example 4) was charged into a bottle containing a magnetic stirrer. The pH was adjusted to 6.0 with 2.81 g of 20% aqueous sodium hydroxide. The bottle was capped and placed in a 30° C. water bath and maintained at 30° C. Periodically, aliquots were removed from the bottle and submitted for GC analysis. After 5 days, the resin was cooled to room temperature and used as an additive for papermaking.

The procedure of Examples 7 and 10 was used to evaluate this sample. Results for oven-cured paper are reported in Table 22 along with the other previously indicated Examples and Comparative Examples. The base treatment of this Example reduced the CPD in the paper compared to the untreated resin (Comparative Example 4).

TABLE 22

| | | | Basis Wt. Normalized | | | |
|---|---|---|---|---|---|---|
| Example | % Added | pH | dry tensile lbs/in | wet tensile lbs/in | % wet/ dry | % of Comp. Ex. 4 | CPD in Paper (ppb) |
| Blank | — | 7.5 | 21.15 | 0.65 | 3 | 16 | <30 |
| Comp. Ex. 4 | 0.50 | 7.5 | 22.74 | 4.18 | 18 | 100 | |
| Comp. Ex. 4 | 1.00 | 7.5 | 27.22 | 6.00 | 22 | 100 | 344 |
| Example 4 | 0.50 | 7.5 | 25.26 | 4.43 | 18 | 106 | |
| Example 4 | 1.00 | 7.5 | 26.97 | 5.44 | 20 | 91 | <30 |
| Comp. Ex. 5 | 0.50 | 7.5 | 23.59 | 4.59 | 19 | 110 | |
| Comp. Ex. 5 | 1.00 | 7.5 | 23.63 | 5.44 | 23 | 91 | 269 |
| Example 8 | 0.50 | 7.5 | 21.50 | 2.86 | 13 | 68 | |
| Example 8 | 1.00 | 7.5 | 23.32 | 4.16 | 18 | 69 | 36 |
| Example 9 | 0.50 | 7.5 | 24.38 | 4.48 | 18 | 107 | |
| Example 9 | 1.00 | 7.5 | 24.48 | 5.13 | 21 | 85 | <30 |
| Example 67 | 0.50 | 7.5 | 23.42 | 4.76 | 20 | 114 | |
| Example 67 | 1.00 | 7.5 | 25.85 | 5.81 | 22 | 97 | 246 |

Example 68

Reduction of CPD Release on Paper by Base Treatment of Kymene® ULX2

The following example shows that CPD release from Kymene® ULX2 can be reduced dramatically by base-treating the resin prior to use. A sample of base-treated Kymene® ULX2 was prepared in the following way:

Kymene® ULX2 wet-strength resin, which is a polyaminopolyamide-epi resin available from Hercules Incorporated (Wilmington, Del.) was obtained from the Voreppe, France plant. In a 100 ml three neck flask equipped with a magnetic stirrer, 50 ml of Kymene® ULX2 were heated on a water-bath to 55° C. while stirred. 3 g of a 25% NaOH solution in demineralized water were added at once (0.0028 Mol of base/dry g of resin). Immediately after addition of the base, the reaction mixture was cooled to room temperature and the pH was adjusted to pH 2.6 with 96% w/w sulphuric acid. The product was used to make handsheets on the same day.

Paper Making

Pulp was made from a 50/50 hardwood/softwood mixture (Scogcell Birch TCF, Encel Pine TCF). Process water of 100 ppm CaCO3 hardness, 50 ppm CaCO3 alkalinity and pH 6.8–7.0 was used for stock preparation. Paper was made at ambient temperature. Refining was carried out on a Hollander beater at 2.07% consistency for 22 minutes with 12 kg of weight to a freeness of 31° SR.

Handsheets were made on a Noble&Wood Handsheet Paper Machine to a grammage of 100 gsm. The dry content after wet press was 32.4%. The contact time on the drying cylinder was 75 sec at 105° C., the sheet was dried to a final moisture content of 4.3%. All experimental and control resins were added at 1% and 2% db. CPD content of the paper was measured as described in Example 7. The results are summarized in Table 23.

TABLE 23

| Resin sample | CPD in paper at 1% db resin addition | CPD in paper at 2% db resin addition |
|---|---|---|
| Kymene ® ULX2 control | 221 ppb | 407 ppb |
| Example 68 | <30 ppb | 36 ppb |

Example 69

Reduction of CPD Release on Paper by Base Treatment of Kymene® ULX2

280 ml of Kymene® ULX2 obtained from the Voreppe, France plant were placed in a 500 ml three neck flask equipped with a magnetic stirrer and condensor. The solution was under stirring warmed to 30° C. in a waterbath. 16.9 g of a 25% NaOH solution in demineralized water were added to the resin solution. After 30 min of reaction, the mixture was cooled back to room temperature and acidified with 96% w/w sulphuric acid to a final pH of 2.6. The product was used to make handsheets on the same day. Papermaking was carried out as described in Example 68. CPD content of the paper was measured as described in Example 7. The results are summarized in Table 24.

TABLE 24

| Resin sample | CPD in paper at 1% db resin addition | CPD in paper at 2% db resin addition |
|---|---|---|
| Kymene ® ULX2 control | 221 ppb | 407 ppb |
| Example 69 | <30 ppb | <30 ppb |

Example 70

Reduction of CPD Release on Paper by Acid Treatment of Kymene® 617

Kymene® 617 wet-strength resin which is a polyaminopolyamide-epi resin available from Hercules Incorporated (Wilmington, Del.) was obtained from the Zwijndrecht, Netherlands plant. 40 ml of this resin were acidified with 96% w/w sulfuric acid to a final pH of 1. The sample was stored in an oven at 50° C. for 24 h. Then the sample pH was adjusted to 5.8 with 30% w/w NaOH and the sample was biodehalogenated in batch mode as described in Example 56.

The biodehalogenated sample was used to make handsheets as described in Example 68. The CPD levels in the handsheets were measured as described in Example 7. The results are summarized in Table 25.

TABLE 25

| Resin sample | CPD in paper at 1% db resin addition | CPD in paper at 2% db resin addition |
|---|---|---|
| Kymene ® ULX2 control | 221 ppb | 407 ppb |
| Example 70 | 74 ppb | 138 ppb |

Example 71

Reduction of CPD Release on Paper by Application of a Biodehalogenated, Polyamine-epichlorohydrin Wet Strength Resin Not Containing Acid End Groups Resin Synthesis: To a one liter flange flask equipped with thermocouple, overhead mechanical stirrer, condensor and pH meter, was charged 195.8 g (2.116 moles) of epichlorohydrin. To this was added 211.0 g of water. This mixture was then stirred at 150 rpm. To this mixture was slowly added 148.8 g (0.896 moles) of 70% hexamethylenediamine solution. The resulting exotherm raised the temperature to 35° C. The application of an ice/water batch to the reactor prevented the temperature from increasing further. After one hour, all of the hexamethylenediamine solution had been added. The stirrer speed was increased to 200 rpm and the temperature of the reactor raised to 80° C. over a twenty minute period. Once at 80° C. the reaction mixture was maintained at this temperature. The pH of the reaction mixture was periodically measured, as to was the development of viscosity by monitoring the Garner-Holt viscosity at 25° C. After two and a half hours at 80° C., the reaction mixture had a pH of 5.2. This was increased to a value of 5.8 by the addition of 15 g of 25% w/w sodium hydroxide solution. After the addition of aqueous base, the viscosity of the reaction mixture began to increase. When a Gardner-Holt Viscosity of 'T' had been attained, one hour after the addition of base, the reaction mixture was diluted by the addition of 96.2 g of water. The Gardner-Holt viscosity was determined to be 'I' after dilution. The reaction mixture was quickly restored to 80° C. and then maintained at this temperature. Forty minutes after this dilution step, the reaction mixture had attained a Gardner-Holt Viscosity of 'T' again. The reaction was then killed by the addition of a mixture of 5.1 g of 96% w/w sulphuric acid in 137 g of water. The mixture was then cooled to 25° C. and the pH of the resin adjusted to a value of 2.7 by the addition of 6.0 g of 96% w/w sulphuric acid.

Biodehalogenation: 1) Preparation of Preculture of HKC on Kymene® 617

50 mls of Kymene® 617 was adjusted to a pH value of 5.8 by the addition of 25% w/w sodium hydroxide solution. To this was then added 0.5 mls of a nutrient package (consisting of 33 g of urea; 5 g of potassium dihydrogen phosphate; 5.0 g of magnesium sulphate heptahydrate and 1.0 g of calcium chloride monohydrate dissolved in 1 liter of demineralized water), and 100 µl of 10% sterile yeast extract solution (from Difco). This mixture was then transferred to a 250 ml Erlenmeyer flask. To this was then added 0.25 mls of HKC stock. The flask was then placed in an orbital shaker (200–250 rpm), and the material allowed to incubate at 30° C. for twenty four hours.

2) Biodehalogenation of Polyamine-epichlorohydrin Wet Strength Resin

The resin above was diluted to 13% solids with water and 500 mls of this polyamine-epichlorohydrin resin was adjusted to a pH value of 5.8 by the addition of 25% w/w sodium hydroxide solution. To this was then added 5 mls of a nutrient package (consisting of 33 g of urea; 5 g of potassium dihydrogen phosphate; 5.0 g of magnesium sulphate heptahydrate and 1.0 g of calcium chloride monohydrate dissolved in 1 liter of water) and 2 ml of 10% yeast extract solution. Glycerol was added to the resin to a final concentration of 5 mM to enhance growth of the HKC. This mixture was then transferred to a sterile 5 l Erlenmeyer flask and then inoculated with 20 ml of the Kymene® 617 pre-culture prepared in the procedure above. The flask was then placed in an orbital shaker (200–250 rpm), and the material allowed to incubate at 30° C. for 72 hours.

After 72 hours, the resin was transferred to a 1 liter plastic bottle and then pH adjusted to a value of 2.8 by the dropwise addition of 96% w/w sulphuric acid. 1060 µl of potassium sorbate solution (94 mg/ml) and 1 ml of Proxel® BD (from Zeneca Biocides) were then added to the resin, and the sample thoroughly mix by a high shear mixer.

Papermaking: The sample which was prepared and biodehalogenated as described above was tested for CPD reformation in handsheets as described in Example 68. The results are summarized in Table 26.

TABLE 26

| Resin sample code | CPD in paper at 1% db resin addition | CPD in paper at 2% db resin addition |
|---|---|---|
| Kymene ® ULX2 control | 221 ppb | 407 ppb |
| Example 71 | 33 ppb | <30 ppb |

Example 72

Reduction of CPD Release on Paper by Application of a Biodehalogenated, Acid-free Wet Strength Resin Based on Kymene® 736

To a one liter flange flask equipped with thermocouple, overhead mechanical stirrer, condenser and pH meter, was charged 195.8 g (2.116 moles) of epichlorohydrin. To this was added 211.0 g of water. This mixture was then stirred at 150 rpm. To this mixture was slowly added 148.8 g (0.896 moles) of 70% hexamethylenediamine solution. The resulting exotherm raised the temperature to 35° C. The application of an ice/water batch to the reactor prevented the temperature from increasing further. After one hour, all of the hexamethylenediamine solution had been added. The stirrer speed was increased to 200 rpm and the temperature of the reactor raised to 80° C. over a twenty minute period. Once at 80° C. the reaction mixture was maintained at this temperature. The pH of the reaction mixture was periodically measured, as to was the development of viscosity by monitoring the Garner-Holt viscosity at 25° C. After two and a half hours at 80° C., the reaction mixture had a pH of 5.2. This was increased to a value of 5.8 by the addition of 15 g of 25% w/w sodium hydroxide solution. After the addition of aqueous base, the viscosity of the reaction mixture began to increase. When a Gardner-Holt Viscosity of 'T' had been attained, one hour after the addition of base, the reaction mixture was diluted by the addition of 96.2 g of water. The Gardner-Holt viscosity was determined to be 'I' after dilution. The reaction mixture was quickly restored to 80° C. and then maintained at this temperature. Forty minutes after this dilution step, the reaction mixture had attained a Gardner-Holt Viscosity of 'T' again. The reaction was then killed by the addition of a mixture of 5.1 g of 96% w/w sulphuric acid in 137 g of water. The mixture was then cooled to 25° C. and the pH of the resin adjusted to a value of 2.7 by the addition of 6.0 g of 96% w/w sulphuric acid.

171 g of this resin was diluted to 13% total solids and then biodehalogenated in batch mode according to the procedure described earlier in Example 71 with the following modifications: 1) 5 mM of glycerol was added to the polyamine-epichlorohydrin resin; 2) 20 mls of preculture were used to inoculate the resin; 3) the resin was incubated for 72 h at 30° C.

The dehalogenated resin was then aged at 50° C. and CPD reformation was checked, according to the procedures described earlier. The results are summarized in the table below.

| | CPD after dehalogenation before 50° C. ageing | CPD after dehalogenation and one week at 50° C. | CPD after dehalogenation and two weeks at 50° C. |
|---|---|---|---|
| Example 72 | <1 ppm | <1 ppm | 2 ppm |

Example 73

Example of Base Treatment(s) of Kymene® SLX on Subsequent Reformation of CPD in the Biodehalogenated Resin 250 g of Kymene® SLX obtained from Hercules Incorporated was charged to a 500 ml flange flask, fitted with overhead stirrer, thermocouple, condenser and pH meter. The stirrer was set to 400 rpm, and the reaction heated to 50° C. with a hot water bath. Once at 50° C., the pH was adjusted from a value of 2.8 to 9.0 by the addition of 10.3 g of 25% w/w sodium hydroxide solution. The reaction mixture was then maintained at these temperature and pH conditions for 12 minutes. pH was maintained by the further dropwise addition of aqueous base as required (a further 0.7 g was needed to do this). The reaction mixture was then cooled to 25° C. and the pH adjusted to a value of 5.8 by the addition of 1.6 g of 96% w/w sulphuric acid, ready for biodehalogenation.

A second batch of Kymene® SLX was base treated in a similar manner to the procedure described above except that the reaction mixture was heated to a temperature of 40° C., and maintained at pH 9 and 40° C. for forty five minutes.

The two base treated resins were then biodehalogenated in batch mode, according to the procedure described earlier. The untreated base resin was also biodehalogenated in batch mode, as described in Example 56.

The three dehalogenated resins were then aged at 50° C. and the CPD reformation determined, as described in Example 1. The results of this ageing study are summarized Table 27 below.

TABLE 27

| Resin | Base treatment conditions | CPD after dehalogenation before 50° C. ageing | CPD after dehalogenation and one week at 50° C. | CPD after dehalogenation and two weeks at 50° C. |
|---|---|---|---|---|
| Kymene ® SLX | — | <1 ppm | 29 ppm | 32 ppm |
| Base treated 1 | 50° C., pH 9.0, 12 minutes | <1 ppm | 27 ppm | 40 ppm |
| Base treated 2 | 40° C., pH 9.0, 45 minutes | <1 ppm | 23 ppm | 27 ppm |

Comparative Example 7

Kymene® ULX2 wet-strength resin, a polyaminopolyamide-epi resin which contains less than about 5 ppm of DCP and less than about 50 ppm of CPD and is available from Hercules Incorporated (Wilmington, Del.), was obtained from the Voreppe, France plant, and had a total solids of 13.6 wt % and a pH of 2.7. This Kymene® is designated as Resin E. This resin was stored in a cold room (4° C.) for long-term storage. This resin is not CPD storage stable, even when stored in the cold room.

Comparative Example 8

Aging of a Polyaminopolyamide-epichlorohydrin (Epi) Resin (Control).

Kymene® ULX2 wet-strength resin, a polyaminopolyamide-epi resin which contains less than about 5 ppm of DCP and less than about 50 ppm of CPD and is available from Hercules Incorporated (Wilmington, Del.), was obtained from the Lilla Edet, Sweden plant, and had a total solids of 13.4 wt % and a pH of 3.1. This Kymene® is designated as Resin F. This resin was stored in a cold room (4° C.) for long-term storage. This resin is not CPD storage stable, even when stored in the cold room (see Table 28), as determined by GC analysis.

TABLE 28

| Temp (Celsius) | Time (hours) | 1,3-DCP (ppm) | 2,3-DCP (ppm) | 3-CPD (ppm) |
|---|---|---|---|---|
| 4 | 0 | ND | 0.45 | 15.8 |
| 4 | 864 | ND | 0.43 | 26.1 |
| 4 | 7350 | ND | 0.49 | 63.2 |

Comparative Example 9

Kymene® ULX2 wet-strength resin, a polyaminopolyamide-epi resin which contains less than about 5 ppm of DCP and less than about 50 ppm of CPD and is available from Hercules Incorporated (Wilmington, Del.), was obtained from the Lilla Edet, Sweden plant (Lot 25G9), and had a total solids of 13.3 wt % and a pH of 3.2. This Kymene® is designated as Resin G. This resin was stored in a cold room (4° C.) for long-term storage. This resin is not CPD storage stable, even when stored in the cold room.

Comparative Example 10

The amount of CPD producing species in Resin F were estimated using the following acid test. A portion of resin to be tested was charged into a bottle containing a magnetic stirrer. The pH was adjusted to 1.0 with 96% sulfuric acid. The bottle was capped and placed in a 50° C. water bath and maintained at 50° C. with stirring. Periodically, aliquots were removed from the bottle and submitted for GC analysis. The CPD produced after 24 hours is used to estimate the amount of CPD producing species. See Table 29 for results.

TABLE 29

| Temp (Celsius) | Time (hours) | 1,3-DCP (ppm) | 2,3-DCP (ppm) | 3-CPD (ppm) |
|---|---|---|---|---|
| 50 | 4 | ND | ND | 203.9 |
| 50 | 24 | ND | ND | 306 |
| 50 | 70 | ND | ND | 309 |

Example 74

General Procedure for Screening Activity of Resins and Evaluating Reaction Conditions.

A portion of Resin F was charged into a container with a stirrer. The pH was adjusted with 20% aqueous sodium hydroxide and a portion of enzyme was added. The container was closed to minimize evaporation of water. The container was placed in a temperature-controlled water bath and maintained at the desired temperature. Periodically, an aliquot was removed from the bottle and submitted for GC analysis as previously described. pH was measured in a similar manner as described in Comparative Example 6. The results are reported in Table 30. For pH values having one digit, the pH value is the initial pH, and for pH values having two digits, the pH was maintained by addition of the sodium hydroxide solution. It is noted that Alcalase, Resinase A, Palatase, Lipolase 100L, Novocor AD, and Flavourzyme were obtained from Novo Nordisk BioChem, North America, Inc. Franklinton, N.C., and Lipase M was obtained from Alamo, USA, Corp., Lombard, Ill., and were used as received (except the Flavourzyme was used as a 10% dilution in water, and the Lipase M was used as a 5% dilution in water).

TABLE 30

| Resin E Amt. (g) | Enzyme Amt. (g) | Enzyme | pH | Temp (° C.) | Time (hours) | 1,3-DCP (ppm) | 2,3-DCP (ppm) | 3-CPD (ppm) |
|---|---|---|---|---|---|---|---|---|
| 160.0 | 0.00 | No enzyme | 7 | 40 | 1 | ND | 0.61 | 12.7 |
| 160.0 | 0.00 | No enzyme | 7 | 40 | 3 | ND | 0.56 | 17.2 |
| 160.0 | 0.00 | No enzyme | 7 | 40 | 6 | ND | 0.67 | 23.8 |
| 140.0 | 1.00 | Resinase A | 7 | 40 | 1 | ND | 0.51 | 11.0 |
| 140.0 | 1.00 | Resinase A | 7 | 40 | 2 | ND | 0.56 | 11.1 |
| 140.0 | 1.00 | Resinase A | 7 | 40 | 3 | ND | 0.51 | 11.7 |
| 140.0 | 1.00 | Resinase A | 7 | 40 | 6 | ND | 0.57 | 17.6 |
| 140.0 | 1.00 | Palatase | 7 | 40 | 1 | ND | 0.65 | 10.0 |
| 140.0 | 1.00 | Palatase | 7 | 40 | 2 | ND | 0.59 | 10.5 |

TABLE 30-continued

| Enzyme Amt. (g) | Enzyme Amt. (g) | Enzyme | pH | Temp (° C.) | Time (hours) | 1,3-DCP (ppm) | 2,3-DCP (ppm) | 3-CPD (ppm) |
|---|---|---|---|---|---|---|---|---|
| 140.0 | 1.00 | Palatase | 7 | 40 | 3 | ND | 0.61 | 13.0 |
| 140.0 | 1.00 | Palatase | 7 | 40 | 6 | ND | 0.59 | 12.9 |
| Resin F Amt. (g) | | | | | | | | |
| 120 | 0.90 | Lipolase 100L | 6 | 40 | 1 | ND | ND | 26.5 |
| 120 | 0.90 | Lipolase 100L | 6 | 40 | 6 | ND | 0.46 | 28.5 |
| 120 | 0.90 | Lipolase 100L | 6 | 40 | 24 | ND | 0.55 | 30.2 |
| 120 | 0.90 | Lipolase 100L | 7 | 40 | 1 | ND | ND | 27.2 |
| 120 | 0.90 | Lipolase 100L | 7 | 40 | 6 | ND | ND | 34.5 |
| 120 | 0.90 | Lipolase 100L | 7 | 40 | 24 | ND | ND | 22 |
| 120 | 0.00 | None (control) | 7 | 40 | 1 | ND | 0.47 | 27.8 |
| 120 | 0.00 | None (control) | 7 | 40 | 6 | ND | 0.38 | 37.6 |
| 120 | 0.00 | None (control) | 7 | 40 | 24 | ND | 0.38 | 28.3 |
| 120 | 0.90 | Novocor AD | 7 | 40 | 1 | ND | 0.45 | 30.4 |
| 120 | 0.90 | Novocor AD | 7 | 40 | 6 | ND | ND | 36.9 |
| 120 | 0.90 | Novocor AD | 7 | 40 | 24 | ND | 0.54 | 31.8 |
| 120 | 0.90 | Novocor AD | 6 | 40 | 1 | ND | 0.45 | 26.3 |
| 120 | 0.90 | Novocor AD | 6 | 40 | 6 | ND | ND | 33.5 |
| 120 | 0.90 | Novocor AD | 6 | 40 | 24 | ND | ND | 40 |
| 160 | 1.15 | Novocor AD | 5 | 40 | 1 | ND | 0.44 | 38.3 |
| 160 | 1.15 | Novocor AD | 5 | 40 | 6 | ND | 0.47 | 39.4 |
| 160 | 1.15 | Novocor AD | 5 | 40 | 24 | ND | 0.37 | 32.6 |
| 160 | 1.15 | Novocor AD | 5 | 40 | 46 | ND | 0.44 | 39.1 |
| 160 | 1.15 | Novocor AD | 4 | 40 | 1 | ND | 0.59 | 30.6 |
| 160 | 1.15 | Novocor AD | 4 | 40 | 6 | ND | 0.39 | 37.4 |
| 160 | 1.15 | Novocor AD | 4 | 40 | 24 | ND | 0.37 | 36.8 |
| 160 | 1.15 | Novocor AD | 4 | 40 | 46 | ND | 0.45 | 35.7 |
| 160 | 1.15 | Novocor AD | 4 | 40 | 166 | ND | 0.58 | 51.8 |
| 160 | 1.15 | Novocor AD | 3 | 40 | 1 | ND | 0.51 | 30.7 |
| 160 | 1.15 | Novocor AD | 3 | 40 | 6 | ND | 0.37 | 38.7 |
| 160 | 1.15 | Novocor AD | 3 | 40 | 24 | ND | 0.44 | 47.6 |
| 160 | 1.15 | Novocor AD | 3 | 40 | 46 | ND | 0.50 | 42.4 |
| 160 | 1.15 | Novocor AD | 3 | 40 | 166 | ND | 0.47 | 59.6 |
| 160 | 1.15 | Novocor AD | 6 | 50 | 1 | ND | 0.35 | 33.0 |
| 160 | 1.15 | Novocor AD | 6 | 50 | 6 | ND | ND | 31.1 |
| 160 | 0.00 | no enzyme | 5 | 40 | 1 | ND | 0.40 | 34.7 |
| 160 | 0.00 | no enzyme | 5 | 40 | 6 | ND | 0.55 | 28.7 |
| 160 | 0.00 | no enzyme | 5 | 40 | 24 | ND | 0.52 | 41.3 |
| 120 | 1.80 | 5% Lipase M | 7 | 40 | 1 | ND | 0.46 | 40.7 |
| 120 | 1.80 | 5% Lipase M | 7 | 40 | 6 | ND | 0.41 | 42.3 |
| 120 | 1.80 | 5% Lipase M | 7 | 40 | 24 | ND | 0.37 | 46.2 |
| 120 | 0.90 | 10% Flavourzyme | 7 | 40 | 1 | ND | 0.51 | 40.1 |
| 120 | 0.90 | 10% Flavourzyme | 7 | 40 | 6 | ND | 0.35 | 41.0 |
| 120 | 0.90 | 10% Flavourzyme | 7 | 40 | 24 | ND | 0.54 | 46.6 |
| 120 | 0.90 | Resinase A | 7 | 40 | 1 | ND | 0.52 | 41.0 |
| 120 | 0.90 | Resinase A | 7 | 40 | 6 | ND | 0.48 | 50.6 |
| 120 | 0.90 | Resinase A | 7 | 40 | 24 | ND | 0.52 | 43.3 |
| 120 | 0.90 | Alcalase | 7 | 40 | 1 | ND | 0.4 | 153 |
| 120 | 0.90 | Alcalase | 7 | 40 | 6 | ND | ND | 259 |
| 120 | 0.90 | Alcalase | 7 | 40 | 24 | ND | ND | 342 |
| 30.0 | 0.00 | No enzyme | 7 | 40 | 0 | ND | ND | 50.4 |
| 30.0 | 0.00 | No enzyme | 7 | 40 | 6 | ND | ND | 57.3 |
| 30.0 | 0.00 | No enzyme | 7 | 40 | 24 | ND | ND | 69.9 |
| 30.0 | 0.25 | Alcalase | 7 | 40 | 0 | ND | ND | 148 |
| 30.0 | 0.25 | Alcalase | 7 | 40 | 6 | ND | ND | 212 |
| 30.0 | 0.25 | Alcalase | 7 | 40 | 24 | ND | ND | 318 |
| Resin G Amt. (g) | | | | | | | | |
| 30.0 | 0.25 | Alcalase | 7 | 40 | 0 | ND | ND | 89 |
| 30.0 | 0.25 | Alcalase | 7 | 40 | 6 | ND | ND | 146 |
| 30.0 | 0.25 | Alcalase | 7 | 40 | 24 | ND | ND | 193 |
| Resin F Amt. (g) | | | | | | | | |
| 30.0 | 0.25 | Alcalase | 6 | 40 | 0 | ND | 1 | 66 |
| 30.0 | 0.25 | Alcalase | 6 | 40 | 6 | ND | ND | 77 |
| 30.0 | 0.25 | Alcalase | 6 | 40 | 24 | ND | ND | 148 |
| 30.0 | 0.25 | Alcalase | 8 | 40 | 0 | ND | ND | 226 |
| 30.0 | 0.25 | Alcalase | 8 | 40 | 6 | ND | ND | 331 |
| 120.0 | 0.00 | No enzyme | 3 | 50 | 4 | ND | ND | 49.9 |
| 120.0 | 0.00 | No enzyme | 3 | 50 | 24 | ND | ND | 59.7 |
| 120.0 | 0.00 | No enzyme | 3 | 50 | 70 | ND | ND | 111 |
| 60.0 | 0.50 | Alcalase | 8 | 50 | 1 | ND | ND | 208.9 |
| 60.0 | 0.50 | Alcalase | 8 | 50 | 2 | ND | ND | 241.9 |

TABLE 30-continued

| Enzyme Amt. (g) | Enzyme | pH | Temp (° C.) | Time (hours) | 1,3-DCP (ppm) | 2,3-DCP (ppm) | 3-CPD (ppm) |
|---|---|---|---|---|---|---|---|
| 60.0 | 0.50 | Alcalase | 8 | 50 | 4 | ND | ND | 237.2 |
| 60.0 | 0.50 | Alcalase | 7 | 50 | 1 | ND | 0.87 | 59.9 |
| 60.0 | 0.50 | Alcalase | 7 | 50 | 2 | ND | 0.47 | 54.8 |
| 60.0 | 0.50 | Alcalase | 7 | 50 | 4 | ND | 0.50 | 63.1 |
| 60.0 | 0.50 | Alcalase | 7 | 50 | 6 | ND | ND | 61.5 |
| 60.0 | 0.50 | Alcalase | 7 | 30 | 1 | ND | ND | 260.4 |
| 60.0 | 0.50 | Alcalase | 7 | 30 | 2 | ND | ND | 237.6 |
| 60.0 | 0.50 | Alcalase | 7 | 30 | 4 | ND | ND | 325.0 |
| 60.0 | 0.50 | Alcalase | 7 | 30 | 6 | ND | ND | 332.9 |
| 30.0 | 0.25 | Alcalase | 8 | 40 | 1 | ND | ND | 208.5 |
| 30.0 | 0.25 | Alcalase | 8 | 40 | 6 | ND | ND | 330.2 |
| 30.0 | 0.00 | No enzyme | 8 | 40 | 1 | ND | ND | 62.0 |
| 30.0 | 0.00 | No enzyme | 8 | 40 | 6 | ND | ND | 64.9 |
| 30.0 | 0.00 | No enzyme | 7 | 40 | 1 | ND | 0.6 | 70.1 |
| 30.0 | 0.00 | No enzyme | 7 | 40 | 6 | ND | 0.53 | 72.8 |
| 30.0 | 0.00 | No enzyme | 7 | 40 | 26 | ND | 0.45 | 64.2 |
| 90.0 | 0.75 | Alcalase | 8.5 | 30 | 0 | ND | ND | 107.5 |
| 90.0 | 0.75 | Alcalase | 8.5 | 30 | 1 | ND | ND | 204.7 |
| 90.0 | 0.75 | Alcalase | 8.5 | 30 | 2 | ND | ND | 249.4 |
| 90.0 | 0.75 | Alcalase | 8.5 | 30 | 4 | ND | ND | — |
| 90.0 | 0.75 | Alcalase | 8.5 | 30 | 6 | ND | ND | 319.2 |
| 90.0 | 0.75 | Alcalase | 9.0 | 30 | 0 | ND | ND | 94.9 |
| 90.0 | 0.75 | Alcalase | 9.0 | 30 | 1 | ND | ND | 196.6 |
| 90.0 | 0.75 | Alcalase | 9.0 | 30 | 2 | ND | ND | 260.3 |
| 90.0 | 0.75 | Alcalase | 9.0 | 30 | 4 | ND | ND | 299.8 |
| 90.0 | 0.75 | Alcalase | 9.0 | 30 | 6 | ND | ND | 331.4 |
| 90.0 | 0.75 | Alcalase | 8.0 | 30 | 0 | ND | ND | 123.3 |
| 90.0 | 0.75 | Alcalase | 8.0 | 30 | 1 | ND | ND | 237.1 |
| 90.0 | 0.75 | Alcalase | 8.0 | 30 | 2 | ND | ND | 257.4 |
| 90.0 | 0.75 | Alcalase | 8.0 | 30 | 4 | ND | ND | 349.7 |
| 90.0 | 0.75 | Alcalase | 8.0 | 30 | 6 | ND | ND | 364.0 |
| 90.0 | 0.75 | Alcalase | 9.5 | 30 | 0 | ND | ND | 119.6 |
| 90.0 | 0.75 | Alcalase | 9.5 | 30 | 1 | ND | ND | 218.7 |
| 90.0 | 0.75 | Alcalase | 9.5 | 30 | 2 | ND | ND | 233.7 |
| 90.0 | 0.75 | Alcalase | 9.5 | 30 | 4 | ND | ND | 306.2 |
| 90.0 | 0.75 | Alcalase | 9.5 | 30 | 6 | ND | ND | 303.4 |
| 90.0 | 0.75 | Alcalase | 8.0 | 20 | 0 | ND | ND | 107.5 |
| 90.0 | 0.75 | Alcalase | 8.0 | 20 | 1 | ND | ND | 197.8 |
| 90.0 | 0.75 | Alcalase | 8.0 | 20 | 2 | 2.78 | ND | 253.1 |
| 90.0 | 0.75 | Alcalase | 8.0 | 20 | 4 | ND | ND | 375.7 |
| 90.0 | 0.75 | Alcalase | 8.0 | 20 | 6 | ND | ND | 437.9 |
| 90.0 | 0.75 | Alcalase | 9.0 | 20 | 0 | ND | 0.52 | 113.7 |
| 90.0 | 0.75 | Alcalase | 9.0 | 20 | 1 | ND | ND | 200.9 |
| 90.0 | 0.75 | Alcalase | 9.0 | 20 | 2 | ND | ND | 283.1 |
| 90.0 | 0.75 | Alcalase | 9.0 | 20 | 4 | ND | ND | 371.4 |
| 90.0 | 0.75 | Alcalase | 9.0 | 20 | 6 | ND | ND | 410.9 |
| 90.0 | 0.68 | Lipolase 100L | 8.0 | 30 | 0 | ND | ND | 75.1 |
| 90.0 | 0.68 | Lipolase 100L | 8.0 | 30 | 1 | ND | ND | 69.4 |
| 90.0 | 0.68 | Lipolase 100L | 8.0 | 30 | 2 | ND | ND | 72.7 |
| 90.0 | 0.68 | Lipolase 100L | 8.0 | 30 | 4 | ND | ND | 72.7 |
| 90.0 | 0.68 | Lipolase 100L | 8.0 | 30 | 6 | ND | ND | 75.4 |
| 90.0 | 0.68 | Resinase A | 8.0 | 30 | 0 | ND | ND | 71.6 |
| 90.0 | 0.68 | Resinase A | 8.0 | 30 | 1 | ND | ND | 70.8 |
| 90.0 | 0.68 | Resinase A | 8.0 | 30 | 2 | ND | ND | 73.1 |
| 90.0 | 0.68 | Resinase A | 8.0 | 30 | 4 | ND | ND | 73.7 |
| 90.0 | 0.68 | Resinase A | 8.0 | 30 | 6 | ND | ND | 69.4 |
| 90.0 | 1.36 | 5% Lipase M | 8.0 | 30 | 0 | ND | ND | 58.2 |
| 90.0 | 1.36 | 5% Lipase M | 8.0 | 30 | 1 | ND | ND | 46.0 |
| 90.0 | 1.36 | 5% Lipase M | 8.0 | 30 | 2 | ND | ND | 60.4 |
| 90.0 | 1.36 | 5% Lipase M | 8.0 | 30 | 4 | ND | ND | 74.0 |
| 90.0 | 1.36 | 5% Lipase M | 8.0 | 30 | 6 | ND | ND | 69.8 |
| 90.0 | 0.68 | 10% Flavourzyme | 8.0 | 30 | 0 | ND | ND | 52.0 |
| 90.0 | 0.68 | 10% Flavourzyme | 8.0 | 30 | 1 | ND | ND | 61.7 |
| 90.0 | 0.68 | 10% Flavourzyme | 8.0 | 30 | 2 | ND | ND | 71.1 |
| 90.0 | 0.68 | 10% Flavourzyme | 8.0 | 30 | 4 | ND | ND | 70.3 |
| 90.0 | 0.68 | 10% Flavourzyme | 8.0 | 30 | 6 | ND | ND | 72.3 |

Comparative Example 10

As controls, the general procedure for screening activity of resins and evaluating reaction conditions was repeated, but without added enzyme: A portion of Resin F was charged into a container with a stirrer. The pH was adjusted with 20% aqueous sodium hydroxide. The container was closed to minimize evaporation of water. The container was placed in a temperature-controlled water bath and maintained at the desired temperature. Periodically, an aliquot was removed from the bottle and submitted for GC analysis. The results are reported in Table 30. There are several comparative examples because of reaction condition changes and because Resin F is not CPD storage stable. This Table contains numerous comparative examples (reactions without enzyme—designated no enzyme) which were conducted chronologically close to the examples.

Example 75

Synthesis of a Polyaminopolyamide-epi Resin Followed by Enzyme-treatment and Biodehalogenation A 3-L round-bottom flask was fitted with a condenser, a pH meter, a temperature controlled circulating bath, an addition funnel and a mechanical stirrer. To the flask was added 717.57 g of 53.3% aqueous poly(adipic acid-co-diethylenetriamine) (available from the Hercules Incorporated, Zwijndrecht, Netherlands plant) and 557.43 g of water. The solution was adjusted to 25° C. and then 170.08 g of epichlorohydrin (Aldrich, 99%) was added over about 1 minute. The temperature was allowed to increase to 40° C. and was maintained at this temperature. 2.75 hours after the addition of the epichlorohydrin, 1042.2 g of water and 7.825 g of 96% sulfuric acid was added. The temperature was raised to 70° C. over 0.75 hour. The Gardner-Holdt viscosity at 25° C. was monitored. After the Gardner-Holdt viscosity reached H, the reaction was quenched by the addition 150 g of water containing 18.5 g of 96% sulfuric acid. The reaction mixture was allowed to cool 25° C. The pH was adjusted to 2.7 with an additional 1.60 g pf 96% sulfuric acid and 127 grams of water was added. The total solids content of this resin was 21.0% and the Brookfield viscosity was 147 cps.

A 1-L round-bottom flask was fitted with a condenser, a pH meter, a temperature controlled circulating bath and a mechanical stirrer. To the flask was added 321.42 g of the above 21.0% polyaminopolyamide-epi resin (stored at 4° C. for two months) and 178.57 g of water (to give 13.5% solids). The pH was raised to 8.0 with 11.6 g of 30% aqueous sodium hydroxide and then 4.17 g of Alcalase (available from Novo Nordisk, used as received). A 6.60 g aliquot of the reaction mixture was removed and analyzed by GC. The temperature was raised to 40.0° C. and maintained at 40.0° C. Aliquots (6.60 g each) were removed and analyzed by GC (see Table 31). The pH was allowed to drop throughout the course of the reaction, without adjustment. After 6 hours, the temperature was reduced to 30.0° C. and a 22.77 g sample was removed. The pH of the remaining resin was lowered from 6.98 to 5.8 with 1.80 g of 96% sulfuric acid, an air sparge was placed to contact the resin solution and then 55.56 g of a blend of microorganisms comprising an inoculum from a biodehalogenated polyaminopolyamide-epichlorohydrin resin. This represents a starting value of cell concentration of from about $10^5$ to about $10^6$ cells/ml. This starting value corresponds to a final treatment level of about $10^9$ cells/ml as the process needs. The inoculum was added, together with 4.32 grams of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens* (HK7). The temperature was maintained at 30° C. and the pH was maintained at 5.8 by periodic addition of 20% aqueous sodium hydroxide. After 48 hours, the mixture was cooled to room temperature and the pH was adjusted to 2.8 with 2.71 g of 96% sulfuric acid and and 5.04 g of biocide solution was added. [The biocide solution consisted of 10% active Proxel® BD (from Zeneca Biocides) and 1.67% potassium sorbate in deionized water.]. The resin had a total solids of 16.9 wt. % and had a Brookfield viscosity of 33 cps.

The amount of CPD producing species of this were estimated using the following test. A portion of resin to be tested was charged into a bottle containing a magnetic stirrer. The pH was adjusted to 1.0 with 96% sulfuric acid. The bottle was capped and placed in a 50° C. water bath and maintained at 50° C. with stirring. Periodically, aliquots were removed from the bottle and submitted for GC analysis. The CPD produced after 24 hours is used to estimate the amount of CPD producing species. See Table 31 for results.

TABLE 31

| Resin Information | pH | Temp (° C.) | Time (hours) | epi (ppm) | 1,3-DCP (ppm) | 2,3-DCP (ppm) | 3-CPD (ppm) |
| --- | --- | --- | --- | --- | --- | --- | --- |
| 21% resin, no enzyme | 2.7 | 23 | 0.0 | 8 | 1595 | ND | 419 |
| 13.5% resin, enzyme | 8.0 | 23 | 0.083 | 8 | 1014 | ND | 395 |
| 13.5% resin, enzyme | 7.5 | 40 | 1.0 | 30 | 977 | ND | 451 |
| 13.5% resin, enzyme | 7.2 | 40 | 2.0 | 39 | 947 | ND | 546 |
| 13.5% resin, enzyme | 7.0 | 40 | 4.0 | 40 | 937 | ND | 636 |
| 13.5% resin, enzyme | 6.8 | 40 | 6.0 | 39 | 932 | ND | 653 |
| Biodehalogenated resin | — | — | — | ND | ND | 1.00 | 0.2 |
| Acid test | 1.0 | 50 | 23 | ND | ND | 0.69 | 12.6 |
| Acid test | 1.0 | 50 | 23 | ND | ND | 0.74 | 13.7 |

Example 76

Handsheet Evaluation of Enzyme Treated Example 75 and Comparative Example 4

The procedure of Example 7 was used to evaluate Example 75 and Comparative Example 4. Results for oven-cured paper are reported in Table 32.

TABLE 32

Oven-Cured Paper.

| | | | Basis Wt. Normalized | | | | |
|---|---|---|---|---|---|---|---|
| Example | % Added | pH | dry tensile lbs/in | wet tensile lbs/in | % wet/ dry | % of Comp. Ex. 4 | CPD in Paper (ppb) |
| Blank | — | 7.5 | 17.78 | 0.63 | 4 | 17 | <30 |
| Example 75 | 0.25 | 7.5 | 22.90 | 4.13 | 18 | 115 | — |
| Example 75 | 0.50 | 7.5 | 24.28 | 5.36 | 22 | 119 | — |
| Example 75 | 1.00 | 7.5 | 25.41 | 6.03 | 24 | 112 | 57 |
| Comp. Ex. 4 | 0.25 | 7.5 | 21.18 | 3.60 | 17 | 100 | — |
| Comp. Ex. 4 | 0.50 | 7.5 | 21.94 | 4.50 | 21 | 100 | — |
| Comp. Ex. 4 | 1.00 | 7.5 | 23.00 | 5.38 | 23 | 100 | 366 |

Example 77

Enzyme-treatment of a Polyaminopolyamide-epi Resin Followed by Biodehalogenation A 1-L round-bottom flask was fitted with a condenser, a pH meter, a temperature controlled circulating bath and a mechanical stirrer. To the flask was added 452.64 g of PPD D-1026 (a 23.9% solids Kymene® SLX2 polyaminopolyamide-epi resin available from Hercules Incorporated) and 347.36 g of water (to give 13.5% solids). A 6 g aliquot was removed and analyzed by GC. The pH was raised to 8.0 with 21.60 g of 30% aqueous sodium hydroxide and a 6 g aliquot was removed and analyzed by GC. Then 6.67 g of Alcalase (available from Novo Nordisk, used as received). A 6 g aliquot of the reaction mixture was removed and analyzed by GC. The temperature was raised to 40.0° C. and maintained at 40.0° C. Additional aliquots (6 g) were removed and analyzed by GC (see Table 32). The pH was allowed to drop throughout the course of the reaction, without adjustment. After 6 hours, the temperature was reduced to 30.0° C. and a 23.51 g sample was removed. The pH of the remaining resin (760 g) was lowered from 6.98 to 5.8 with 2.15 g of 96% sulfuric acid, an air sparge was placed to contact the resin solution and then 84.44 g of a blend of microorganisms comprising an inoculum from a biodehalogenated polyaminopolyamide-epichlorohydrin resin. This represents a starting value of call concentration of from about $10^5$ to about $10^6$ cells/ml. This starting value corresponds to a final treatment level of about $10^9$ cells/ml as the process proceeds. The inoculum was added, together with 6.64 g of a nutrient solution. (The nutrient solution consisted of 8026 ppm of potassium dihydrogen phosphate, 27480 ppm of urea, 4160 ppm of magnesium sulfate and 840 ppm of calcium chloride in tap water.) The microorganisms used were: *Arthrobacter histidinolovorans* (HK1) and *Agrobacterium tumefaciens* (HK7). The temperature was maintained at 30° C. and the pH was maintained at 5.8 by periodic addition of 20% aqueous sodium hydroxide. After 48 hours, the mixture was cooled to room temperature and the pH was adjusted to 2.8 with 4.63 g of 96% sulfuric acid and and 10.2 g of biocide solution was added. [The biocide solution consisted of 10% active Proxel® BD (from Zeneca Biocides) and 1.67% potassium sorbate in deionized water.]. The resin had a total solids of 14.2 wt. % and had a Brookfield viscosity of 145 cps.

The amount of CPD producing species of this were estimated using the following test. A portion of resin to be tested was charged into a bottle containing a magnetic stirrer. The pH was adjusted to 1.0 with 96% sulfuric acid. The bottle was capped and placed in a 50° C. water bath and maintained at 50° C. with stirring. Periodically, aliquots were removed from the bottle and submitted for GC analysis. The CPD produced after 24 hours is used to estimate the amount of CPD producing species. See Table 33 for results.

TABLE 33

| Resin Information | pH | Temp (° C.) | Time (hours) | epi (ppm) | 1,3-DCP (ppm) | 2,3-DCP (ppm) | 3-CPD (ppm) |
|---|---|---|---|---|---|---|---|
| 13.5% resin, no enzyme | 2.9 | 19 | 0.0 | ND | 694.4 | 1.59 | 310.1 |
| 13.5% resin, no enzyme | 8.0 | 22 | 0.0 | 5.7 | 647.2 | 1.52 | 290.4 |
| 13.5% resin, enzyme | 8.0 | 21 | 0.083 | ND | 674.5 | ND | 387.7 |
| 13.5% resin, enzyme | 7.5 | 40 | 1.0 | 14.5 | 650.6 | ND | 475.4 |
| 13.5% resin, enzyme | 7.3 | 40 | 2.0 | 21.1 | 618.4 | ND | 513.6 |
| 13.5% resin, enzyme | 7.1 | 40 | 4.0 | 17.1 | 619.6 | ND | 536.2 |
| 13.5% resin, enzyme | 7.0 | 40 | 6.0 | 21.8 | 561.3 | ND | 486.8 |
| Biodehalogenated resin | — | — | — | ND | ND | 0.68 | 0.15 |
| Acid Test | 1.0 | 50 | 24 | ND | ND | 0.68 | 12.1 |

Although the invention has been described with reference to particular means, materials and embodiments, it is to be understood that the invention is not limited to the particulars disclosed, and extends to all equivalents within the scope of the claims.

What is claimed is:

1. A process for rendering a polyamine-epihalohydrin wet strength resin storage stable, comprising: treating a composition containing a polyamine-epihalohydrin wet strength resin which includes CPD forming species with at least one enzymatic agent, under conditions to at least one of reduce and remove the CPD-forming species to obtain a gelation storage stable reduced CPD-forming wet strength resin so that a composition containing the reduced CPD-forming polyamine-epihalohydrin wet strength resin, when stored at pH 1 for 24 hours at 50 degree C. and measured at 24 hours, produces less than about 250 ppm dry basis of CPD.

2. The process according to claim 1, wherein the polyamine-epihalohydrin wet strength resin comprises polyaminopolyamide-epihalohydrin wet strength resin.

3. The process according to claim 1, wherein, prior to the treating a polyamine-epihalohydrin wet strength resin to obtain a reduced CPD-forming wet strength resin, the wet strength resin is contacted with at least one microorganism, or at least one enzyme isolated from the at least one microorganism, in an amount, and at a pH and temperature effective to dehalogenate residual quantities of organically bound halogen.

4. The process according to claim 1, wherein, subsequent to the subjecting a polyamine-epihalohydrin wet strength resin to obtain a reduced CPD-forming wet strength resin, the reduced CPD-forming wet strength resin is contacted with at least one microorganism, or at least one enzyme isolated from the at least one microorganism, in an amount, and at a pH and temperature effective to dehalogenate residual quantities of organically bound halogen.

5. The process according to claim 1, wherein, prior to the treating a polyamine-epihalohydrin wet strength resin to obtain a reduced CPD-forming wet strength resin, the wet strength resin is treated to reduce at least one of epihalohydrins, epihalohydrin hydrolysis by-products and organic halogen bound to the polymer backbone.

6. The process according to claim 1, wherein, subsequent to the treating a polyamine-epihalohydrin wet strength resin to obtain a reduced CPD-forming wet strength resin, the wet strength resin is treated to reduce at least one of epihalohydrins, epihalohydrin hydrolysis by-products and organic halogen bound to the polymer backbone.

7. The process according to claim 2, wherein the wet strength resin comprises a wet strength resin formed in a polyaminopolyamide-epihalohydrin reaction having a molar ratio of epihalohydrin to secondary amine group of less than 1.

8. The process according to claim 1, wherein the reduced CPD-forming wet strength resin is acid stabilized after treatment.

9. The process according to claim 8, wherein the reduced CPD-forming wet strength resin is acid stabilized at pH from about 2.5 to 4.

10. The process according to claim 1, wherein the at least one enzymatic agent comprises at least one of esterases, lipases and proteases.

11. The process according to claim 2, wherein the at least one enzymatic agent comprises at least one of esterases, lipases and proteases.

12. The process according to claim 1, wherein the at least one enzymatic agent comprises proteases.

13. The process according to claim 1, wherein the composition containing the reduced CPD forming polyamine-epihalohydrin wet strength resin, when stored at pH 1 for 24 hours at 50 degree C. and measured at 24 hours, produces less than about 50 ppm dry basis of CPD.

14. A paper product treated with wet strength resin produced according to the process according to claim 1.

15. A reduced CPD-forming wet strength resin produced according to the process of claim 1.

16. An aqueous composition comprising the reduced CPD-forming wet strength resin produced by the process according to claim 1.

17. The aqueous composition according to claim 16, wherein the CPD forming wet strength resin comprises polyalkylene polyamine-epihalohydrin wet strength resin.

18. The process according to claim 1 wherein the CPD-forming species comprises a CPD ester.

19. A process for preparing a paper product, comprising: treating a composition containing a polyamine-epihalohydrin wet strength resin which includes CPD-forming spades with at least one enzymatic agent, under conditions to at least one of reduce and remove the CPD-forming species to obtain a gelation storage stable reduced CPD-forming wet strength resin, and forming a paper product with the reduced CPD forming polyamine-epihalohydrin wet strength resin, so that a paper product, when corrected for adding at about a 1 wt % addition level of the reduced CPD-forming wet strength resin, contains less than about 250 ppb of CPD.

20. The process according to claim 19, wherein the paper product contains less than about 50 ppb of CPD.

21. The process according to claim 19, wherein the polyamine-epihalohydrin wet strength resin comprises polyaminopolyamide-epichlorohydrin wet strength resin.

22. The process according to claim 19, wherein the at least one enzymatic agent comprises at least one of esterases, lipases end proteases.

23. The process according to claim 19 wherein the CPD-forming species comprises a CPD ester.

* * * * *